INVENTORS
RICHARD C. LEE
FRED B. COX
MARK E. CONNELLY
BY
Laurence S. Epstein
ATTORNEYS INVENTORS
RICHARD C. LEE
FRED B. COX
MARK E. CONNELLY
BY
Laurence S. Epstein
ATTORNEYS INVENTORS
RICHARD C. LEE
FRED B. COX
MARK E. CONNELLY
BY Laurence S. Epstein
ATTORNEYS

INVENTORS
RICHARD C. LEE
FRED B. COX
BY MARK E. CONNELLY

Laurence S. Epstein
ATTORNEYS

INVENTORS
RICHARD C. LEE
FRED B. COX
MARK E. CONNELLY
BY Laurence S. Epstein
ATTORNEYS INVENTORS
RICHARD C. LEE
FRED B. COX
MARK E. CONNELLY
BY
Laurence S. Epstein
ATTORNEYS

INVENTORS
RICHARD C. LEE
FRED B. COX
BY MARK E. CONNELLY

Lawrence S. Epstein
ATTORNEYS

INVENTORS
RICHARD C. LEE
FRED B. COX
BY MARK E. CONNELLY
Laurence S. Epstein
ATTORNEYS INVENTORS
RICHARD C. LEE
FRED B. COX
MARK E. CONNELLY
BY Laurence S. Epstein
ATTORNEYS

INVENTORS
RICHARD C. LEE
FRED B. COX
BY MARK E. CONNELLY

Lawrence S Epstein
ATTORNEYS

INVENTORS
RICHARD C. LEE
FRED B. COX
BY MARK E. CONNELLY
Laurence S. Epstein
ATTORNEYS Fig. 12
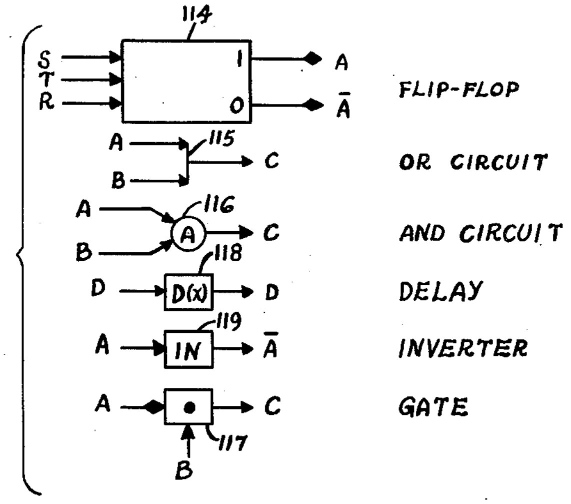
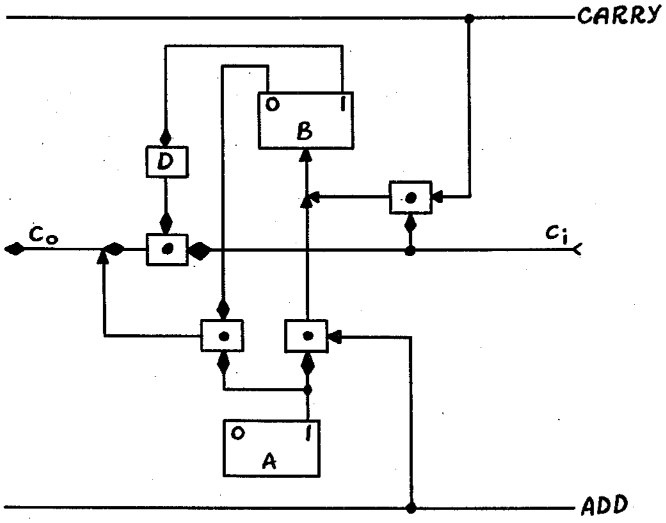
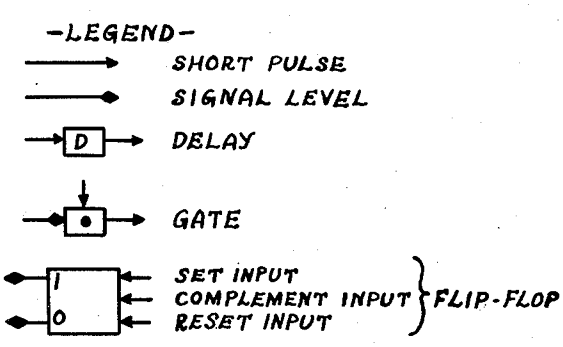
Fig. 13
INVENTORS
RICHARD C. LEE
FRED B. COX
BY MARK E. CONNELLY
Laurence S. Epstein
ATTORNEYS INVENTORS
RICHARD C. LEE
FRED B. COX
BY MARK E. CONNELLY
Laurence S. Epstein
ATTORNEYS INVENTORS
RICHARD C. LEE
FRED B. COX
MARK E. CONNELLY
BY Laurence S. Epstein
ATTORNEYS June 5, 1962 R. C. LEE ET AL 3,037,699

PULSED ANALOG COMPUTER

Filed May 19, 1959 34 Sheets-Sheet 15

INVENTORS
RICHARD C. LEE
FRED B. COX
BY MARK E. CONNELLY
Laurence S. Epstein
ATTORNEYS

INVENTORS
RICHARD C. LEE
FRED B. COX
BY MARK E. CONNELLY

Laurence S. Epstein
ATTORNEYS

INVENTORS
RICHARD C. LEE
FRED B. COX
BY MARK E. CONNELLY
Laurence S. Epstein
ATTORNEYS INVENTORS
RICHARD C. LEE
FRED B. COX
MARK E. CONNELLY
BY Laurence S. Epstein
ATTORNEYS

INVENTORS
RICHARD C. LEE
FRED B. COX
BY MARK E. CONNELLY

Laurence S. Epstein
ATTORNEYS

June 5, 1962 R. C. LEE ET AL 3,037,699

PULSED ANALOG COMPUTER

Filed May 19, 1959 34 Sheets-Sheet 20

INVENTORS
RICHARD C. LEE
FRED B. COX
BY MARK E. CONNELLY

Laurence S. Epstein
ATTORNEYS

INVENTORS
RICHARD C. LEE
FRED B. COX
BY MARK E. CONNELLY
Laurence S. Epstein
ATTORNEYS INVENTORS
RICHARD C. LEE
FRED B. COX
MARK E. CONNELLY
BY Laurence S. Epstein
ATTORNEYS INVENTORS
RICHARD C. LEE
FRED B. COX
BY MARK E. CONNELLY
Laurence S. Epstein
ATTORNEYS INVENTORS
RICHARD C. LEE
FRED B. COX
BY MARK E. CONNELLY
Laurence S. Epstein
ATTORNEYS INVENTORS
RICHARD C. LEE
FRED B. COX
MARK E. CONNELLY
BY
Laurence S. Epstein
ATTORNEYS INVENTORS
RICHARD C. LEE
FRED B. COX
MARK E. CONNELLY
BY
Laurence S. Epstein
ATTORNEYS INVENTORS
RICHARD C. LEE
FRED B. COX
BY MARK E. CONNELLY
Laurence S. Epstein
ATTORNEYS June 5, 1962 R. C. LEE ET AL 3,037,699

PULSED ANALOG COMPUTER

Filed May 19, 1959 34 Sheets-Sheet 28

INVENTORS
RICHARD C. LEE
FRED B. COX
MARK E. CONNELLY
BY Laurence S. Epstein
ATTORNEYS June 5, 1962 R. C. LEE ET AL 3,037,699

PULSED ANALOG COMPUTER

Filed May 19, 1959 34 Sheets-Sheet 29

INVENTORS
RICHARD C. LEE
FRED B. COX
BY MARK E. CONNELLY

Laurence S. Epstein
ATTORNEYS

INVENTORS
RICHARD C. LEE
FRED B. COX
MARK E. CONNELLY

BY Laurence S. Epstein
ATTORNEYS

INVENTORS
RICHARD C. LEE
FRED B. COX
MARK E. CONNELLY
BY Laurence S. Epstein
ATTORNEYS INVENTORS
RICHARD C. LEE
FRED B. COX
BY MARK E. CONNELLY
Laurence S. Epstein
ATTORNEYS INVENTORS
RICHARD C. LEE
FRED B. COX
BY MARK E. CONNELLY
Laurence S. Epstein
ATTORNEYS June 5, 1962 R. C. LEE ET AL 3,037,699

PULSED ANALOG COMPUTER

Filed May 19, 1959 34 Sheets-Sheet 34

INVENTORS
RICHARD C. LEE
FRED B. COX
BY MARK E. CONNELLY

Laurence S. Epstein
ATTORNEYS

United States Patent Office 3,037,699
Patented June 5, 1962

3,037,699
PULSED ANALOG COMPUTER

Richard C. Lee, Allston, Fred B. Cox, Cambridge, and Mark E. Connelly, Concord, Mass., assignors, by mesne assignments, to the United States of America as represented by the Secretary of the Navy
Filed May 19, 1959, Ser. No. 814,363
8 Claims. (Cl. 235—154)

This invention relates generally to computers and more particularly to computers usable with land based operational flight trainers.

After a mathematical model of a system has been formulated, it is often desirable to simulate the system on a computer to provide information about its operation. Thus, it is our purpose to carry out the logical design of an analog-digital computer capable of simulating a complex non-linear system in real time. The equations of motion used to simulate a high-performance aircraft may be regarded as typical of the problems for which the computer has been specially designed.

Present-day simulators, i.e. those used as operational flight trainers, in almost all cases are of the analog type. Speed in analog computation is accomplished by the use of separate computing components for each mathematical operation. Consequently, if the system equations to be solved are complicated, the amount of equipment required becomes exceedingly large. In addition, the variables in the machine often require a large dynamic range, and rather involved scaling of the machine variables may be necessary to relaize the full obtainable accuracy. Also, each component in an analog computer has a limited dynamic range due to non-linear response for both small and large signal inputs.

Data needed to solve equations in analog simulators are usually stored on linear and non-linear coefficient potentiometers. For aircraft simulation, the number of storage devices is very large; hence, the analog computer is not easily converted to a new problem. General purpose analog computers are capable of simulating different airplanes, but the labor of switching from one plane to another is great. Operational flight trainers, however, would essentially have to be rebuilt in order to change plane types.

One main problem in analog computation is the generation of arbitrary functions of one or more variables. Tapped pots, diode function generators and curve followers are often used for the single variable functions, but extension to two or more variables is difficult. Since function generators must be adjusted frequently to accommodate changes in the function, a long set-up time represents a severe limitation.

A digital computer could be used to simulate aircraft if the computer were fast enough to solve the aerodynamic equations in real time. In 1952 the University of Pennsylvania concluded that the real-time solution of a set of equations for operational flight trainers was not possible with existing general purpose digital computers. Consequently, a special-purpose digital simulator was designed. This system performs digital integration by iteration techniques which is time consuming, since each integration must be done sequentially. Also, communication between the digital domain of the computer and the analog domain of the pilot calls for rather elaborate analog-digital conversion equipment. The digital computer, however, is flexible inasmuch as it is only necessary to read a new tape into the digital machine to alter aircraft parameters or to change the entire problem. For function generation of a single variable, the digital computer can easily approximate an arbitrary function by linear interpolation, polynomial approximations, or other methods. However, the generation of functions of two or more variables, becomes difficult and considerable computation time is needed for their solution.

A real-time simulator, application Serial No. 753,399 has been designed at the M.I.T. Servomechanisms Laboratory that performs integration in the analog domain and all other mathematical operations in the digital domain. A separate analog integrator is used for each computed derivative. Analog-digital converters are employed to communicate between the digital and analog sections of the computer. With integration performed in the analog domain, some burden is taken off the digital system; hence the number of solutions per second can be increased. A high speed floating-point arithmetic unit was provided to increase the dynamic range and to minimize scaling and programming problems. The simulator can easily be changed from one set of equations to a new set by reading in a new tape. Function generation is performed using logic specially designed for linear interpolation.

In the design of large scale computing systems, a choice is generally made between analog and digital techniques. Sometimes both must be used, in which case the points in the system where conversions should be made are selected. Instead of converting between separate computations in the digital and analog domains, however, there is also the possibility of a more effective combination of analog and digital computing techniques, utilizing the best features of each. The exploitation of this possibility is the subject of this specification. Instead of operating essentially two computers with conversion between the two, the analog-digital Computer uses mixed analog and digital techniques to perform mathematical operations.

In the analog-digital Computer, quantities are represented by the amplitude of an analog voltage pulse and a digital number. Using present-day pulse techniques, it is not unreasonable to assume that analog data can be transferred rapidly and accurately. A substantial amount of work has already been done on high-speed analog computing components. For example, an analog multiplier-divider has been designed to operate in 100 microseconds. Another example is an analog quarter-square multiplier, specially designed for use in the instant invention, which operates in less than 10 microseconds.

High speed analog computing elements used in the instant invention are time-shared. The sequence of operations on the combined analog-digital information is controlled by a stored program in digital form.

A principal object of the invention is to provide a computer wherein information is represented in the computer in combined analog and digital form.

Another object is to provide a computer wherein high-speed, time-shared analog computing elements are used to save equipment.

Another object is to provide a computer wherein a novel floating-point analog feature has been included to increase the dynamic range of variables, to improve accuracy, and to provide ease of programming.

Still another object is to provide a computer wherein a magnetic drum memory is used to facilitate information storage and to provide rapid access time.

Another object is to provide a computer wherein arbitrary functions of one or more variables are generated using only discrete values of the function.

Yet another object is to provide a computer wherein the programming techniques developed for the computer are easily learned and applied.

Other objects and many of the attendant advantages of this invention will be readily appreciated as the same becomes better understood by reference to the following detailed description when considered in connection with the accompanying drawings wherein.

Figure 5A:
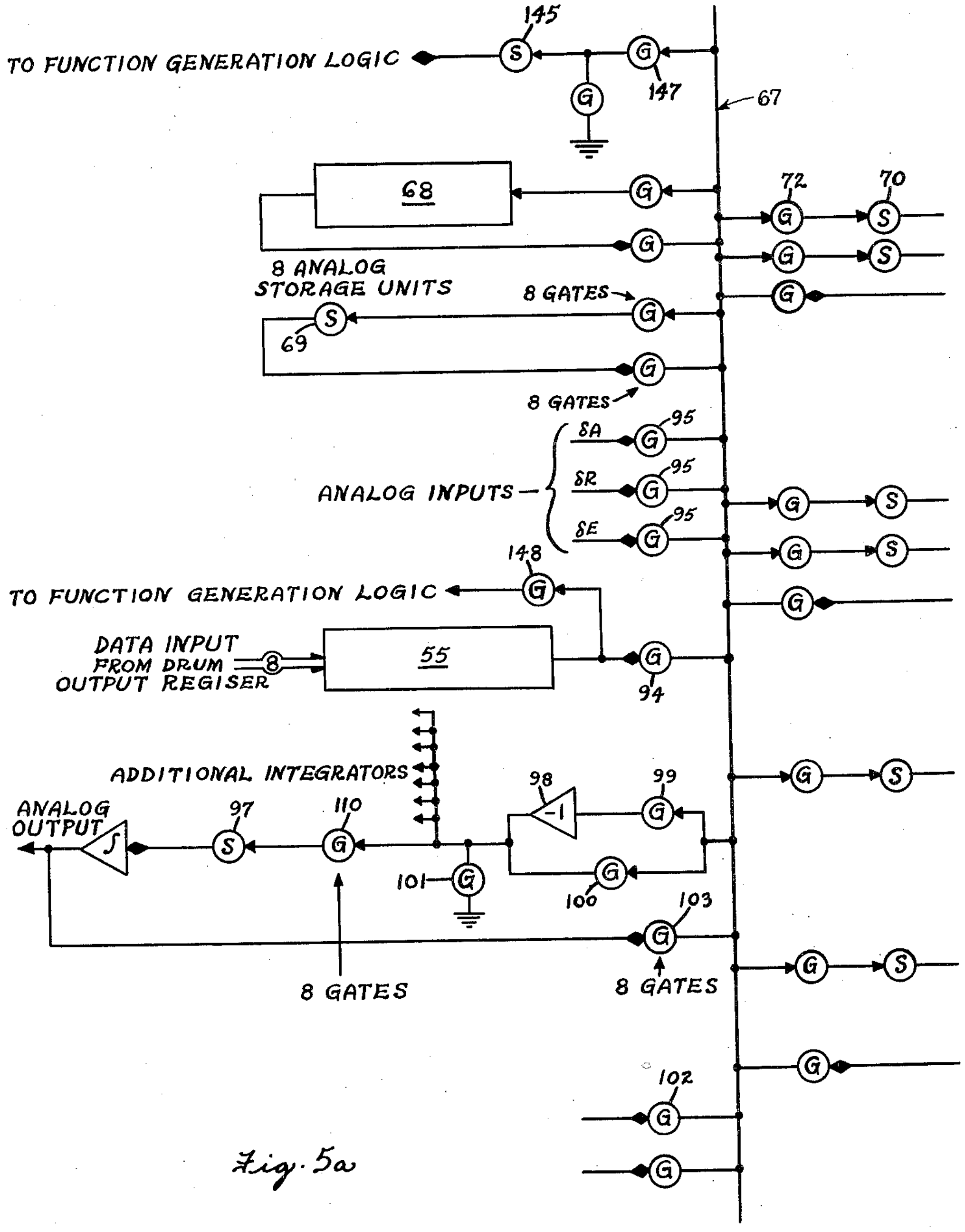
Figure 5B:
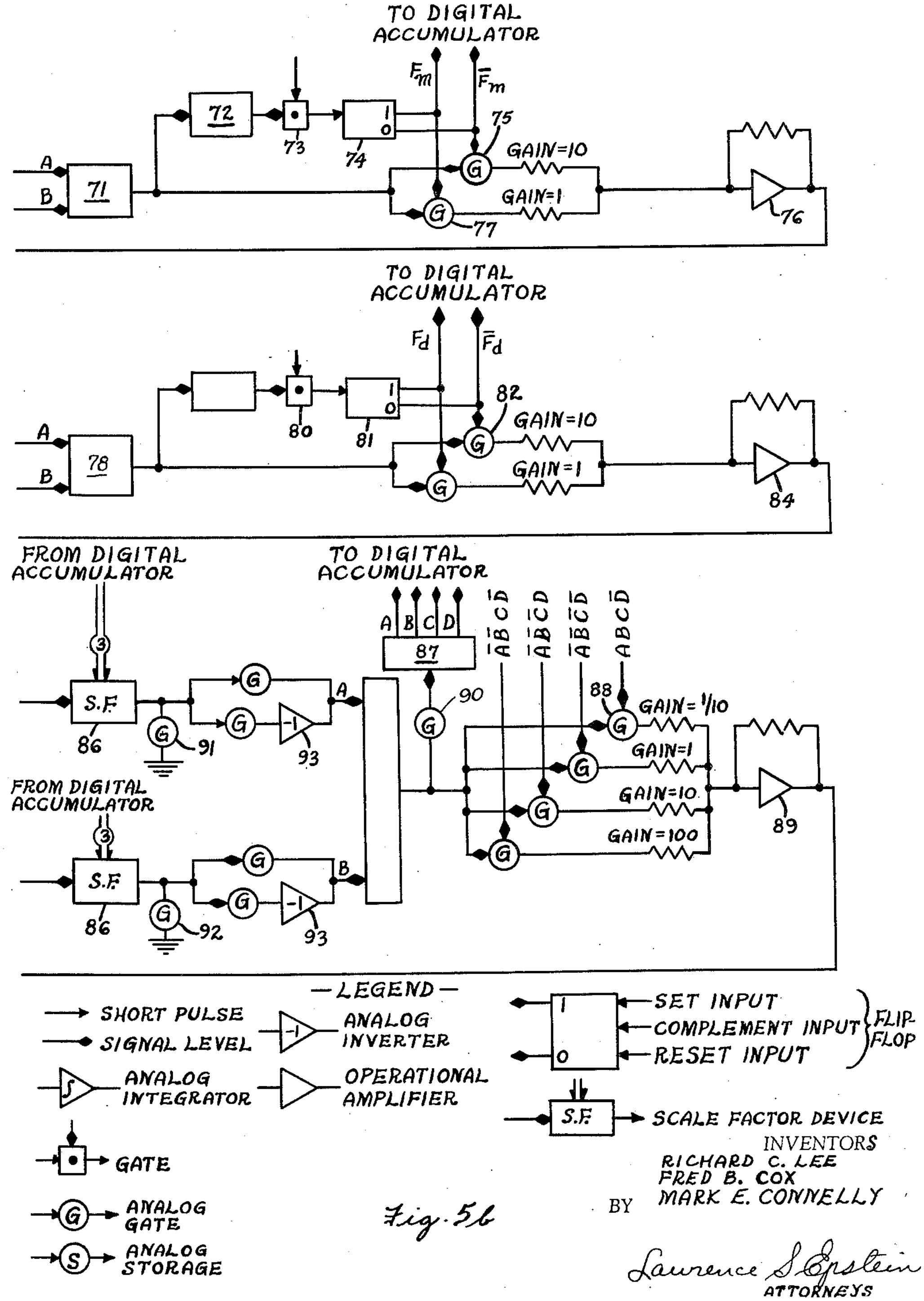
Figure 6:
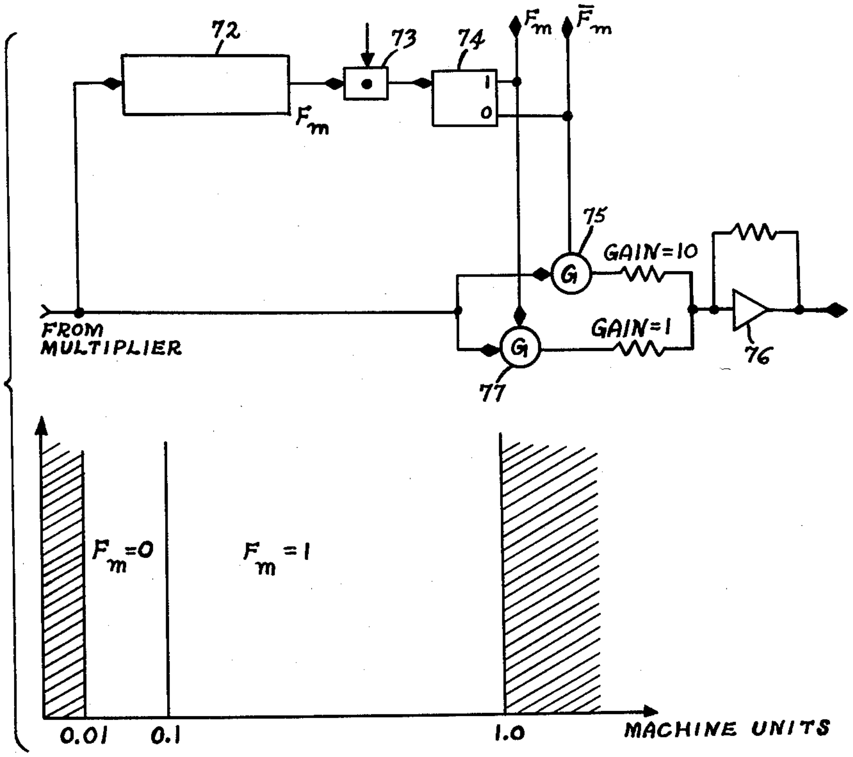
Figure 6:
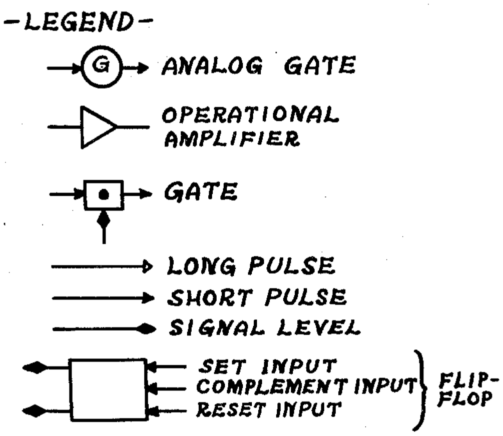
Figure 7:
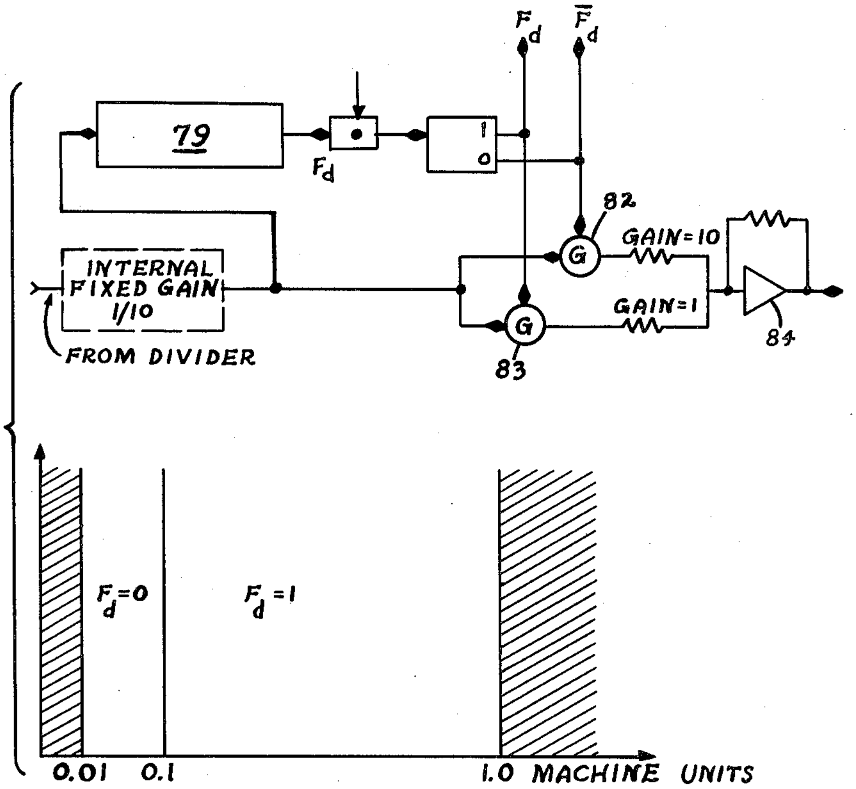
Figure 8:
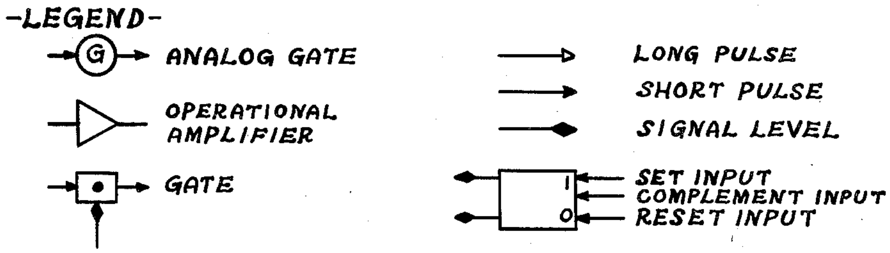
Figure 8:
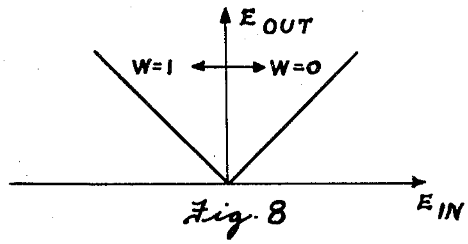
Figure 9:
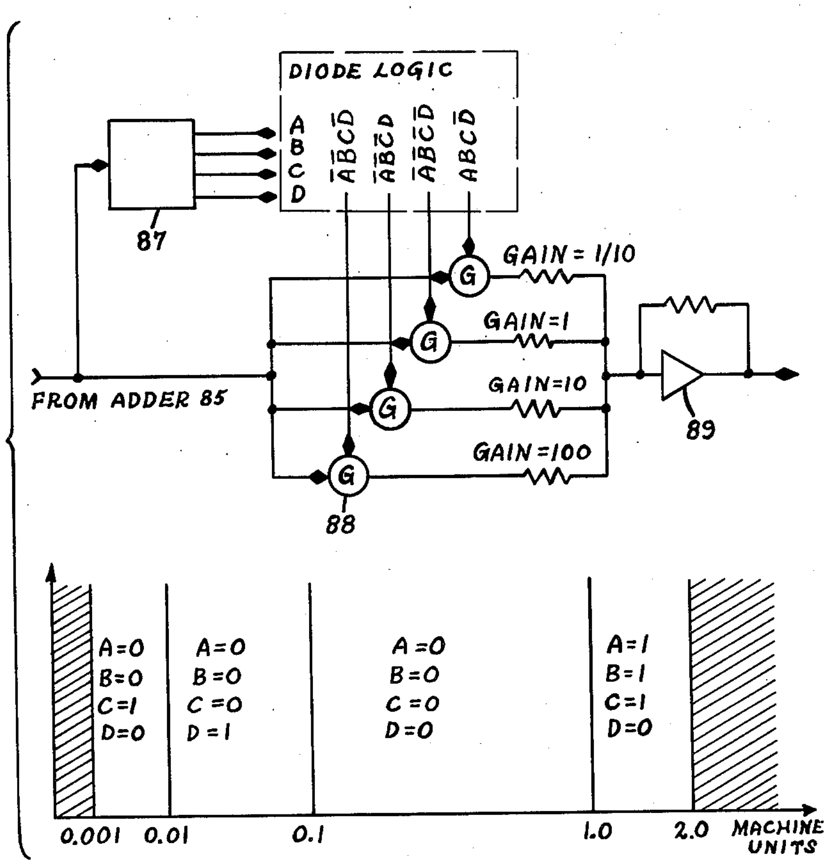
Figure 9:
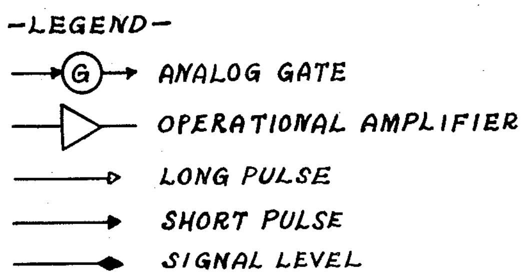
Figure 10:
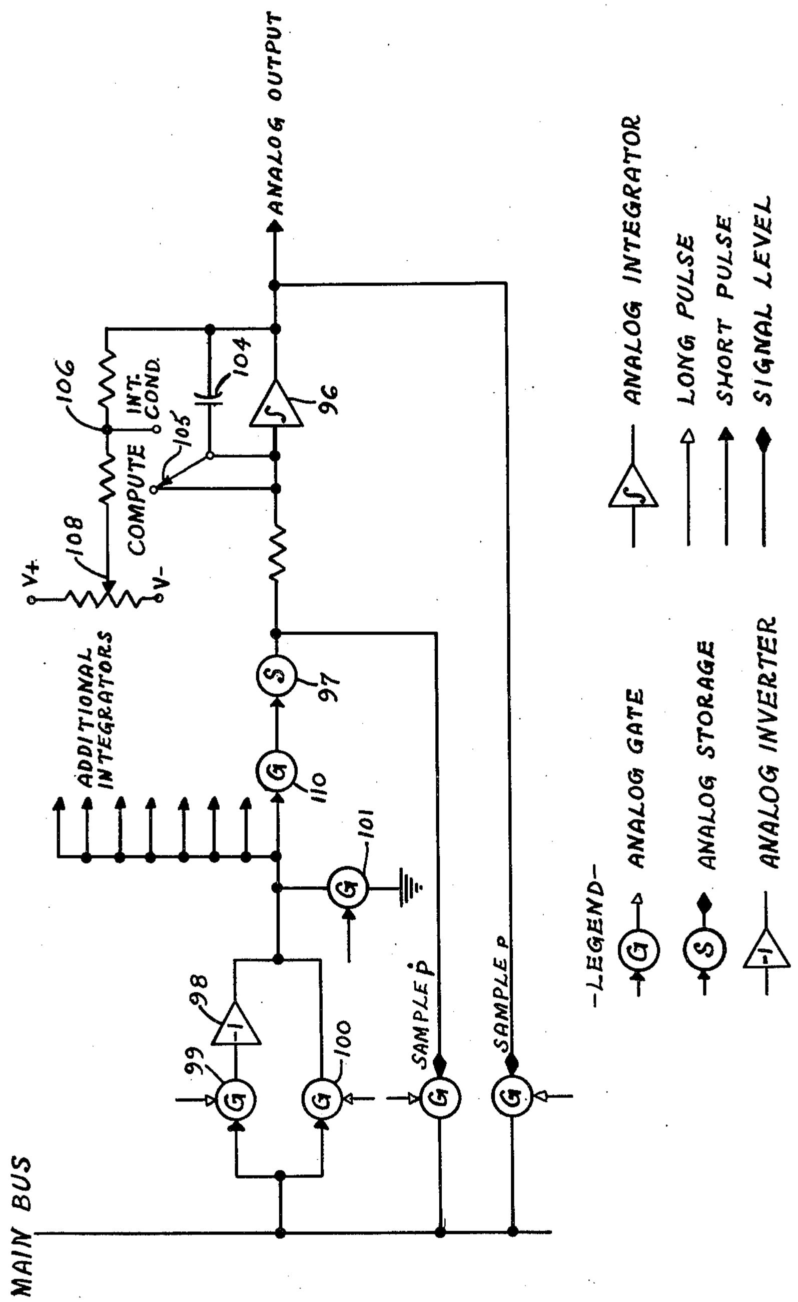
Figure 11:
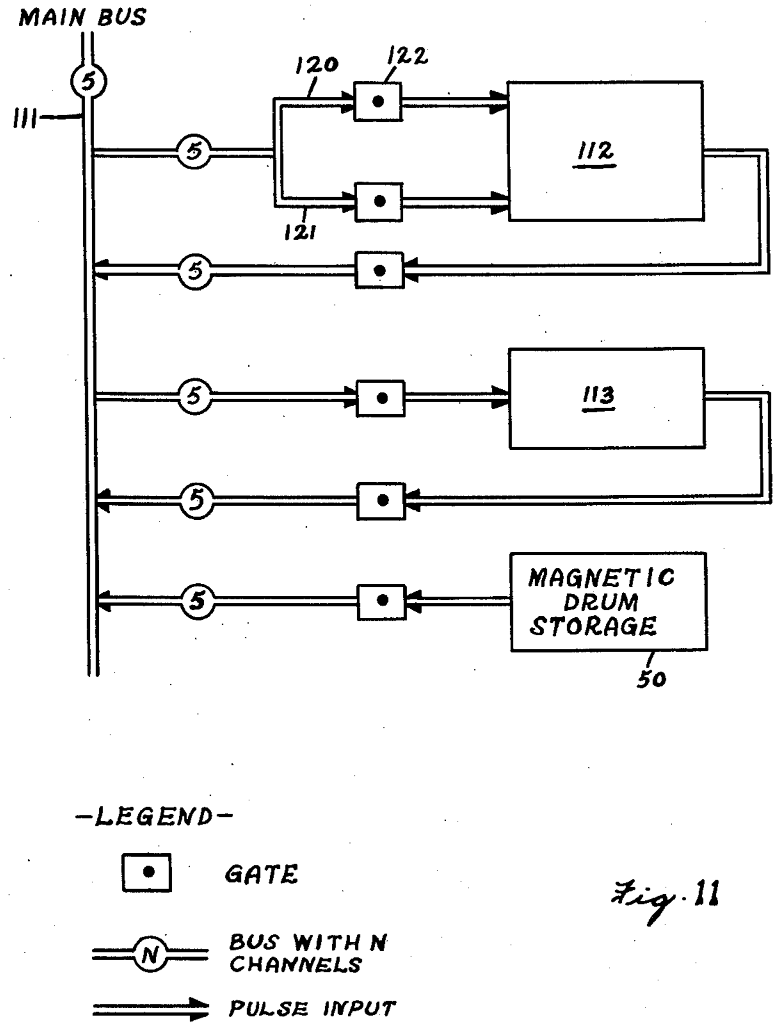
Figure 14A:
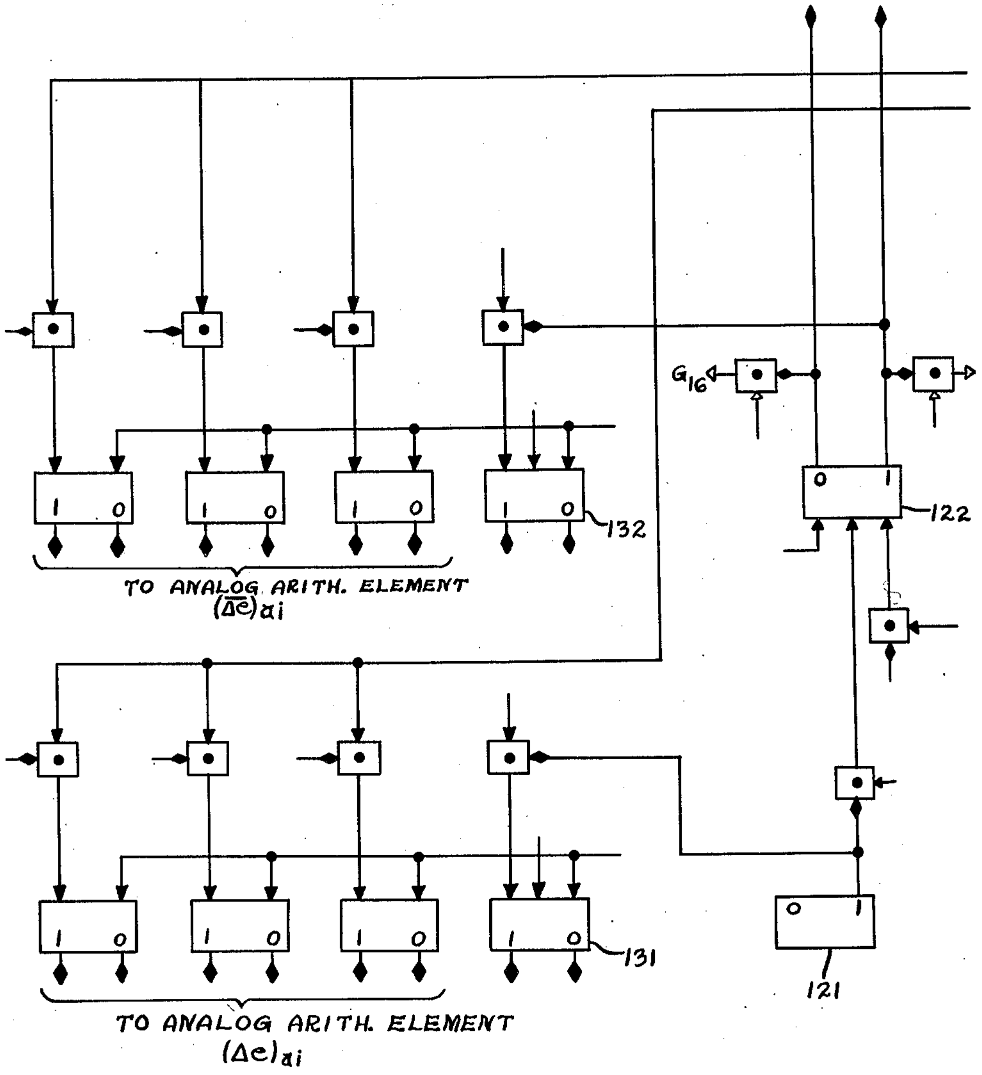
Figure 14A:
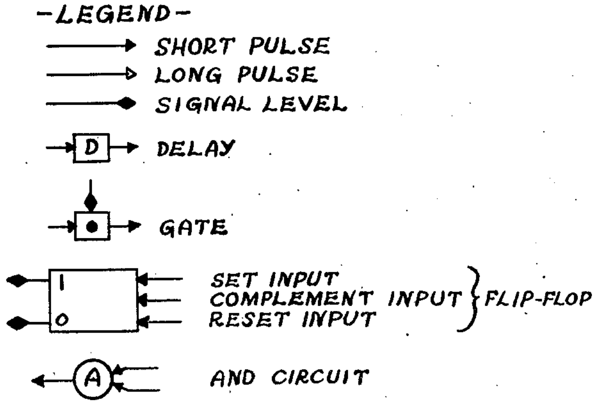
Figure 14B:
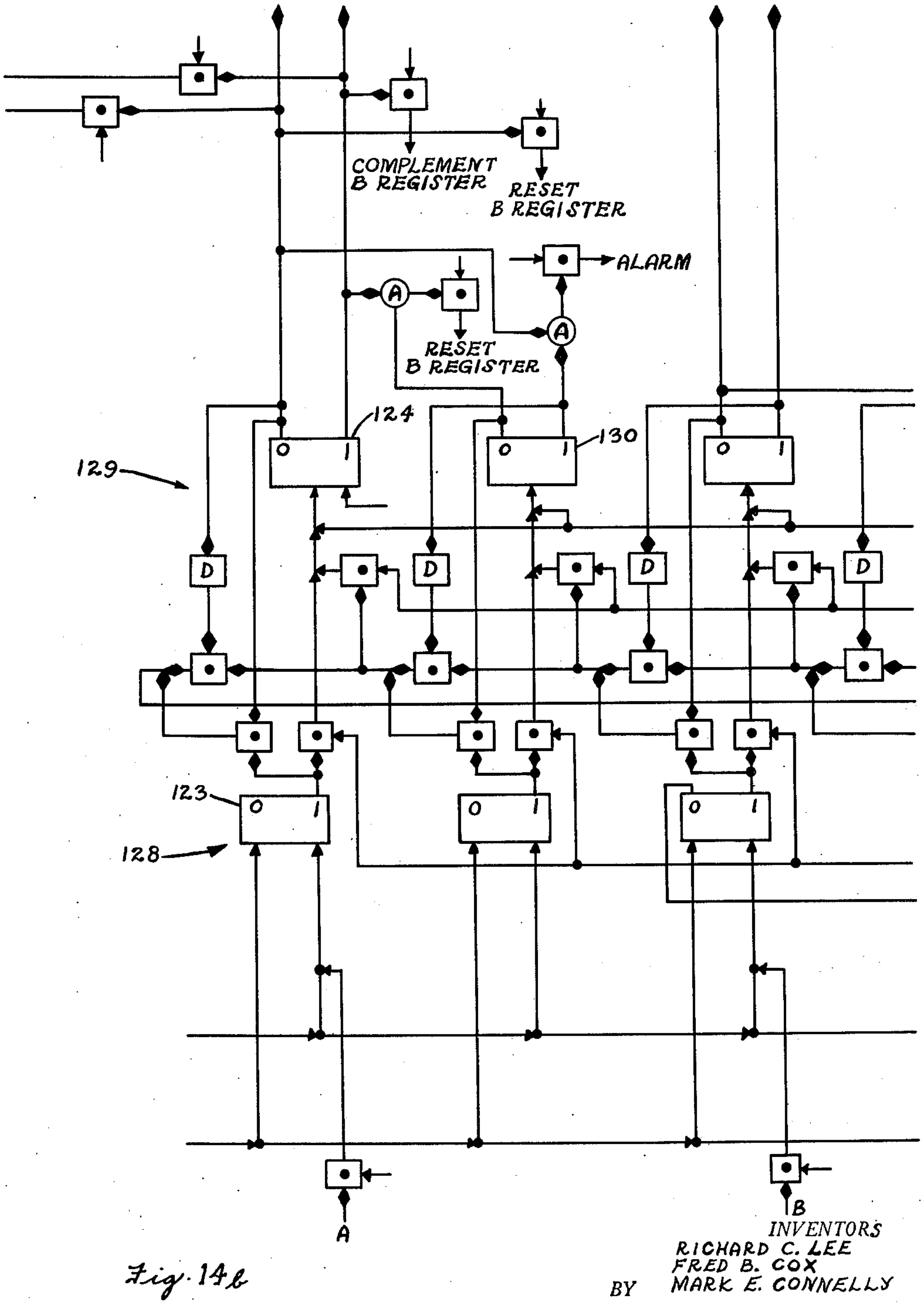
Figure 14C:
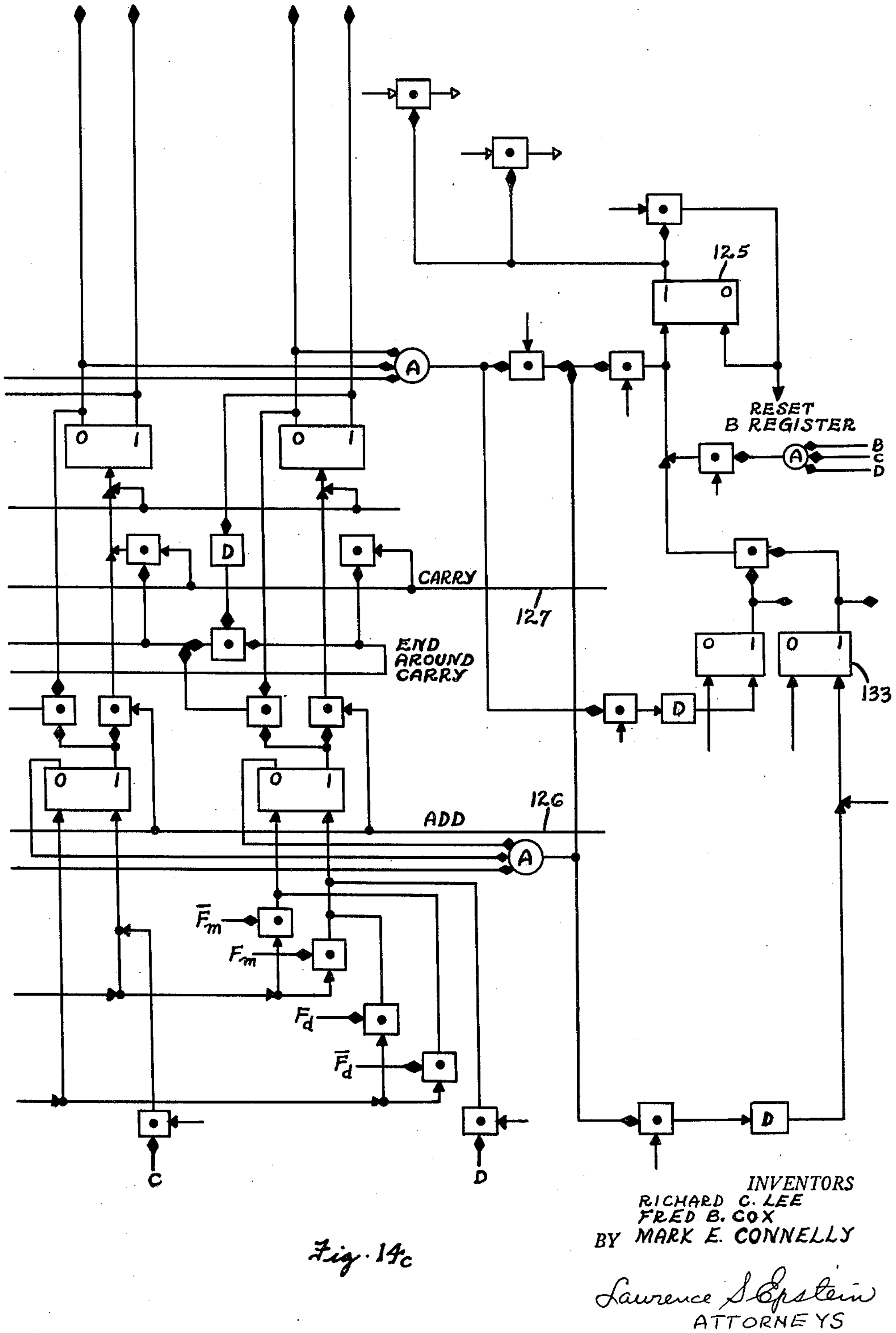
Figure 15:
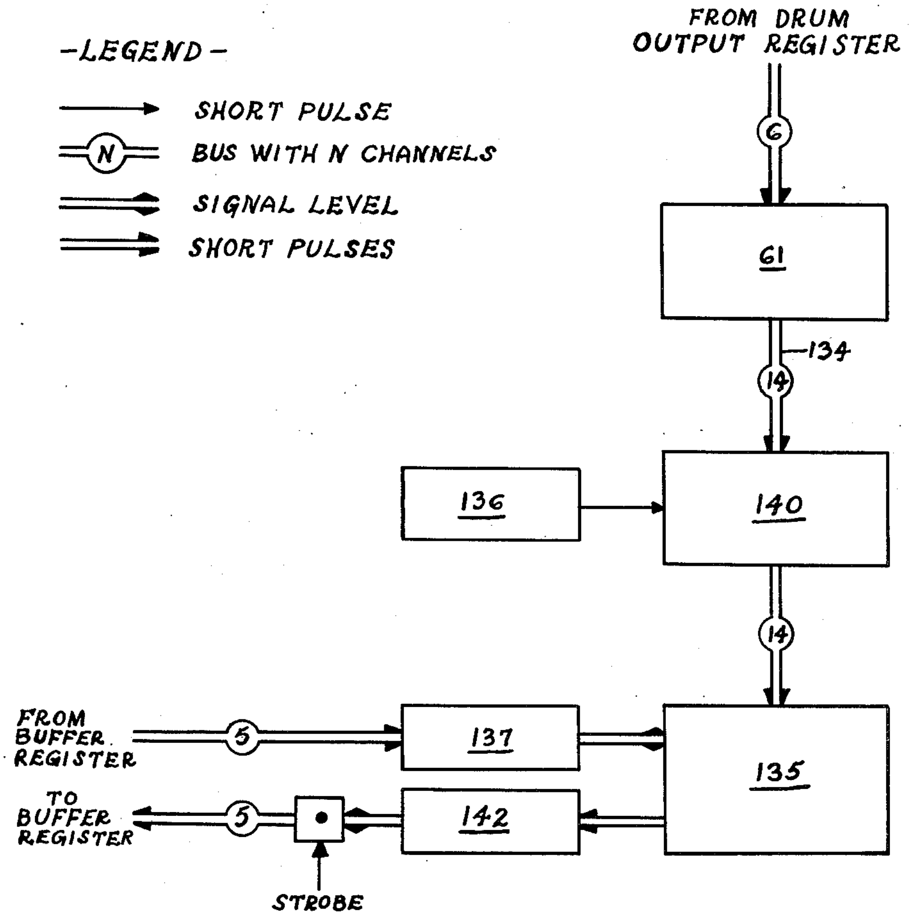
Figure 16:
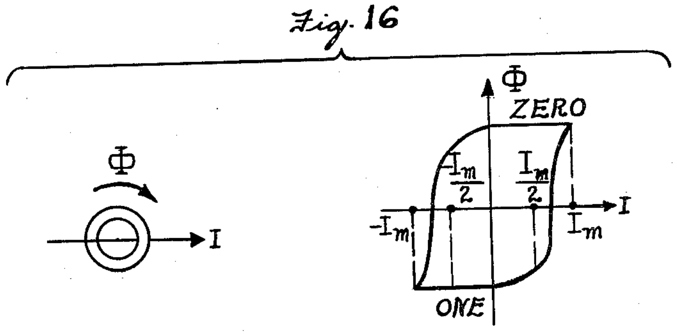
Figure 17:
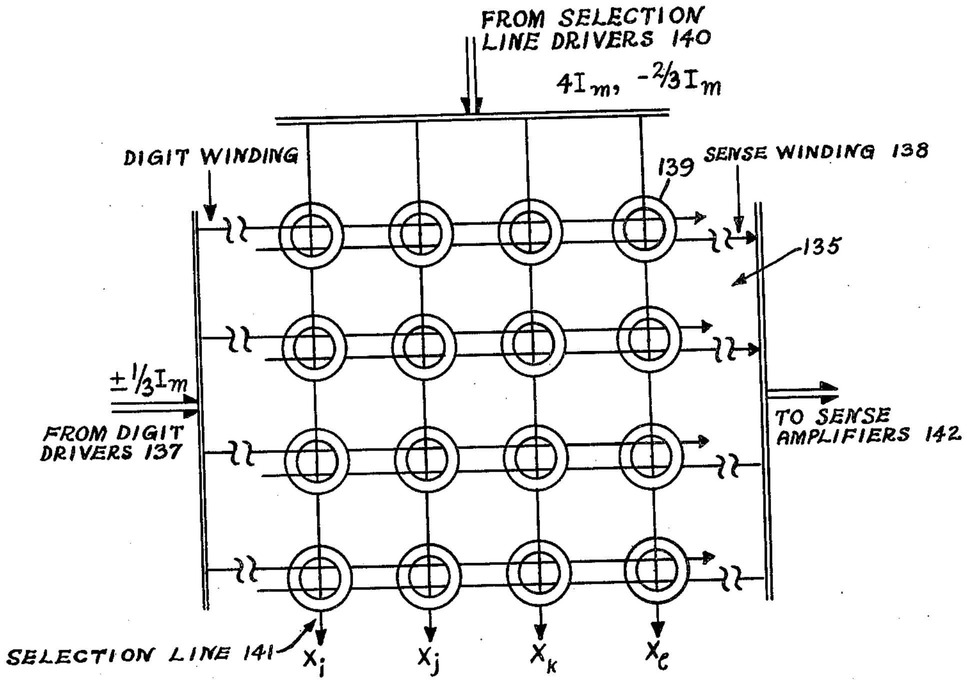
Figure 18:
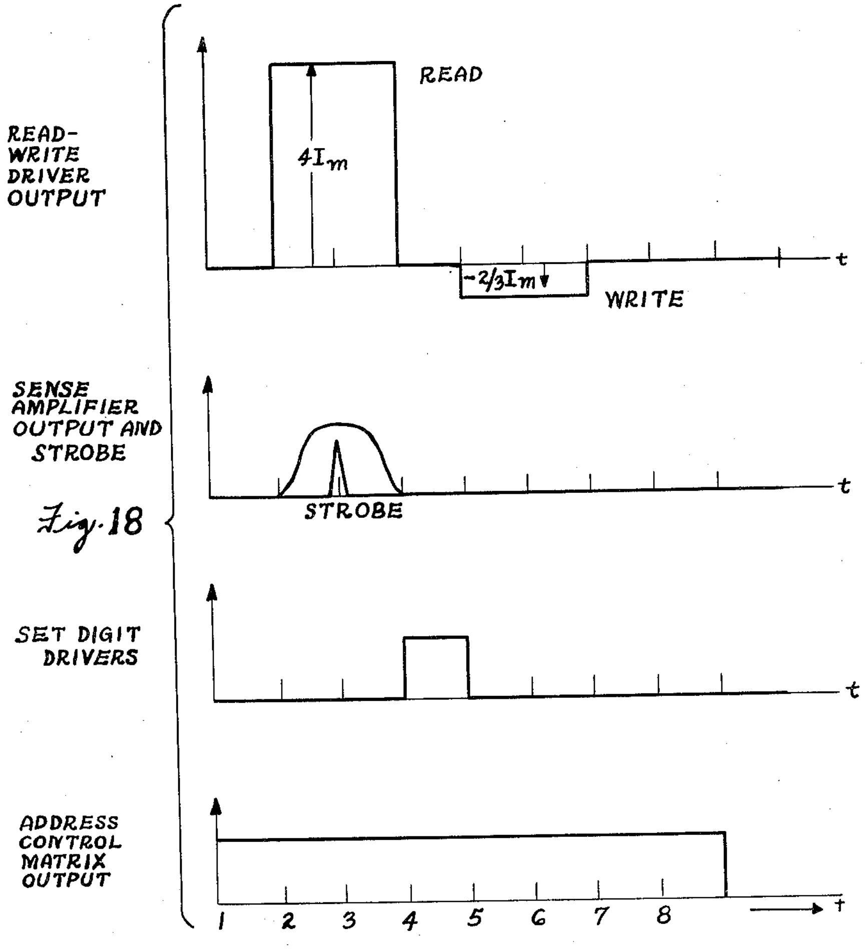
Figure 19:
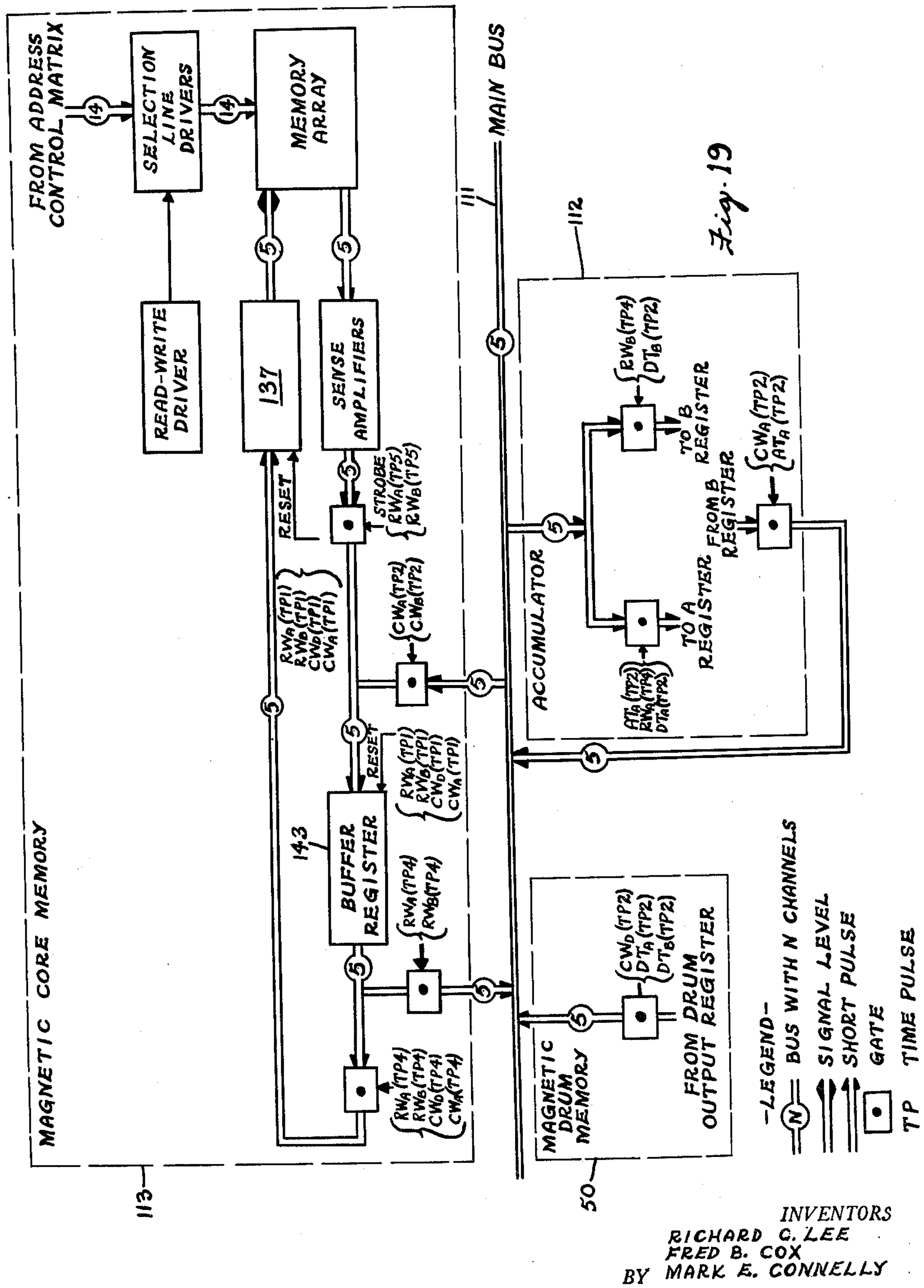
Figure 20:
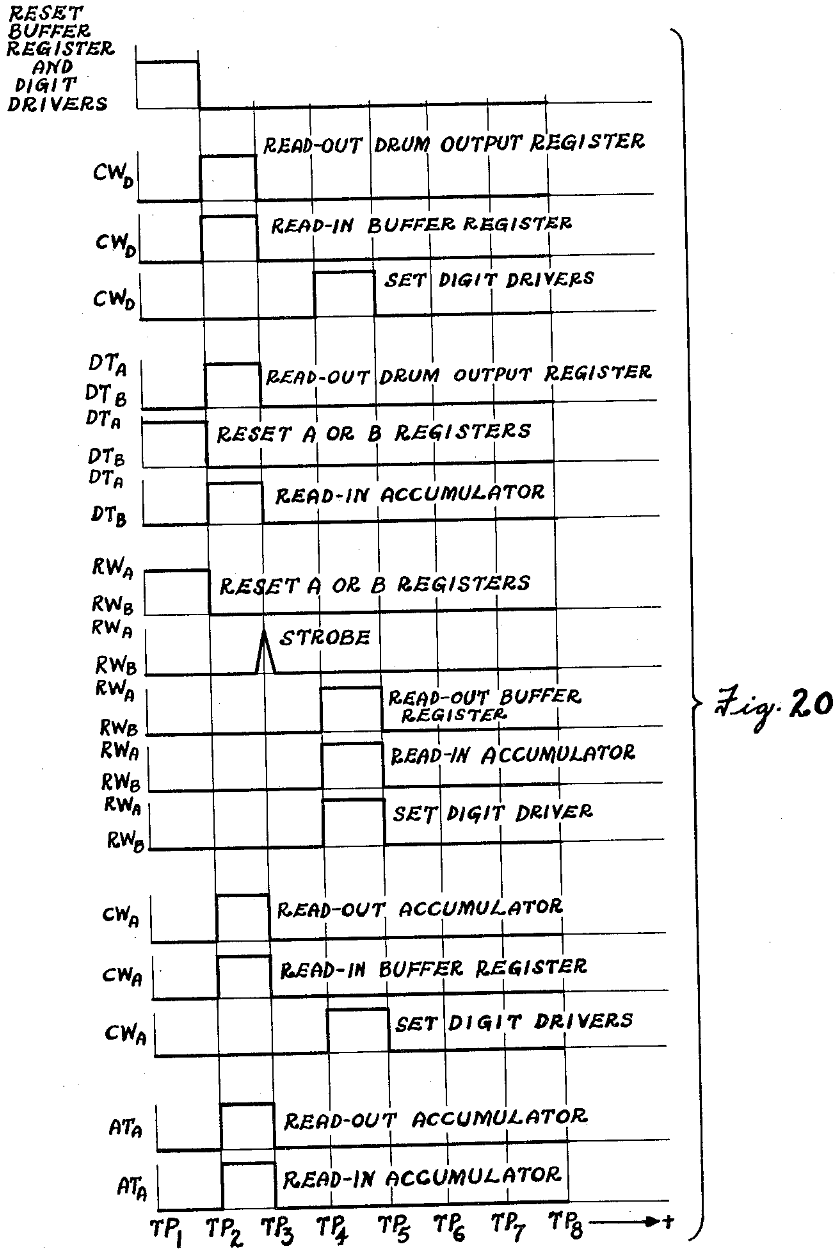
Figure 21:
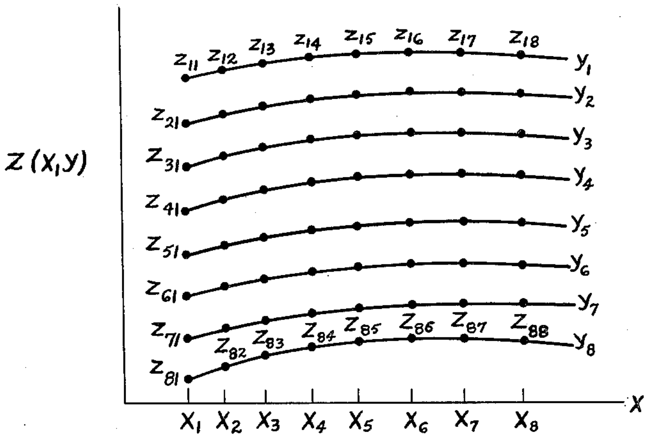
Figure 22:
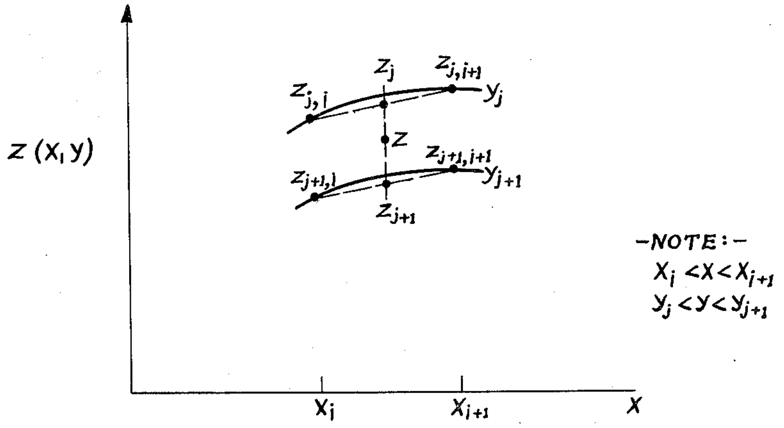
Figure 23:
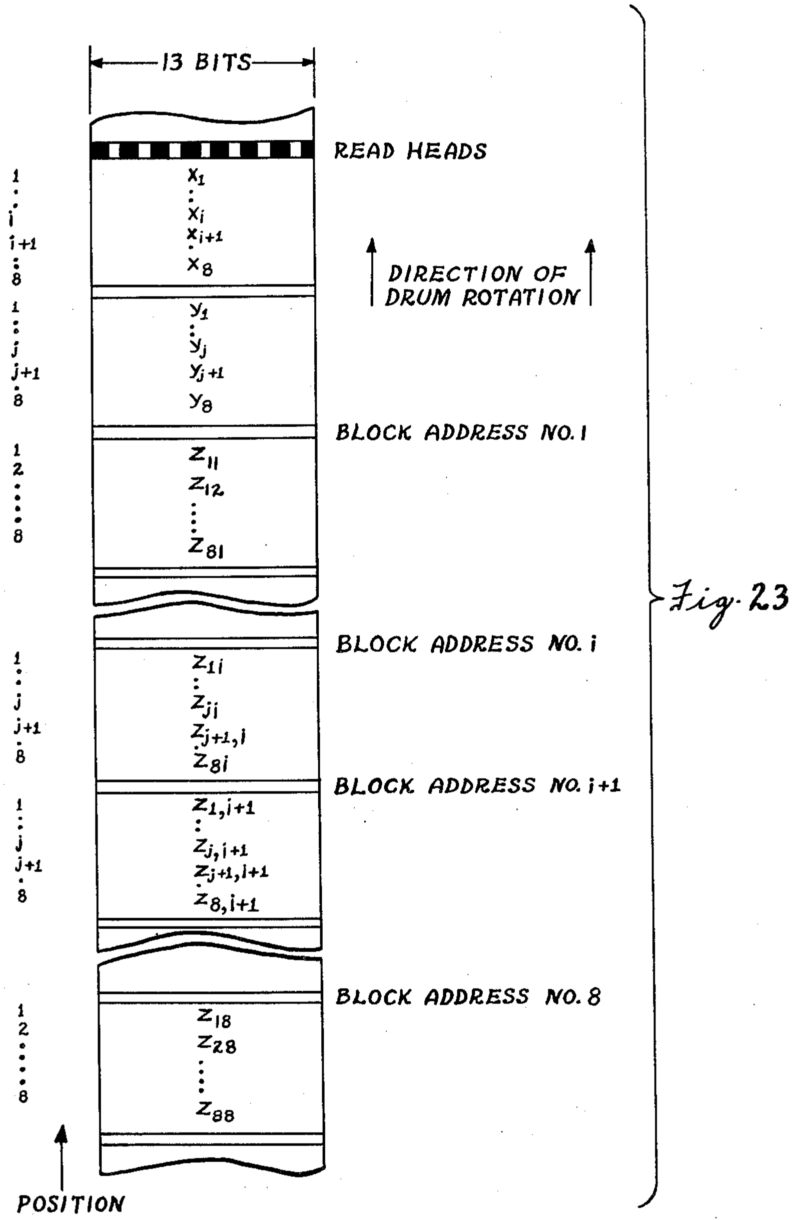
Figure 24:
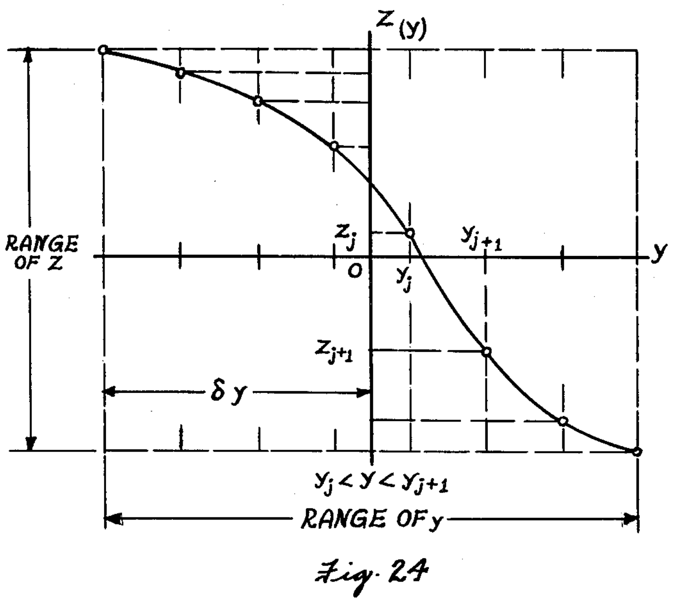
Figure 25:
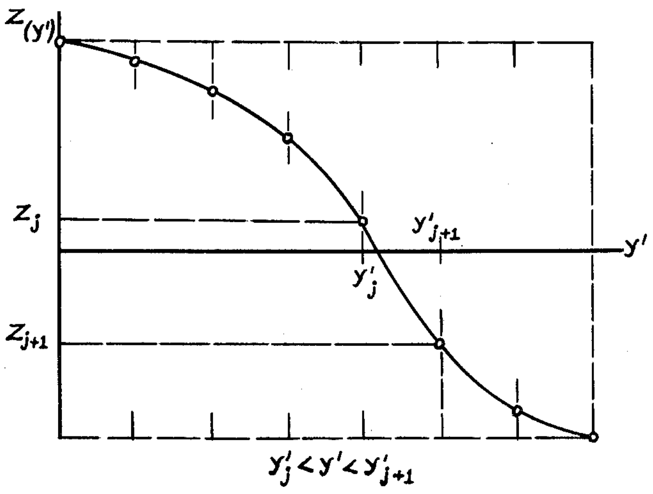
Figure 26A:
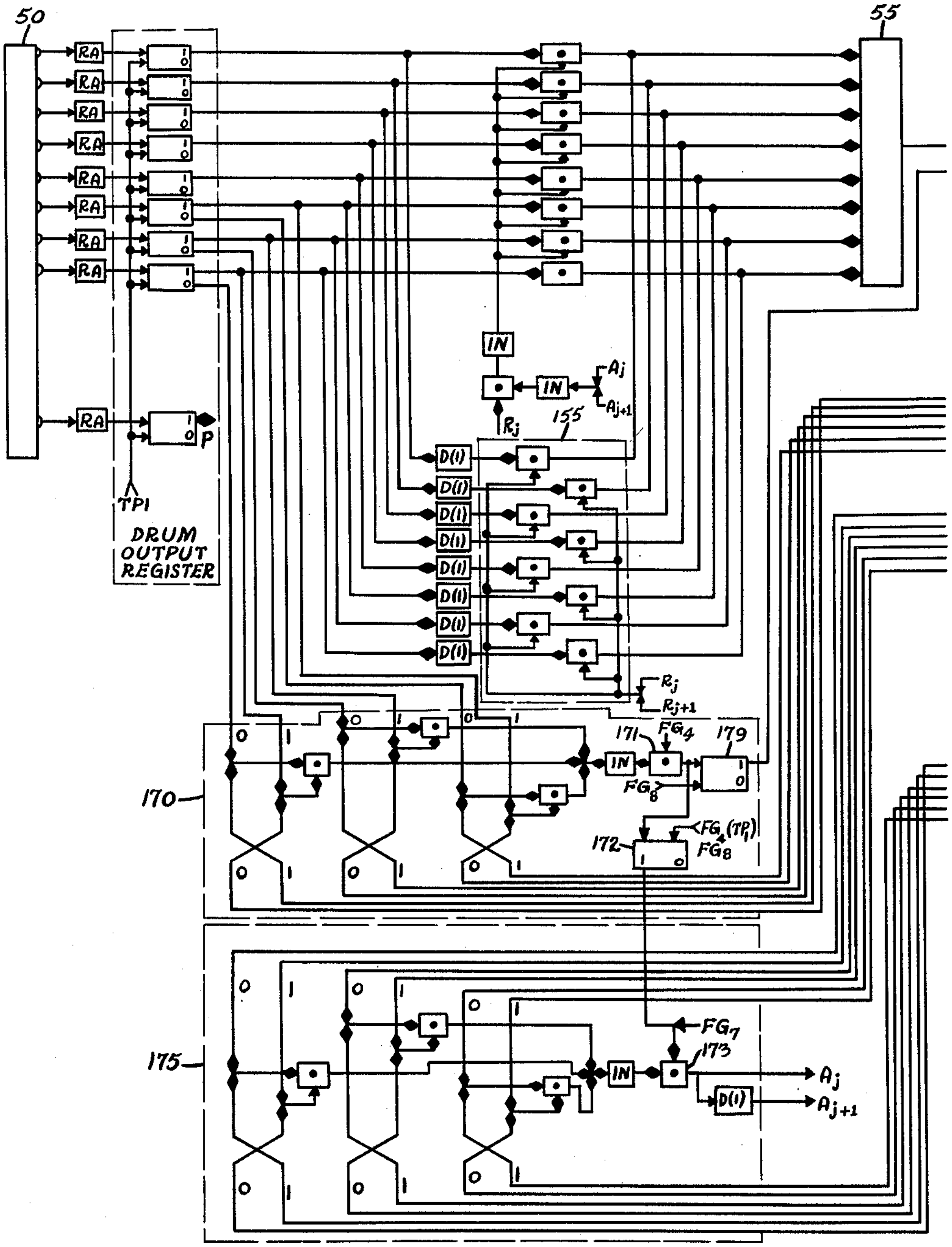
Figure 26B:
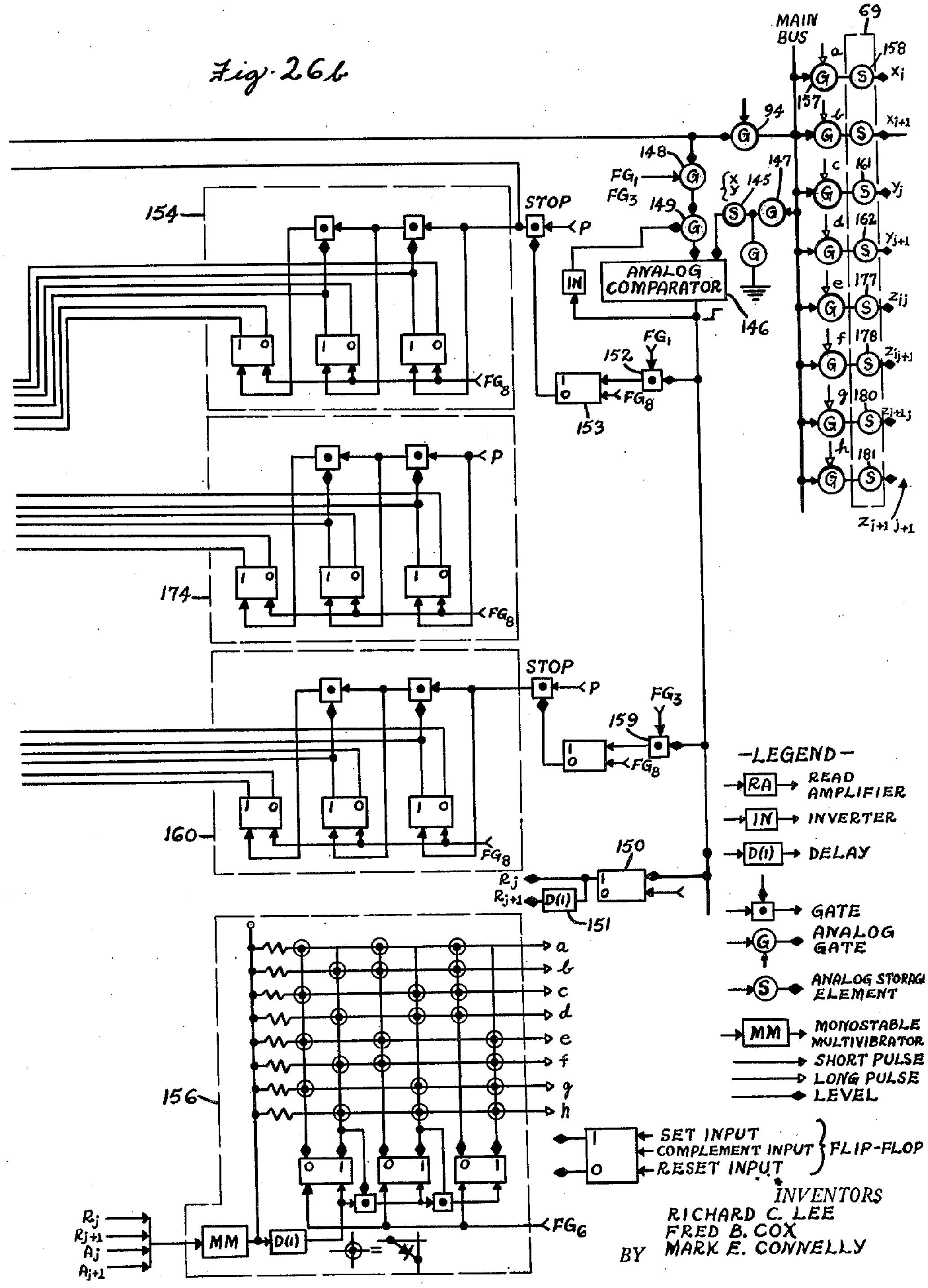
Figure 27:
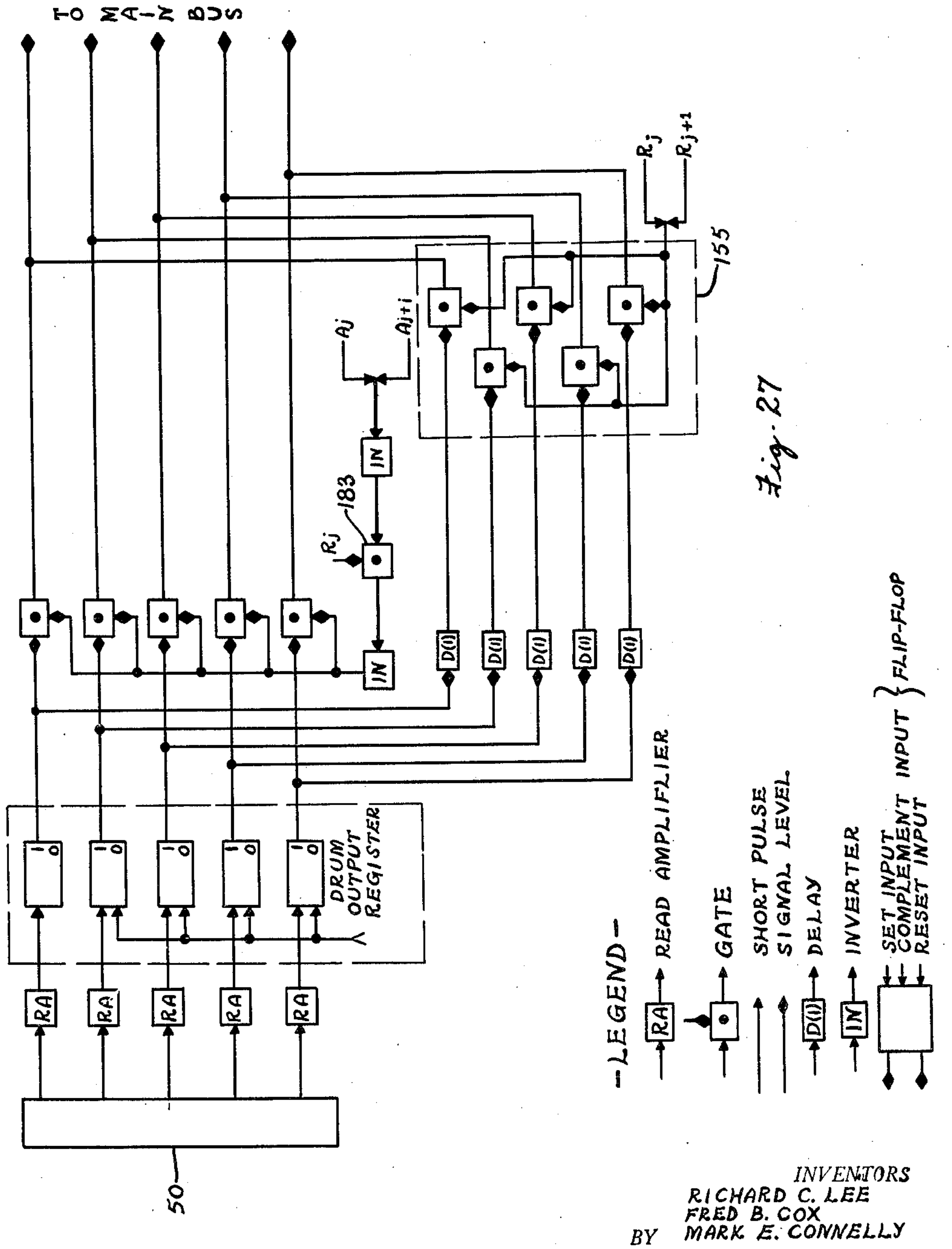
Figure 28A:
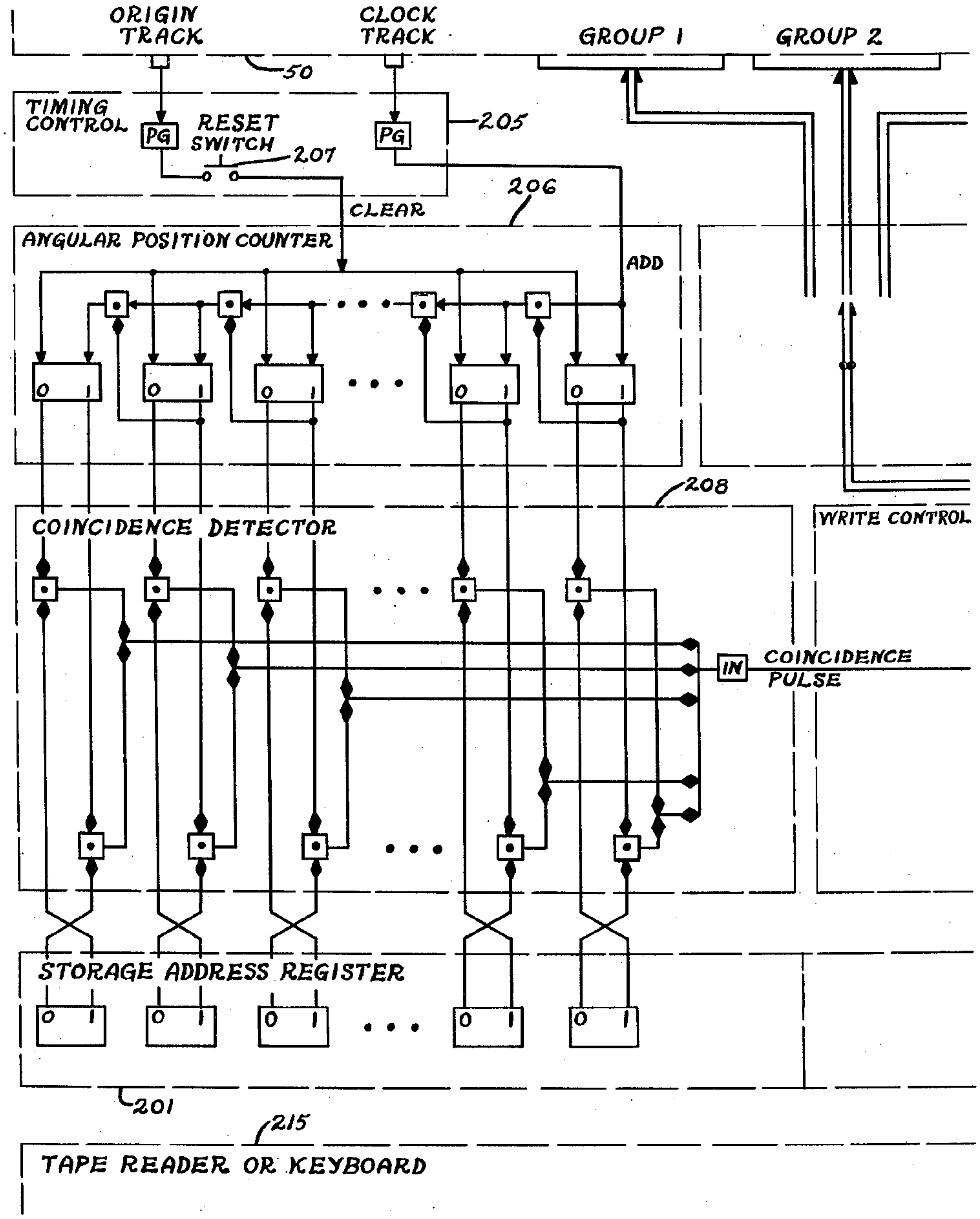
Figure 28B:
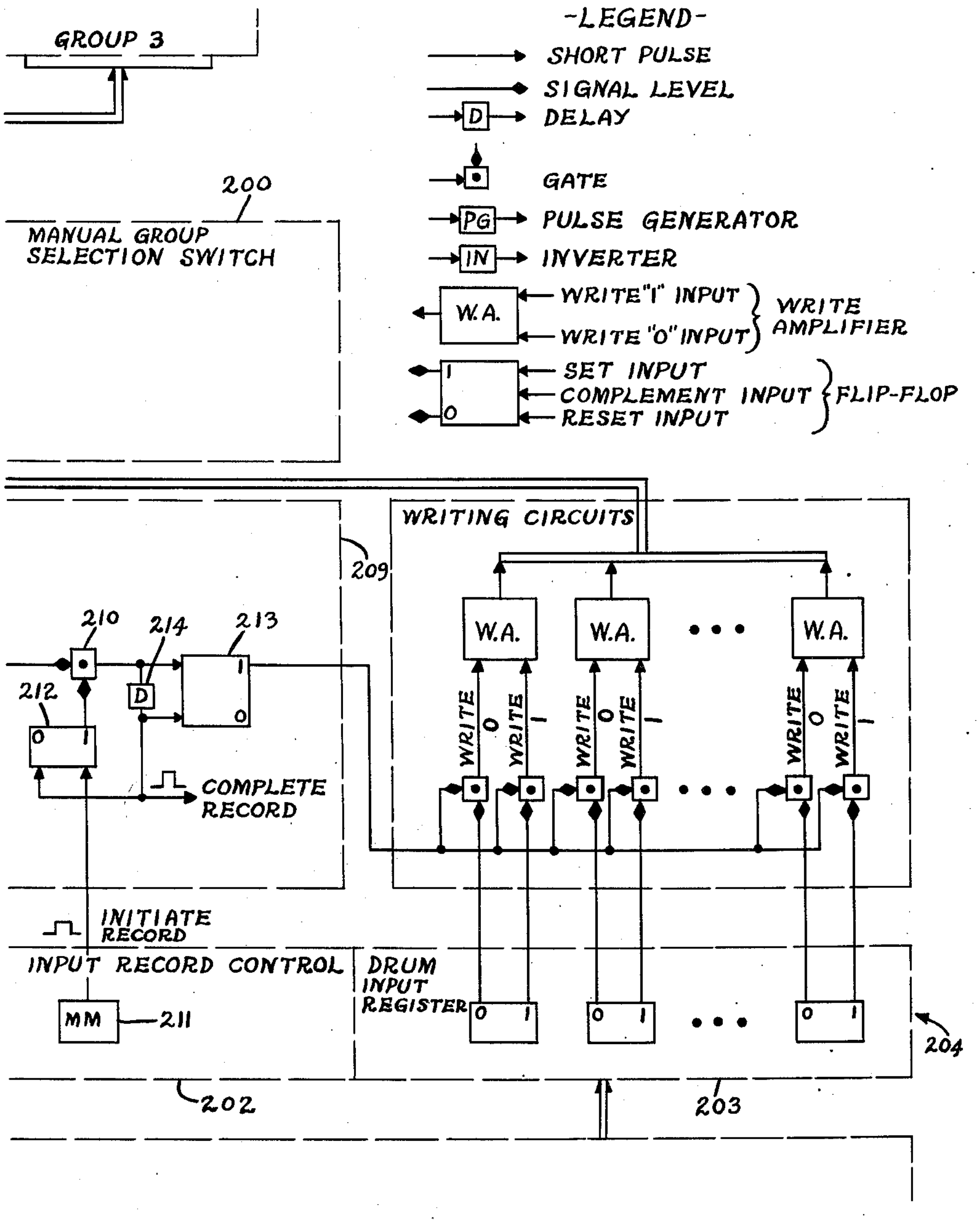
Figure 29:
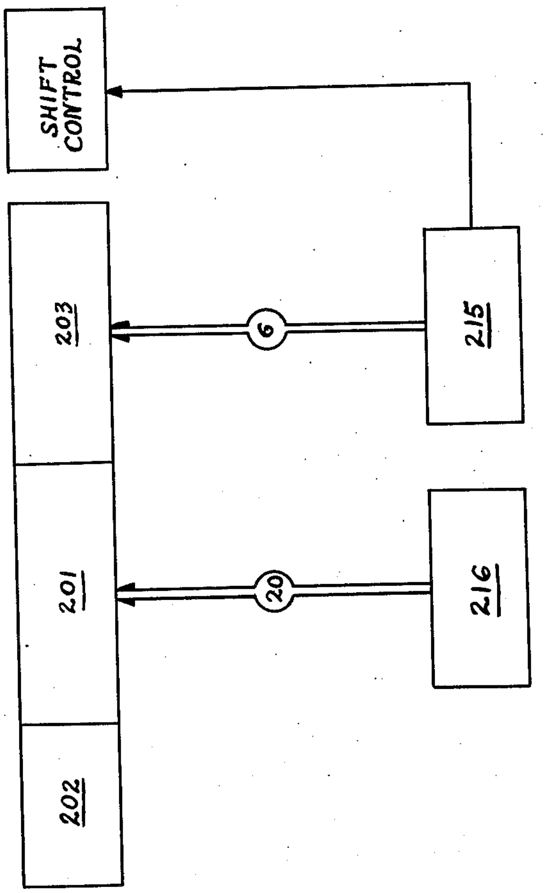
Figure 30:
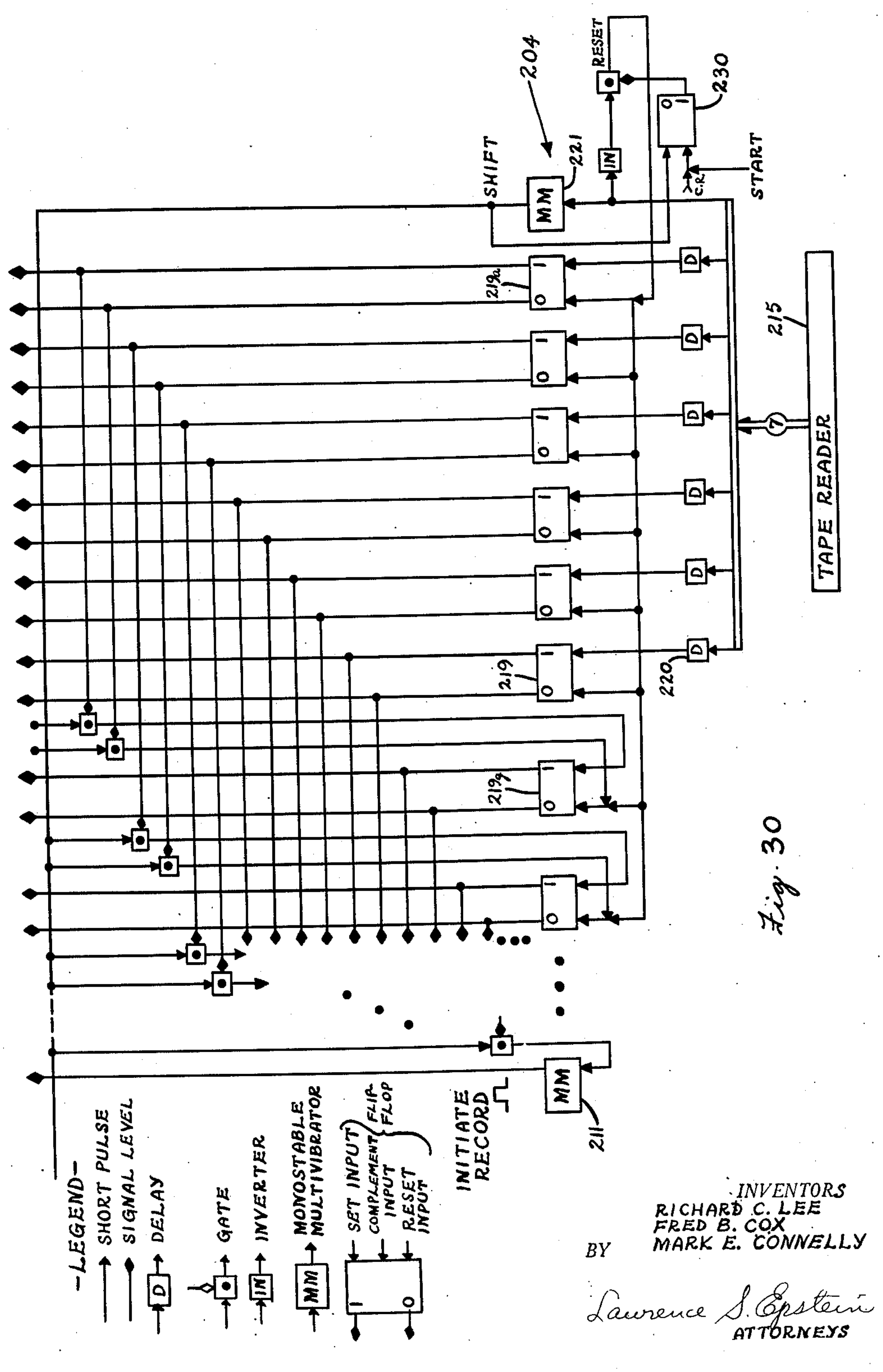
Figure 31:
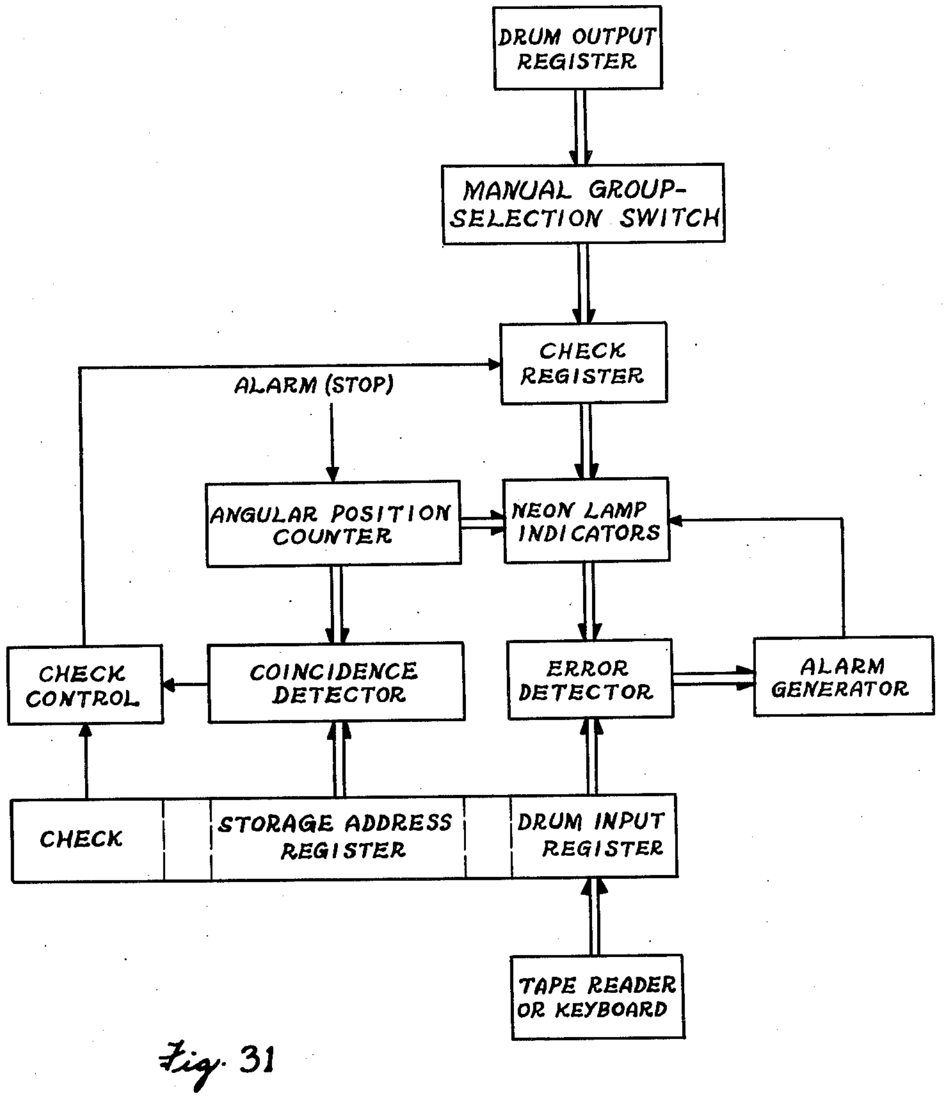
Figure 32A:
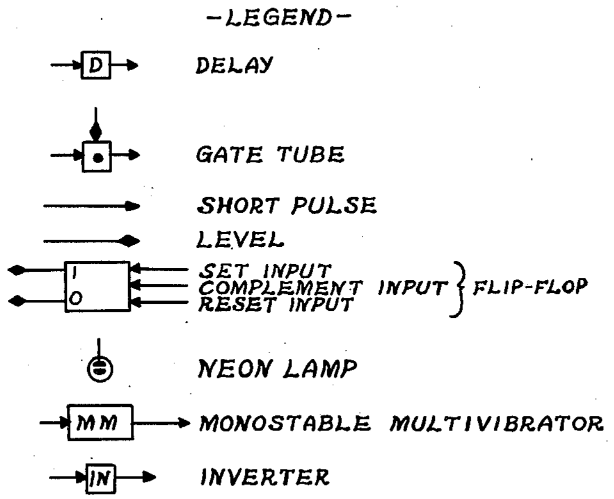
Figure 32A:
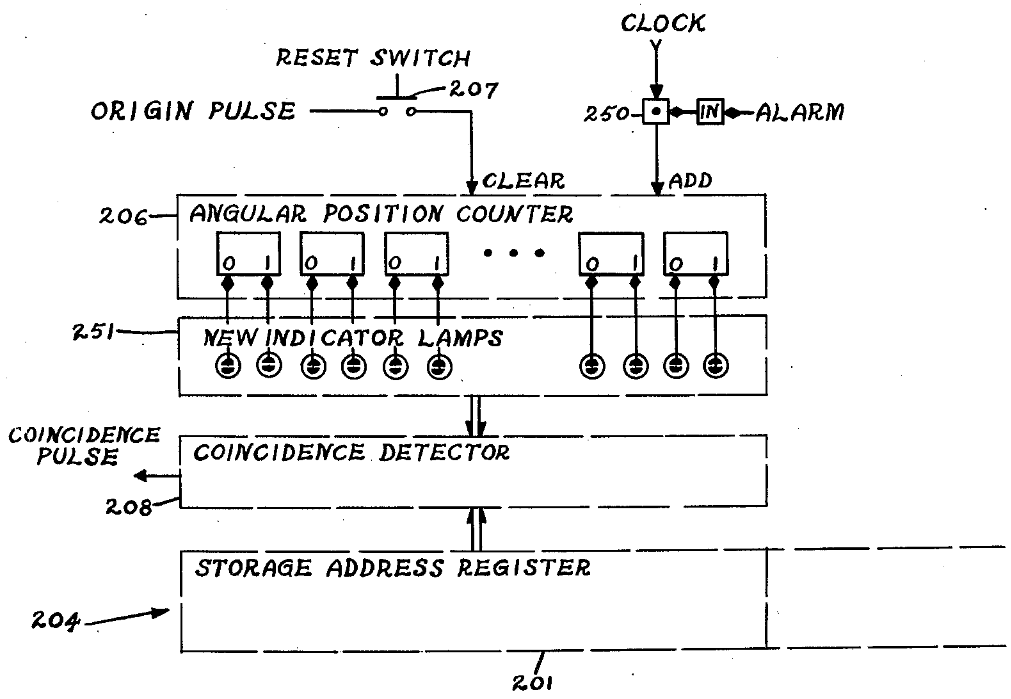
Figure 32B:
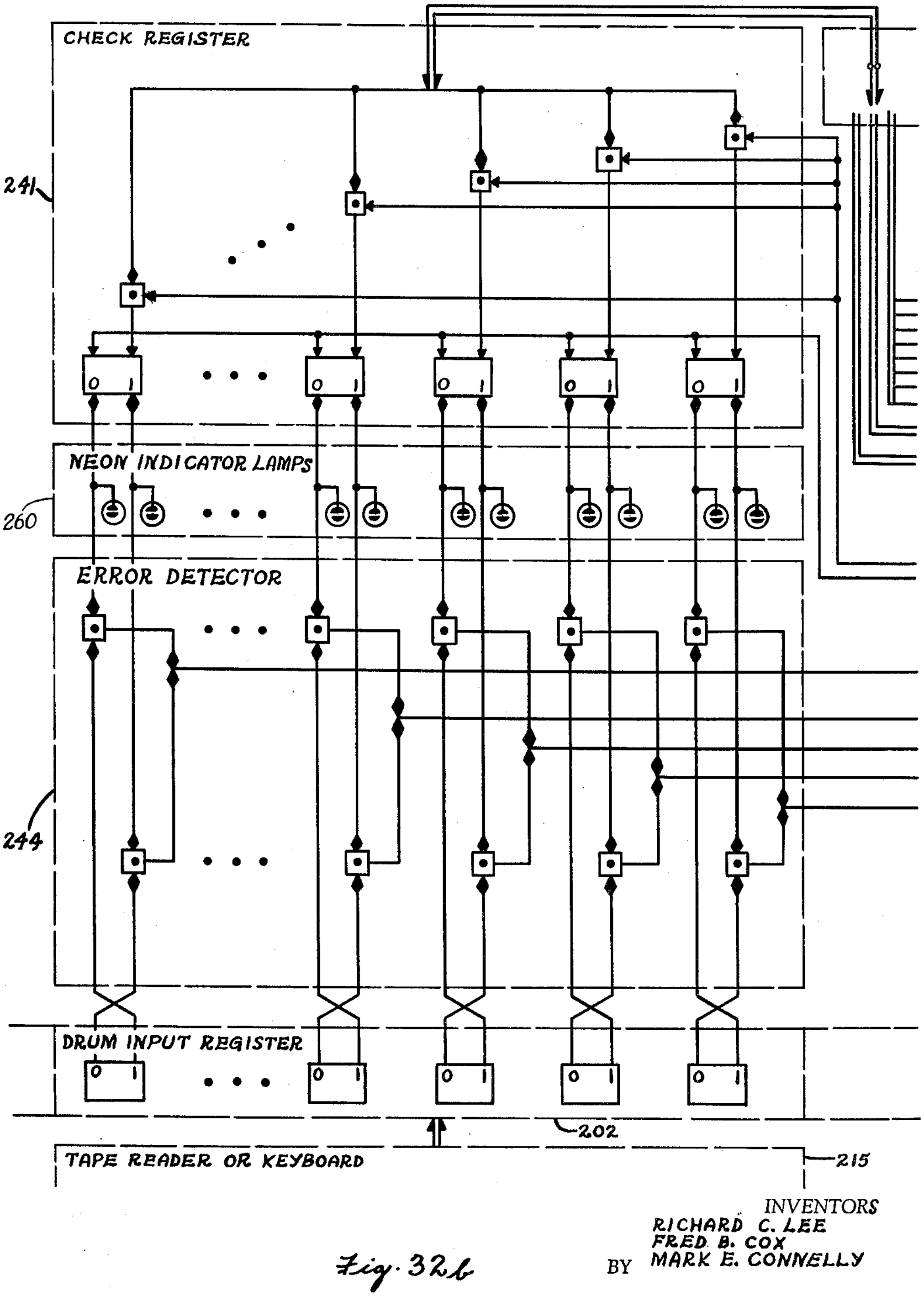
Figure 32C:
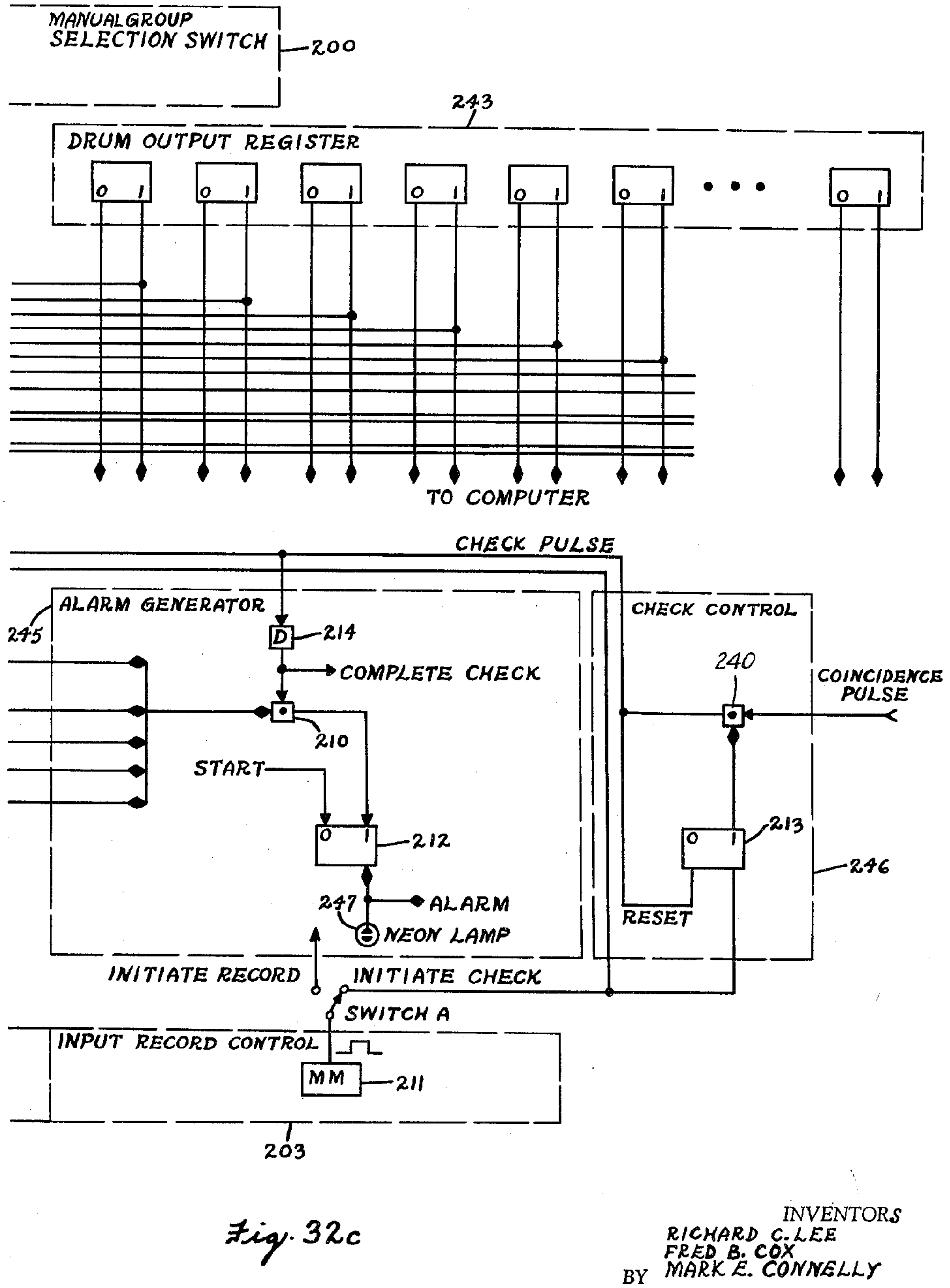

FIGURE 5, consisting of FIGS. 5*a* and 5*b*, is the analog arithmetic element of the instant invention, FIGURE 6 is the multiplier output circuit of the instant invention, FIGURE 7 is the divider output circuit of the instant invention, FIGURE 8 shows the input-output characteristic of an absolute value circuit of the instant invention, FIGURE 9 is the adder output circuit of the instant invention, FIGURE 10 is the analog integrator circuit of the instant invention, FIGURE 11 shows the digital system of the instant invention, FIGURE 12 indicates the symbols of logical components used in the instant invention, FIGURE 13 shows high-speed addition logic used in the instant invention, FIGURES 14*a*, 14*b* and 14*c* are the accumulator used in the instant invention, FIGURE 15 shows the block diagram of the magnetic core memory used in the instant invention, FIGURE 16 depicts a magnetic core and its typical characteristic used in the instant invention, FIGURE 17 is a section of magnetic core memory array used in the instant invention, FIGURE 18 is a memory timing diagram for the instant invention, FIGURE 19 shows the logical circuitry of the digital system for the instant invention, FIGURE 20 is a digital transfer timing diagram, FIGURE 21 is a typical function of two variables, FIGURE 22 shows the linear interpolation technique for generating a function of two variables, FIGURE 23 indicates the data storage on the magnetic drum for function generation, FIGURE 24 shows a typical single variable function, FIGURE 25 shows graphically a translation of a function, FIGURE 26, consisting of FIGS 26*a* and 26*b*, indicates the time-selection of data for function generation, FIGURE 27 indicates the time-selection of exponent and sign for function generation, FIGURE 28, consisting of FIGS. 28*a* and 28*b*, is the logical circuitry for write control for the instant invention, FIGURE 29 is the block diagram of drum input register for the instant invention, FIGURE 30 is the logical circuitry of drum input register for the instant invention, FIGURE 31 is the block diagram of circuitry for checking stored information on the invention's magnetic drum, and FIGURE 32, consisting of FIGS. 32*a*, 32*b* and 32*c*, is the logical circuitry for checking stored information on the magnetic drum.

The computer must be capable of solving complex non-linear differential equations in real time. High-speed computation is therefore required and is performed in a combined analog-digital domain. The program and data, however, are stored in digital form on a magnetic drum.

Quantities are represented by an analog voltage and a digital number. However, the analog voltage is not a continuous time function, but a pulse, whose amplitude represents the machine units of the variable. The digital number represents the scale factor associated with the machine variable. This may be understood with reference to the following transformation equation.

$$Y=Ay$$

where $Y$=true units
$y$=machine units
$A$=scale factor

The scale factor of the variable $y$ is chosen so that $$A \geqslant \text{maximum expected value of } /Y/$$

since the machine units $$/y/ \leqslant 1$$

Thus, the range of machine units is zero to one. Now, let the scale factor be $$A=10^x$$

The amplitude modulated pulse represents $y$ machine units. The digital number is the binary representation of the exponent $x$. Also, since all machine voltages are positive, a digital sign bit is used.

Figure 1:
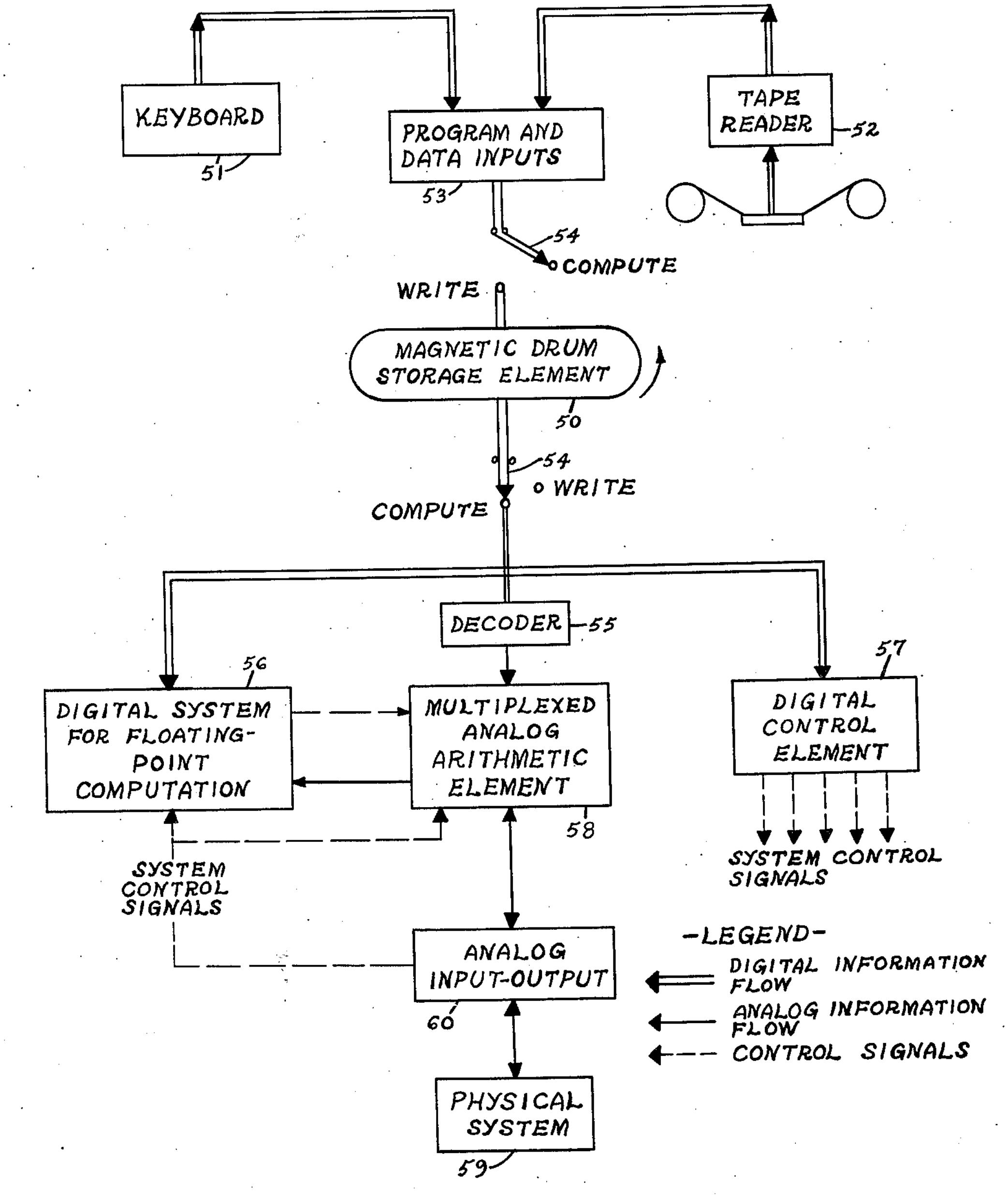
FIGURE 1 is a system block diagram of the instant invention.

Referring to FIGURE 1, the computer system block diagram is shown. In this, the preferred form of the invention, a magnetic drum storage element 50 is coupled to a keyboard input device 51 and a tape read in device 52 through a program and data input encoding device 53. Switches 54 operates to place the system in either the write or compute mode. A digital decoder 55 receives the data from the drum 50 and operates on a portion of that digital data. Also, coupled to the drum 50 output are the digital computing element 56 and digital control 57. At the output of the decoder 55 is an analog computing element 58 which operates in conjunction with the digital computing element as will be described presently. A physical system 59, preferably an operational flight trainer, is coupled through an analog encoding and decoding device 60 to the analog computing element 58. The outputs from the digital control element 57 are fed to the digital computing element 56, the analog computing element 58 and the analog encoding and decoding element 60 and control their respective operations.

High-speed analog components in the multiplexed analog arithmetic element 58 are time-shared, except for separate analog integrators. This time-sharing of components results in a major saving in equipment. The operations in the analog arithmetic element 58 are performed in time sequence. At the same time, operations are performed in the digital system 56 on the associated scale factors. These operations are performed in the same time sequence. The digital control element 57 provides signals to control the operations simultaneously on both analog and digital data. The inputs of the computer are analog voltages that originate from transducers in the physical system 59 and measure physical quantities. When the switches 54 shown are in the Compute position, the magnetic drum storage system 50 provides data in the required sequence to the analog and digital parts of the system. Also, the program for the solution of a problem is stored in the magnetic drum 50 and instructions are fed to the digital control element 57. These instructions generate the required control signals at the proper time.

The program and data are stored in the magnetic drum 50 before computation begins. The data in digital form is read from the magnetic drum 50. For input to the analog arithmetic element 58, the digital data is decoded into an analog voltage. For input to the digital system 56, the data is fed directly in digital form. Information to be written on the drum can be accepted from both automatic (tape reader 52) or manual (keyboard 51) inputs. For the tape reader 52, it is necessary only to feed a new tape into the input system of the magnetic storage device to change the entire problem.

The operations that the computer must perform are: addition, subtraction, multiplication, division, integration, trigonometric resolution, and function generation. The analog and digital systems must perform simultaneously in the course of a given mathematical operation. As shown in the system block diagram of FIGURE 1, information is transferred between the analog 58 to the digital system 56. This information describes the range of voltages in which the present machine variable lies. Control signals are sent from the digital system 56 to the analog system 58 to scale the analog voltage into an optimum range for increased dynamic range of the system. This digital control of analog computation with time-shared components is an entirely new concept.

The principle of operation of the multiplexed analog arithmetic element 58 is as follows: A given piece of analog information is transferred on a single bus as an amplitude modulated voltage pulse. These pulses allow all operations except integration to be performed in time-shared analog components. The various operations are executed one at a time, under the control of the digitally-stored program. The digital control element 57 enables and disables analog gates that transfer the analog pulses to the proper destination. Partial results obtained during the solution of the problem are stored in an analog storage device.

The digital system also transfers information over a main bus in parallel binary form. The digital system 56 performs operations on the exponent and sign of each machine variable. In general it must be capable of adding, subtracting and comparing two digital words. A number of other functions, such as storage and transferring the digital data, are required.

Because of the large dynamic range of the variables, the floating point feature will be included to automatically scale the analog machine variables to an optimum range of values, during the computation. The floating point system operates as follows. Assume all machine variables lie between zero and one, and that the prescribed optimum range of the machine variables is between one-tenth and one. The problem is then to scale all variables to lie within this range. Naturally, some variables at the end of a mathematical operation will extend beyond this optimum range. It is then possible to sense that the variable is not in this range and then to scale the voltage to lie in the optimum range. The new scale factor of the machine variable must then be stored.

The scale factors of all machine variables will be in powers of ten. Suppose that a voltage does not lie in the optimum range one-tenth to one. In this case, the present range of the voltage must first be determined. The second step is to multiply the voltage by the proper power of ten so that the machine variable lies in the optimum range. The third step is to correct the original scale factor associated with the machine variable and store the new scale factor (i.e. power of ten) as a digital number. Thus, the representation of a variable in the computer will be the amplitude of analog voltage and digital number corresponding to its scale factor.

Using the above method of automatic scale factor correction, it is possible to handle optimum quantities in the machine. Thus one of the major limitations of analog computers, namely the small dynamic range, can be overcome. The floating point system should result in more effective use of the analog components, by constraining all machine variables to lie within the most desirable operating range.

Special digital equipment is necessary for function generation. The operation of generating an arbitrary function of one or more variables will be accomplished by storing discrete values of the function on a magnetic drum and performing linear interpolation to obtain an approximation to the given function. The special digital equipment will be used to read out the proper discrete values of the function. The arithmetic element 56 will then be used in the usual manner to perform the interpolation.

A magnetic drum 50 used in the following manner provides a unique combination of factors: large capacity storage, rapid access time, and low cost per bit of information stored. Because of these desirable characteristics, a magnetic drum has been chosen for this application. All data and instructions will be written on the drum before the computation begins (i.e., no information will be written on the drum during the solution of the problem). The data is written on the drum in exactly the sequence that the computer will require it.

Since magnetic drums are available that have a large storage capacity as compared with other digital storage elements such as electrostatic cathode ray tubes, delay lines, and magnetic cores, and since the cost per bit stored is small, the magnetic drum is a reasonable choice for the information storage device for this application.

A method of writing on the drum must be considered. It is desirable to be able to write large amounts of data on the drum rapidly, since it might be necessary to change the complete set of aerodynamic equations for a new aircraft. Also, it is desirable to be able to change individual words easily, hence a manual keyboard may be necessary. For example, the manual method would be used when a change of one aerodynamic coefficient is to be made. The input controls for the automatic and manual insertion of information into the magnetic drum will be described in detail later.

The digital system 56 also requires a high-speed, random-access, small capacity memory. Since magnetic cores have these features and are relatively inexpensive and extremely reliable, a magnetic core memory will be used. The purpose of this memory is to store the scale factors of each machine variable.

The present computer is a synchronous machine. Therefore, some means must be provided to control the sequence of operations. The stored program on the magnetic drum determines this sequence. Instructions stored on the drum 50 are transferred to the digital control element 57 and generate signals to operate high-speed analog gates for control of the analog arithmetic element 58. At the same time, the same instructions produce signals to operate digital gates for control of the digital system 56. Timing information is also read from the magnetic drum 50 into the digital control element 57 to produce two synchronized timing signals. The first is the main timing signals that are used to synchronize analog operations. The second is eight times the frequency of the first and is used to synchronize digital operations. Two clock frequencies are needed, because a number of digital operations are required for each analog operation.

Figure 2:
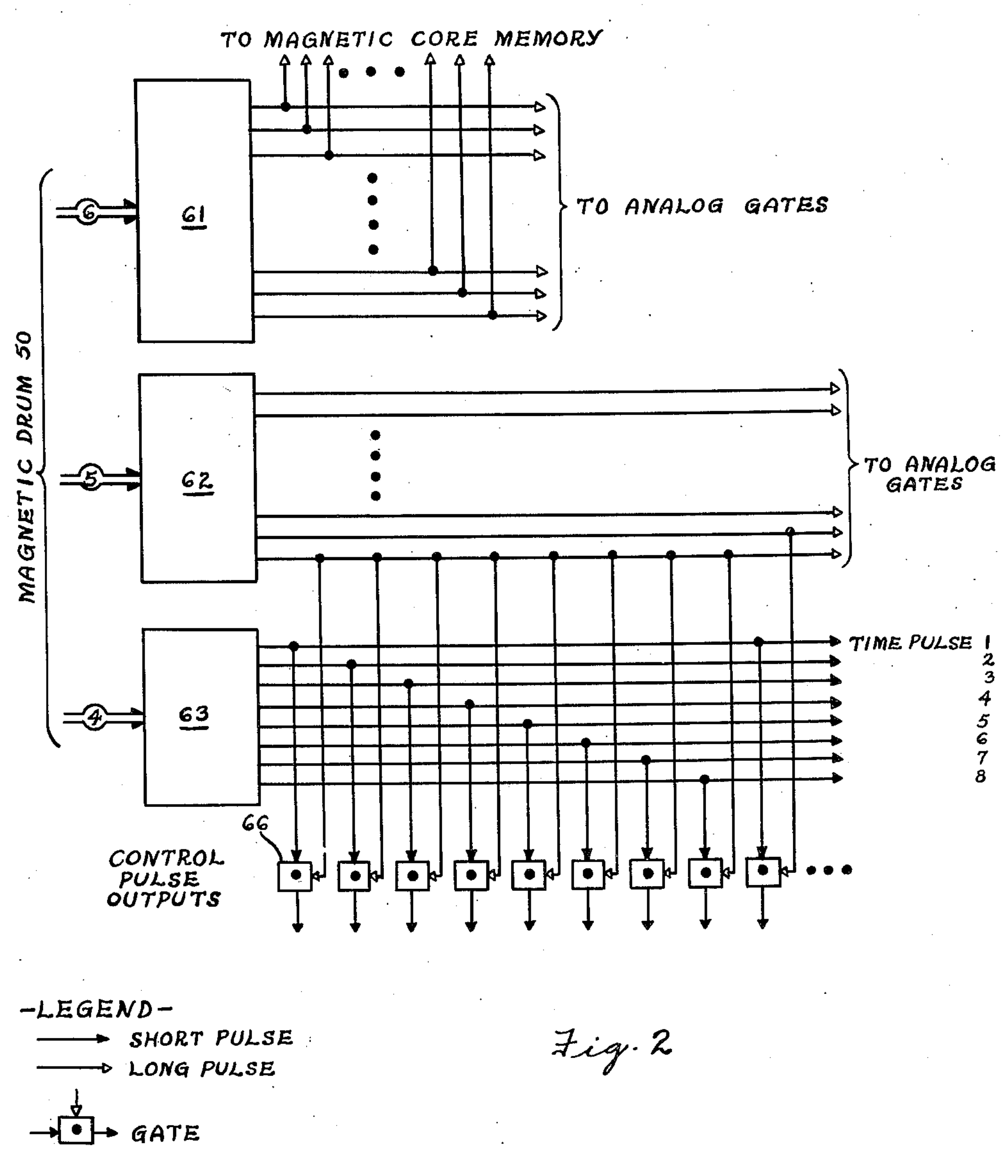
FIGURE 2 depicts the digital control element of the instant invention.

The digital control element 57 is shown in FIGURE 2 and performs various functions. Its overall function is to control all operations simultaneously on analog and digital data, as determined by a stored program on the magnetic drum 50. In addition, the digital control element 57 supplies timing pulses to all part of the system by reading clock tracks on the magnetic drum 50 and distributing the pulses to their proper destinations.

As is apparent from FIGURE 2, an address control matrix 61, an operations control matrix 62 and a time pulse distributor 63, all receive inputs from the magnetic drum 50. Two instruction words from the drum 50 output are fed to the two control matrices 61 and 62 for simultaneous control of all operations on the analog and digital data. The reason that two control matrices are used in this embodiment instead of one is the following. Analog information in the computer is transferred from analog storage to a computing element or from a computing element to storage. Consider first the transfer of analog information from analog storage to an analog computing element. In the digital system, this corresponds to the transfer of the associated exponent and sign of the machine variable from storage to a single digital accumulator. Thus, one control matrix, i.e. address control matrix 61 is used to specify both the origin of the analog data transferred to a main bus and the associated address of the digital data to be taken from storage. A second matrix, operations control matrix 62, is used to specify both the destination of the analog data transferred from the main analog bus and the destination of the digital data.

Consider next the transfer of analog information from a computing element to storage. In the digital system, this corresponds to the transfer of the associated exponent and sign of the machine variable from a single accumulator to storage. The operations control matrix 62 is used to specify both the origin of the analog data transferred to the main bus and the origin of the digital data. A second matrix, address control matrix 61, is used to specify both the destination of the analog data transferred from the main bus and the associated address of the digital data to be placed in storage. Thus, two control matrices are conveniently used in the computer.

A master clock which is the source of all pulses concerned with the timing of computer operations is derived from the magnetic drum 50 which is the source of all timing pulses. In this form of the invention the main clock track on the drum 50 has one clock pulse per register around the drum periphery. This clock track controls the timing of operations on the analog data. However, a high-frequency clock is needed to control the timing of the operations on the digital data, since a number of digital operations are required for each analog operation. In this embodiment, eight high-frequency clock pulses per main clock pulse are used. In other words, the high-frequency clock pulses are eight times the frequency of the main clock pulses. The two clocks are synchronized.

Four additional tracks on the drum are provided for the high-frequency clock. The pulses on each track are stored at twice the density of the main clock and are phased so that eight evenly spaced pulses may be read through an OR circuit during each main clock interval.

Figure 3:
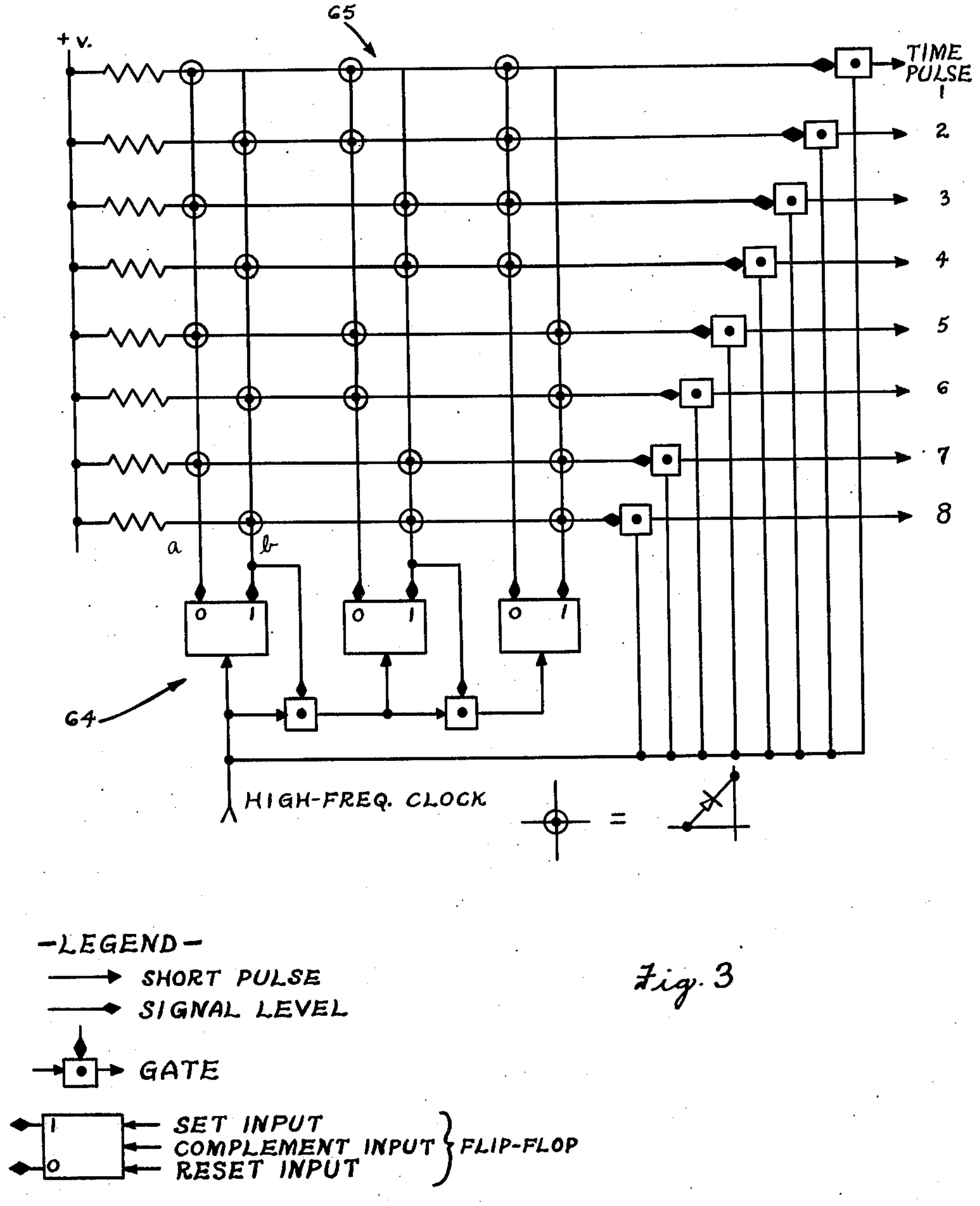
FIGURE 3 shows the time pulse distributor of the instant invention.

The high-frequency clock pulses which control operations on digital information must be transferred to the proper destinations. Therefore, the time pulse distributor 63 is needed to gate each of the eight high-frequency clock pulses onto a separate line. This time pulse distributor 63 is shown in FIGURE 3. The high-frequency clock pulses are fed to the input of a flip-flop counter 64. The number of selections that can be made from an $n$ digit binary number is $2n$. Therefore, for eight output lines a three bit counter 64 is needed. The outputs of the flip-flop counter 64 feed the input of a rectangular diode matrix 65. As the counter counts from one to eight, each counter output line in turn is energized. The output lines are then sampled at the high-frequency clock rate, so that the eight timing pulses appear in consecutive order on the output lines. In other words, if the counter is in the state 000, the line "*a*" in the circuit is energized. The next clock pulse passes through the gate associated with line "*a*" and appears at the output as timing pulse 1. The same pulse also sets the counter 64 to state 001, so that line "*b*" is energized. The remaining clock pulses are gated in a similar manner to separate lines until the cycle repeats when the counter 64 again reaches the state 000.

The operations control matrix 62 is a multiple-output switching circuit whose function is to receive instruction words from the magnetic drum 50 and to supply control pulses on separate output lines. The operations control matrix 62 performs two functions simultaneously: (1) in conjunction with the time pulse distributor 63, it specifies and control all operations on digital data; (2) by enabling the proper gates, it specifies the destination of analog data to be transferred from storage to an analog computing element and the origin of data to be transferred from an analog computing element to storage.

Information is read from an instruction channel, i.e. a group of tracks, on the magnetic drum to a drum out put register (not shown). In this embodiment, this instruction channel consists of five tracks. Five associated flip-flops of the drum output register are the inputs to the operations control matrix 62. A five bit binary number yields thirty-two possible selections, so that thirty-two output lines are possible.

The address control matrix 61 is also a selection circuit which, in this embodiment, receives information from a six-track instruction channel on the drum. This matrix provides the remaining control functions for the computer: (1) it specifies the address of digital data in the magnetic core storage and actually selects the registers to be read from or written into; (2) by enabling the proper gates, it specifies the origin of analog data to be transferred from storage to an analog computing element and the destination of data to be transferred from an analog computing element to storage.

The aforesaid six bit words in the instruction channel are read from the drum to the drum output register. The outputs thus energize the address control matrix 61. For a six bit input word, sixty-four selections are possible, so that there are sixty-four possible outputs from the address control matrix 61. It should be noted that fewer outputs will probably be required, depending upon the complexity of the problem.

FIGURE 2 shows the time pulse distributor 63 combined with the operations control matrix 62 performs various computer processes. The outputs of the time pulse distributor 63 are combined with the outputs of the operations control matrix 62 in the control pulse output gates 66. For example, assume that an instruction from the drum 50 is decoded into an output on line $n$ of the operations control matrix 66. This output line immediately energizes the proper analog gates to control the analog information. At the same time, line $n$ is fed to the control pulse output gates 66 to control digital operations. So that a number of digital operations can be performed during the given instruction, the other inputs to the control pulse output gates 66 are the high-frequency pulse outputs from the time pulse distributor 63. Thus, the time pulse distributor 63 sends high-frequency timing pulses to various parts of the digital system, as determined by the particular decoded instruction in the operations control matrix 62. The control pulse outputs, therefore, supply timing pulses in sequence to perform the necessary digital operations for a single instruction. In a similar manner, a second instruction is decoded into an output on line $y$. This putout controls the proper analog gates, and in conjunction with the time pulse distributor 63, controls the digital operations. Thus, different instructions have different time-pulse patterns to perform the necessary digital operations.

At the same time, a separate instruction channel on the drum 50 supplies an instruction to the address control matrix 61. For example, assume that an instruction is read from the drum, decoded into an output on line $z$ of the address control matrix 61. This output line immediately energizes the proper analog gates for the transfer of analog information. Also, line $z$ addresses and selects a location in a magnetic core memory for storing or selecting from storage the exponent and sign of the machine variable. This latter feature will be covered in detail later.

It should be noted that any combination of instructions can be used to energize the address control matrix 61 and the operations control matrix 62, as needed for the program. Thus, the number of different instructions needed for the computer is reduced to a great extent.

The magnetic drum storage device 50 is the central element of the computer. Both the actual data and the program are stored on the drum. As previously stated, the drum also supplies timing pulses for all parts of the system. The magnetic drum is used in the following manner. No information is written on the drum during the solution of a problem. All data and instructions are written before computation begins. The writing of information of the drum, which is described later, involves both time- and space-selection. Reading information from the drum, however, involves neither time- nor space-selection. To obtain rapid access time, all information is read out in the order in which the information is stored on the drum. In other words, the information is written on the drum in exactly the same sequence as the computer requires it. This last statement is true except for the storing of discrete points for function generation as will also be explained later. In this case, a time selection must be made.

In general use, the access time of a magnetic drum may be as great as the rotation period. If however, the data is read out in sequence with no time selection, and in parallel form, the access time will be equal to $$\text{Access time}=\frac{1}{R}=\frac{1}{VC}\text{ seconds}$$

where $R$=scanning rate in digital cells per second
$V$=drum surface velocity in unit length of track per second
$C$=digital cells per unit length of track The access time for the drum in this case is therefore equal to the time required to scan one digital cell. Consequently, the access time of a magnetic drum used in this manner is comparable to the random acecss time of the fastest magnetic core memories that are available at the present time.

Each position in the memory occupied by a word is designated by a number called an address. The address is used only for the recording operation. For the reading operation, no address is necessary, since all data are read out in sequence.

Figure 4:
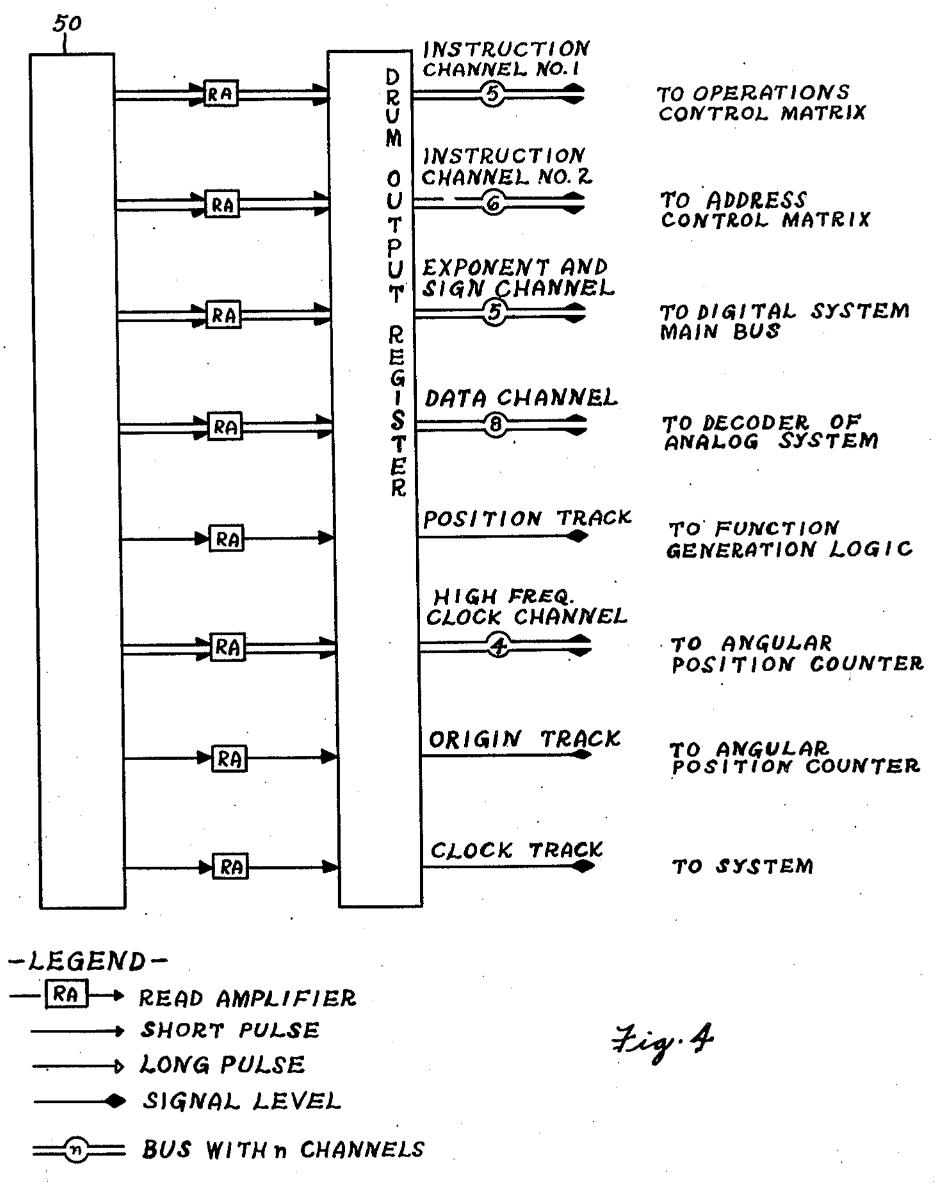
FIGURE 4 shows the drum output channels of the instant invention.

In this form of the invention information is stored on the drum in parallel rather than in serial form. Therefore, a group of tracks, hereafter referred to as a channel, is needed to store a word of more than one bit. One read-head is used per track. The physical storage of information on the magnetic drum surface can be understood by reference to FIGURE 4. The first track in the figure is the clock track. The clock track output from the read-head is fed to a read-amplifier. The read-amplifier which actually consists of an amplifier and wave-shaping circuit, operates continuously on the signal from the read-head. The output of the clock track read-amplifier is fed to the drum output register, a set of flip-flops for buffer storage. Likewise, outputs from all other read-amplifiers are fed to the drum output register. The output of the clock track flip-flop in the drum output register is fed to all parts of the computer, since the clock track provides the main timing pulses for the system. The next track shown is the origin track which produces one pulse at the beginning of each drum revolution. Its function is to insure that an angular position counter bears the proper relationship to the true angular position of the drum. The next group of four tracks is used to generate a high-frequency clock signal, eight times the frequency of the main clock. These high frequency timing pulses are used to control the digital operations, because a number of digital operations will have to be performed during one instruction. To obtain the high-frequency clock in this embodiment, twice the storage density is used on each of four tracks. The recorded pulses of each of the four tracks are then phased in such a way that when the output of the four tracks are fed to an OR circuit, the output is eight times the frequency of the main clock. This output signal is fed to the time pulse distributor 63. Pulses from the position track are used in the special digital logic for function generation. This function generation will be described completely later. A time-selection scheme is necessary to select the discrete values of a function stored on the drum to perform linear interpolation for an arbitrary function of one and two variables. One position pulse is stored on the drum for each breakpoint and discrete value of the function.

In this embodiment, eight binary bits are sufficient to describe the data (excluding scale factor) to be stored on the magnetic drum 50. Therefore, eight data tracks are used. The outputs of the corresponding flip-flops in the drum output register are fed to a digital-to-analog decoder. The output of the decoder is then sampled at the proper time to transfer the decoded data, now in analog form, to the main bus of the analog arithmetic element 58. Also associated with each analog machine variable is a sign bit and a digital exponent corresponding to its scale factor. Therefore, data stored on the drum must also have stored a corresponding exponent and sign. Four binary bits are used for the exponent and one binary bit for the sign. Therefore, five tracks are needed. The output of the corresponding flip-flops in the drum output register is fed to digital gates connected to the main bus in the digital system 56. The parallel digital word is sampled and fed either to an accumulator or to a magnetic core memory as will be described forthcoming.

Two instruction channels are used to control simultaneous operations on digital and analog data. The first instruction channel consists of five tracks. The outputs of the drum output register associated with these five tracks are fed to the operations control matrix 62. A second instruction channel consists of six tracks. These outputs are fed from the drum output register to the address control matrix 61. The functions of the two control matrices have been explained.

In the analog arithmetic element, information is represented by the amplitude of a short-duration voltage pulse. A given pulse is transferred over a single bus, and its origin and destination are determined by the digital control element 57. One operation is performed at a time. The operations control matrix 62 and the address control matrix 61 enable the proper analog gates to transfer the analog information.

It was mentioned earlier that a floating-point feature is included to automatically scale the analog machine variables to an optimum range during computation. Assuming that machine variables lie between zero and one, the optimum range is then defined as one-tenth to one. The problem them is to automatically scale all machine variables to lie within this range. Special units of the analog arithmetic element sense whether or not a machine voltage is in the optimum range. If a voltage is not within this prescribed optimum range, the units then scale the voltage to lie within the optimum range and also correct the digital exponent associated with the variable. Also, analog devices that are used for floating-point computation will be described. In addition, various functions of the digital system that are necessary will also be explained, but the detailed description of the entire digital system will be given later.

In this embodiment, fifteen ranges of an analog voltage corresponding to fifteen digital exponents will be used for scaling in the computer. Thus, the dynamic range of the variables in the machine is 1 to $10^{15}$. Since as was earlier mentioned, all machine units lie between 0 and 1, the problem arises how to represent quantities less than $0.1\times10^{-14}$ machine units. An analog voltage which is less than this figure will be considered as zero machine units by the computer and will be designated as such by a unique digital code. In other words, a coded number will be assigned to represent zero machine units, and this zero-code will be carried as an exponent 000. Thus, for the fifteen normal exponents and the zero-code, a four bit digital word will suffice. The manner in which the zero-code is handled will depend upon the particular arithmetic element involved, and this will be discussed when the particular arithmetic element is discussed.

Referring to FIGURE 5*a*, the block diagram is shown. Each element of the block diagram is connected off a main bus 67 and the operation and interrelationship of these elements will be explained in the order: storage units, multiplier and divider, adder and subtracter, data input device, integrators.

STORAGE UNITS

A temporary analog storage unit 68 is provided to store partial sums as the computation proceeds. For example, let the equation to be solved be $$Z=x_1y_1+x_2y_2+\ \ldots\ x_ny_n$$

After the product $x_1y_1$ is formed in a multiplier, the output of the multiplier is gated to the temporary storage unit 68. The product $x_2y_2$ is next computed in the multiplier and gated to one input of an adder. The quantity in the temporary storage unit 68 is gated on another input of the adder to form the sum $x_1y_1+x_2y_2$. The adder output is then transferred to temporary storage 68, and the above procedure is repeated until Z is obtained.

In addition to the temporary storage unit 68, eight analog storage units 69 are provided in this form of the invention. These storage units 69 store quantities during the function generation procedure to be explained later. The analog storage units 69 also store quantities that are calculated and needed later in the computation. It is desirable that these storage devices meeting the following specifications: (*a*) non-destructive read-out: (*b*) read-in and read-out times less than 10 microseconds. If the zero-code mentioned earlier is transferred to an analog storage device 69, it will be stored as a digital number in a magnetic core memory. When the storage unit output is sampled, the zero-code will automatically be read from the core memory. In this case, the value of the stored analog voltage is immaterial.

Storage devices 69 are also provided at the input of each arithmetic unit. The function of these storage units 69 is to temporarily store one analog input while the second analog voltage is being transferred to the other input.

MULTIPLIER AND DIVIDER

In FIGURE 5*b*, the multiplier 71 is shown also connected off the main bus 67. If the product *xy* is to be formed, the analog quantity *x* is sampled from a point in the machine by enabling a particular gate and transferred to the A input of the multiplier 71 by enabling the gate 72. Here the quantity *x* is stored in an analog storage device 70. The digital exponent associated with *x* (i.e., the digital number $x_e$) and the sign bit must also be transferred to a digital accumulator. The quantity *y* is then sampled and gated to the B input of the multiplier 71 in a similar manner. The digital exponent, $y_e$, and sign are also transferred to the digital accumulator. The analog multiplier 71 then forms the product *xy* at its output. Since the exponent of the product is equal to the sum of the exponents of *x* and *y*, the digital system 56 must form $$(xy)_e=x_e+y_e$$

The sign of the product is also determined by the digital system 56.

All inputs to the multiplier 71 are in the optimum range of one-tenth to one machine units. The output machine voltage may or may not be in the optimum range. FIGURE 6 illustrates that two ranges of the output are possible. Only two ranges are possible for the following reason. To form the product *xy*, the variable *x* must satisfy $$0.1\leq x\leq 1.0$$

where *x* is written in machine units. Also, the variable *y* must satisfy $$0.1\leq y\leq 1.0$$

The minimum quantity at the output of the multiplier 71 is therefore $$xy_{min}=0.01$$

Thus 0.01 machine unit is the minimum value of voltage at the multiplier 71 output. Also, the maximum quantity at the output of the multiplier 71 is $$xy_{max}=1.0$$

The maximum value is therefore one machine unit. Two ranges are therefore possible. The cross-hatched regions in FIGURE 6 are output ranges not possible. Therefore, correction of the output machine voltage to the optimum range requires a decision element to determine whether the output voltage is initially in the range 0.01 to 0.1 machine unit or 0.1 to 1.0 machine unit. The logic for the multiplier 71 output is also shown in FIGURE 6. The output voltage is fed to an analog comparator 72 which triggers when the input voltage is greater than 0.1 machine unit. The output of the comparator, denoted $F_m$, is fed through a digital gate 73 to the set input of a flip-flop 74. This is necessary since the digital system 56 samples the value $F_m$ at a particular time, and it is not desirable for this value to change thereafter. If the value did change after the digital system 56 sampled $F_m$, then the exponent would not be properly changed and an error would be made. Note that immediately before $F_m$ is sampled, the flip-flop 74 must be reset. The quantity $F_m$ is defined to be Zero and One as shown in FIGURE 6. If $F_m$ is Zero, the machine voltage must be multiplied by 10 as shown. Therefore, the gate 75 is enabled by the output $\overline{F_m}$ of the flip-flop 74 and the voltage is fed through an operational amplifier 76 of gain 10. If $F_m$ is One, the machine voltage must be multiplied by 1 as shown. The gate 77 is enabled by the output $F_m$ and the voltage is fed through the unity gain channel of the operational amplifier 76. If the main voltage is multiplied by ten, the digital exponent must also be corrected. This will be discussed later.

If the exponent of either input to the multiplier 71 is the zero-code, the digital system 56 automatically generates the zero-code as an output. Thus, the analog voltage produced by the multiplier 71 in this case is immaterial.

A separate analog divider 78 is provided for division of two analog voltages. To form the quotient $$\frac{x}{y}$$

the quantity *x* is first sampled and transferred to the A-input of the divider 78. The quantity *y* is next sampled and transferred to the B-input of the divider 78. The exponent and sign of the quantities are also transferred to the digital accumulator. The analog divider 78 then forms the quotient $$\frac{x}{y}$$

at its output. Since the exponent of the quotient of two numbers is equal to the difference in their exponents, the digital system 56 must perform the following subtraction:

$$\left(\frac{x}{y}\right)_e=x_e-y_e$$

The sign of the quotient is determined by the digital system 56.

Because all input voltages to the divider 78 are in the optimum range of one-tenth to one machine unit, the output voltage may lie in the range 0.1 to 10. This range extends outside the permissible machine voltage range of 0 to 1. Therefore, an internal fixed gain of 0.1 is inserted in the divider 78 so that the output voltage is 0.01 to 1.0 as shown in FIGURE 7.

Optimization of the divider 78 output voltage proceeds as follows. The output voltage is fed to an analog comparator 79 which triggers when the voltage is greater than 0.1 machine unit. $F_d$ designates the comparator 79 output as shown in FIGURE 7. This signal is fed through a digital gate 80 to the set input of the flip-flop 81. $F_d$ is equal to Zero or One depending upon the voltage range as shown in FIGURE 7. When $F_d$ equals Zero, the machine voltage must be multiplied by 10. Therefore, the gate 82 is enabled so that the voltage is fed through an operational amplifier with gain 10. When $F_d$ equals One, the machine voltage must be multiplied by 1, so that the gate 83 is enabled and the signal is fed through the unity gain channel of the same operational amplifier 84. The digital exponent of the quotient must also be corrected for the internal gain of 0.1 of the divider 78.

The exponent of $y$ cannot be equal to the zero-code, since this would correspond to a quotient of infinity. However, the exponent of $x$ can be the zero-code and in this case, the digital system 56 produces a zero-code output. The analog voltage of the output of the divider 78 in this case is immaterial.

ADDER AND SUBTRACTER

To form the sum $x+y$, the analog voltage $x$ is first sampled and transferred to the A-input of the adder 85. The quantity $y$ is then sampled and transferred to the B-input of the adder 85. Because the scale factors of two quantities to be added must be identical, it is necessary to first compare the digital exponents of the machine variables and then to adjust in the scaling factor device 86 the scale factor of the smaller quantity to coincide with that of the larger so that $$x_e=y_e$$

The digital system 56 computes the difference in exponents of the two inputs and uses this difference to determine the necessary attenuation of the machine voltage having the smaller scale factor. It should be noted that the machine voltage must always be attenuated, so that a passive network may be used.

The above scale factor adjustment may be understood with the aid of FIGURE 5*b*. The A and B inputs normally pass through the unity gain channel of their associated scale factor devices. When an exponent correction is made, the digital system 56 provides inputs which gate the proper input through an attenuator.

To illustrate the exponent correction necessary before addition, assume that the following quantities are to be added:

$$x=0.5\times10^2$$
$$y=0.2\times10^1$$

Notice that the quantities are written as machine units times scale factor. Initially we have $$x_e=2$$
$$y_e=1$$

and it is desired that $$x_e=y_e$$

Since the scale factor of $x$ is larger, a one is added to the exponent of $y$ and the machine voltage representing $y$ is attenuated by a factor of 10. Hence, in the machine we have $$x=0.5\times10^2$$
$$y=0.02\times10^2$$

So that the two quantities can be added to yield $$x+y=0.52\times10^2$$

Since only positive voltages are used in the machine, each quantity has an associated digital sign bit. This sign bit determines whether either or both adder 85 inputs are passed through an inverting amplifier. Thus, an addition may be programmed, but if the sign bits of the two quantities to be added are different, one signal is passed through an inverting amplifier to produce a negative voltage input to the adder 85. The other signal is fed directly as a positive voltage input to the adder 85, so that subtraction of the quantities is performed.

The output of the adder 85 is passed through an absolute value device with the input-output characteristic shown in FIGURE 8. This device is necessary because of the possibility that the adder 85 output may produce a negative voltage. For example let $$x=(-)0.50\times10^2$$
$$y=(+)0.45\times10^2$$

where the signs (+) and (−) are carried as a digital sign bit. Positive voltages representing $x$ and $y$ are gated to the adder 85, but $x$ is inverted as previously explained. The adder output is then $$x+y=-(+)0.05\times10^2$$

The digital system 56 thus assumes that the sign of the sum is (+) but the output voltage of the adder 85 is negative. The fact that the output voltage is negative is sensed by a comparator which is referenced at zero volt. The resulting output of the comparator is $w$ as shown in FIGURE 8. The analog signal is next passed through the absolute value device to obtain a positive machine voltage. The signal $w$ from the comparator is used to change the digital sign bit of the output. Then the final answer is $$x+y=(-)0.05\times10^2$$

which is represented in the machine by a positive voltage and a negative sign bit.

The adder 85 is also used to optimize the scale factor of an arbitrary variable. To do this, the variable is transferred to the A-input of the adder and the zero-code transferred to the B-input. The output voltage of the adder 85 can, therefore, lie in any of the fifteen ranges of machine units. Therefore, to ideally optimize the scale factor of the adder output, an encoder is needed to determine in which of the fifteen ranges the output voltage lies.

It should also be noted that it is possible for the sum of two machine variables with optimum scale factors to exceed unity. The maximum output of 2 machine units occurs when both inputs are equal to 1 machine unit and have the same sign. The encoder, must, therefore, also encode the range 1.0 to 2.0 machine units.

The block diagram for optimizing the scale factor of the adder 85 output is shown in FIGURE 9. The signal from the output of the adder 85 is fed to a range encoder 87. This is a voltage comparison device with outputs A, B, C, D. These outputs are equal to either One or Zero as shown in FIGURE 9, and are used to correct the digital exponent and analog machine voltage. For example, if the range encoder 87 outputs are A, B, C equal to One and D equal to Zero, the machine voltage is in the range 1.0 to 2.0 machine units. The machine voltage must be multiplied by 0.1 and the digital exponent corrected. The encoder enables the gate 88 and the signal passes through the 0.1 gain channel of an operation amplifier 89. If the machine voltage lies in the range 0.001 to 0.01 or 0.01 to 0.1 or 0.1 to 1.0, the optimization is handled in a similar manner. If the machine voltage is less than 0.001, however, the digital system 56 automatically produces the zero-code output.

It should be noted that the range encoder 87 input is controlled by an analog gate 90 (see FIGURE 5*b*), since in some cases it is not desirable to optimize the scale factor of the adder 85 output. This normally occurs in the interpolation performed in function generation.

If the zero-code appears at an input to the adder, gate 91 or 92 is enabled so that the analog voltage input is also zero. If both inputs to the adder 85 are the zero-code, the digital system 56 automatically generates the zero-code as an output. Also, as was explained above, if the output voltage of the adder 85 is less than 0.001 machine unit, the zero-code is generated at the output.

To perform subtraction in the machine, the same steps are used as for addition with one exception. If it is desired to form the difference $x-y$, the quantity $x$ is always transferred to the A-input of the adder 85, and the quantity $y$ is always transferred to the B-input. Then depending upon the digital sign bits of $x$ and $y$, the signal is properly fed either directly into the adder 85 or first through an inverter 93. Explanation of how the digital logic makes the above decisions will be explained later.

DATA INPUTS

As shown on FIGURE 5*a*, information in digital form is read from the magnetic drum 50 into a digital to analog decoder 55. The output of the decoder is an analog voltage which may be transferred onto the main bus through the gate 94. The method of storage on the drum insures that the proper analog voltage will be available at the output of the decoder 55, when it is needed. In the present application, aerodynamic coefficients are stored in the drum and are sampled by enabling the gate 94 at the output of the decoder 55.

Analog voltage inputs to the system are sampled in the usual manner. In the present application, these are the three analog voltages, and these voltages are sampled by enabling the gates 95. The scale factors of the analog inputs must be assigned and permanently stored in the magnetic core memory during the entire computation.

Other inputs to the system are initial values of the integrals. Relays are used to connect initial condition voltage sources to the integrator capacitors to store initial integrator 96 outputs. When computation begins, these sources are disconnected and integration proceeds in the normal manner.

INTEGRATORS

The only computing elements in the analog arithmetic element 58 that are not time-shared are the electronic analog integrators 96. Since, in this embodiment, eight first-order differential equations are solved, eight analog integrators are required. The method of integration is illustrated by the block diagram of FIGURE 5*a*. A derivative is computed and transferred to an analog storage device 97 at the input of its associated integrator. This stored value is integrated until the next sampling time.

Both positive and negative voltage inputs must be handled by the electronic integrators 96. Therefore, the sign bit of the computed derivative determines whether or not the input signal is passed through the inverter 98. For example, if $\dot{p}$ has a positive sign, it is stored through gates 100 and 110. The network consisting of gates 99, 100 and 101 and the inverter 98 is time-shared among the inputs to all integrators 96.

Suppose that the output of the integrator 96 is related to the true variable by $$P=Ap$$

where $P$=true units
$p$=machine units
$A$=scale factor

The input $\dot{p}$ to the integrators 96 is related to $p$ by $$\dot{p}=T\frac{dp}{dt}$$

where $T$=constant
$t$=time

Substitution yields $$\dot{p}=\frac{T}{A}\frac{dP}{dt}$$

Since the integrator 96 input scale factor must be fixed, it can be seen from the above derivation that the integrator 96 output scale factor must also be fixed, but may be different from that of the input scale factor. The fixed scale factors are stored as digital numbers in the drum memory. The value of A is determined by the maximum possible value of P, so that the output of the integrator stays within its linear voltage range. If the input to the integrator is related to the true variable by $$\dot{P}=B\dot{p}$$

where $\dot{P}$=true units
$\dot{p}$=machine units
$B$=scale factor then the scale factor of the integrator 96 input must be $$B=\frac{A}{T}$$

When a derivative is computed, its scale factor is optimized, so that it is not in general equal to the prescribed fixed scale factor of the integrator 96 input. Therefore, this scale factor must be corrected before the computed derivative is transferred to the integrator 96 input. This operation is handled by a particular instruction in the machine.

When the zero-code appears at the input of the integrator 96, the analog voltage at the input must be forced to zero. This is accomplished by enabling the gate 101. This gate is time-shared for all integrators 96.

At various times in the computation, the value of a derivative is needed. Since the past computed value of the derivative is already stored at the input of an integrator, it may be sampled at any time by enabling the gate 102 (for $\dot{p}$) as shown in FIGURE 5. Likewise, the value of an integrated quantity may be needed during the computation. Thus, to sample the integral, gate 103 (for $p$) at the output of the integrator 96 is enabled.

The scale factor of an integrator 96 output is fixed and, in general, is not optimum. Also, the polarity of the voltage may be either positive or negative. It should be noted that this is the only case in the machine where negative voltages, or machine variables with non-optimum scale factors must be transferred. Thus, when an integrator 96 output is sampled, corrections must first be made to optimize the scale factor and to change the voltage polarity if it is negative. This is easily accomplished by transferring the integrator output to one input of the adder 85 and the zero-code to the other input. The voltage, if negative, will be inverted by the absolute value device at the adder 85 output and the scale factor will be optimized by the equipment at the output of the adder.

In an ideal electronic integrator shown in FIGURE 10, the value of the integral in the circuit is proportional to the voltage across the capacitor 104. To insert an initial value of an integral, a charge is placed on the capacitor 104 prior to the start of the solution. This is accomplished by the switch 105. When this switch 105 is in the initial condition position, the amplifier 96 input is switched to a resistive network 106. The potentiometer 108 setting determines the voltage to which the capacitor 104 will charge. When the switch 105 is placed in the compute position, the capacitor initially retains its charge, but the circuit begins to function as an integrator. The switching may be realized with relay contacts. One other method would store all initial conditions directly on the magnetic drum.

A floating point system in the digital system 56 automatically scales the analog machine voltage to an optimum range. The digital exponent and sign associated with each analog machine variable are stored and processed by the digital system 56 and these functions will be described later.

The operations to be performed by the digital system 56 are determined by instructions stored in the magnetic drum memory 50. These instructions are fed to the control matrices 61 and 62 which simultaneously control operations on analog and digital information. As was mentioned earlier, a number of digital operations must be performed during one analog operation. Therefore, a high-frequency clock, eight times the main clock frequency, is employed. The operations for the digital system 56 are directly controlled from signals from the control pulse outputs 66 (see FIGURE 2). The address of a digital number is specified by the address control matrix 61 output.

The logical circuit logic for the digital system 56 is developed around the gate, the diode OR circuit, and the flip-flop. However, inverters, delays, diode AND circuits, and other such components are included in the system when necessary. This system of logic is also suitable for the use of transistors instead of vacuum tubes.

The instant digital system 56 designed operates in a synchronous manner. Information is transferred over a single bus set 111 in binary form. Since four bits are needed for exponent and one bit for sign, the main bus set consists of five lines which transfer the information in parallel form.

The block diagram for the digital system is shown in FIGURE 11. All operations on the digital information are performed in the accumulator 112. A small capacity memory 113 is necessary for storing digital information, since no information is written onto the magnetic drum 50 during computation. Inputs from the magnetic drum 50 are also shown. It should be remembered that operations are being performed in the digital system 56 on the exponent and sign at the same time that operations are being performed on the analog machine voltages in the analog system 58. Also, the state of various devices in the analog system 58 is sampled and the information is transferred to the digital system 56. The information in the digital system 56 is also used to effectively control the ranges of the analog voltage. Therefore, it can be seen that although there is no direct flow of data from the analog 58 to the digital system 56, some information actually is exchanged between the two systems.

The logical functions of the components and notation to be employed in the system can be understood with reference to FIGURE 12. The flip-flop 114 circuit has three inputs: the set input (S), the toggle or complement input (T), and the reset input (R). A pulse is applied to the input and a level appears at the output. The most positive voltage level will be defined as the One state. When input S is energized, the flip-flop 114 is set to the One state, regardless of its previous state. In the One state, output line A has a relatively high potential. A reset input, (R), resets the flip-flop 114 to the Zero state, regardless of its previous state. In the Zero state, output line $\overline{A}$ has a relatively high potential. For a complement input, (T), the flip-flop 114 changes state.

The output of the diode OR 115 circuit in FIGURE 12 is in the One state if either A or B or both A and B are in the One state. The diode AND 116 circuit is also shown. The output C is in the One state, if inputs A and B are both in the One state.

The gate circuit 117, which is logically an AND circuit, is shown in FIGURE 12. Output C is in the One state if and only if the signal level A is in the One state and an input pulse denoting a One is applied to input R. The usefulness of this circuit comes from the fact that it is capable of driving other units.

The delay circuit 118 is shown in FIGURE 12 with input D. When a pulse is applied, input D is in the One state. Output signal D is in the One state after $x$ units of delay. The units of $x$ are in the main clock intervals.

FIGURE 12 shows the inverter circuit 119. If the input A is in the One state, the output is in the Zero state. If the input A is in the Zero state, the output is in the One state.

Any other special components will be explained and the notation presented as they appear in the design of the system.

ACCUMULATOR

The digital accumulator 112 performs all operations on the digital exponent and sign associated with an analog machine variable. Referring to the digital system 56 block diagram of FIGURE 11, two inputs, 120 and 121, from the main bus 111 are shown. When the proper gates 122 are enabled, information is transferred from the main bus to either the A register or the B register in the accumulator. The following discussions assume that the proper information is already in these two registers. The operations necessary to transfer the proper information into and out of the accumulator 112 will be discussed later.

Five binary bits are required to represent the exponent and sign of a machine variable. Since only positive voltages are used in the system 56, one binary bit represents the sign of the machine variable. The scale factor of a machine variable is carried as an integer power of ten. Three binary digits are used to represent the exponent and one binary digit is used to represent the sign of the exponent. The binary value One denotes a negative sign and Zero denotes a positive sign. The One's complement will be used to represent negative digital numbers. Table I lists examples of scale factors and the digital numbers associated with them. The sign bit of the machine variable is not shown. The first digit column on the left represents the sign of the exponent. The next three digit columns represent the exponent.

*Table I*

| Scale Factors of Machine Variables | Digital Representation |
|---|---|
| $10^3$ | 0 011 |
| $10^2$ | 0 010 |
| $10^1$ | 0 001 |
| $10^0$ | 1 111 |
| $10^{-1}$ | 1 110 |
| $10^{-2}$ | 1 101 |
| $10^{-3}$ | 1 100 |

During the following discussion, it should be noted that for multiplication and division of two machine variables, one sequence of eight time pulses is needed per operation. However, for addition and subtraction of two machine variables, a total of three sequences of time pulses are needed per operation.

When two machine variables are multiplied, the digital exponents of the variables must be added. The general method for high-speed addition is illustrated by FIGURE 13, where only one digit column is shown. The register associated with flip-flop A is the A register and the register associated with flip-flop B is the B register.

Assume that the contents of register A are to be added to the contents of register B, and the result stored in register B. Using this method of addition, the state of each flip-flop is transmitted as a signal level. Also, since the carry pulse need pass through only one gate 120, high speeds are possible. The input carry is denoted by $C_I$ and the output carry is $C_O$. The initial contents of flip-flop A and flip-flop B are A′ and B′ respectively, after the Add line is pulsed. The carries are transmitted the length of the accumulator 112 as signal levels. The Boolean expression for $C_O'$ after the Add pulse is $$C_O' = \overline{B}'A' + B'C_I'$$

When the Carry line is pulsed, the carries are simultaneously added by changing the state of flip-flop B if and only if $C_I'$ is a One.

Two other functions must be performed in conjunction with the exponent addition by the accumulator 112. First, the system must check to see if the zero-code appears in either register. A zero-code at either input means that the zero-code must be generated as an output. Second, the state of the analog comparator 72 at the output of the multiplier 71 in the analog arithmetic element 58 must be sensed. The output of the comparator 72 was denoted $F_m$. This quantity determines the necessary correction in the digital exponent during the optimization of scale factors. The change in the digital exponent may be written as $$(\Delta e)_m = 0\ 00\ \overline{F}_m$$

If $\overline{(\Delta e)}_m$ is added to the B-register of the accumulator 112 (which stores the results), the proper correction of the digital exponent, during the optimization of the scale factor, will be made.

Outputs from the operations control matrix 62 that control the above functions result from gates 66 and are inserted into the accumulator 112 (FIGURES 14*a*, 14*b* and 14*c*). In FIGURES 14*a*, 14*b* and 14*c*, the flip-flops of the A and B registers are clearly denoted as 128 and 129. Flip-flops 121 and 122 contain the sign bits of the machine variables to be multiplied, and flip-flop 123 and flip-flop 124 contain the sign bits of the two digital exponents.

Six operations are performed in the accumulator 112 during the multiply order. These operations are carried out at the high-frequency clock rate as described below:

(1) Both registers are checked for the zero-code. If the zero-code appears in either register, flip-flop 125 is set to the One state.

(2) The add line 126 is pulsed. The sign of the produce of machine variables is determined and stored in flip-flop 122.

(3) The carry line 127 is pulsed.

(4) $\overline{(\Delta e)}_m$ from comparator 72 at the multiplier 71 output is placed in register A128.

(5) The add line 126 is pulsed.

(6) The carry line 127 is pulsed. The optimized exponent is now stored in B register 129.

(7) Flip-flop 125 is interrogated. If in the One state, B register 129 is reset to Zero. If flip-flop 124 is in the Zero state and flip-flop 130 is in the One state, an alarm is generated. If flip-flop 124 is in the One state and flip-flop 130 is in the Zero state, the B register 129 is reset to Zero.

The functions that are performed by the accumulator 112 during division of two machine variables are similar to those performed during multiplication. The exponent of the denominator must be subtracted from the exponent of the numerator. This is accomplished by using One's complement representation of negative numbers and performing an addition with end-around carry. Assume that the exponent of the numerator is placed in the A register 128 and the exponent of the denominator in the B register 129.

After the difference in exponents has been calculated, the result must be corrected for the optimization of scale factors at the divider 78 output. The output of the analog voltage comparator 79 was defined as $F_d$ and now determines the change in exponent. The change in the digital exponent may be written as $$(\Delta e)_d = 0\ 00\ F_d$$

If $(\Delta e)_d$ is added to the B register 129 of the accumulator 112 (which stores the results), the proper correction of the digital exponent, during the optimization of scale factors, will be made. This correction also compensates for the fixed internal gain of the analog divider 78. The following operations are performed during the divide order:

(1) Register A is checked for zero-code. If it appears, flip-flop 125 is set to the One state. B register 129 is complemented.

(2) The add line 126 is pulsed. The sign of the quotient of machine variables is determined and stored in flip-flop 122.

(3) The carry line 127 is pulsed.

(4) $(\Delta e)_d$ from comparator 79 at the divider 78 output is placed in register A128.

(5) The add line 126 is pulsed.

(6) The carry line 127 is pulsed. The optimized exponent now stored in B register 129.

(7) Flip-flop 125 is interrogated. If in the One state, B register 129 is reset to Zero. If flip-flop 124 is in the Zero state and flip-flop 130 is in the One state, an alarm is generated. If flip-flop 124 is in the One state and flip-flop 130 is in the Zero state, the B register 129 is reset to Zero.

If the exponent of the denominator were equal to the zero-code, this would correspond to an infinite quotient. Thus, the B register 129 could be checked for the zero-code, and if the zero-code were present, an alarm would be generated.

For the addition of two machine variables, the exponents of the two factors to be added must be identical. Since, is general, the scale factors of two arbitrary variables in the machine are different, an exponent correction must first be made.

As an example, consider the operation $x+y$ and assume that the exponent of $x$ is placed in register A 128 and that the exponent of $y$ is placed in register B 129. The problem now is to calculate the difference in exponents, to change the exponent of the smaller to be equal to that of the larger, and to correct the analog voltage associated with the smaller scale factor. These operations are performed during the exponent correction order as now described:

(1) The A and B registers are checked for the zero-code. The B register 129 is complemented. B register now contains $\overline{y}_e$, the One's complement of $y_e$.

(2) The add line 126 is pulsed.

(3) The carry line is pulsed. $x_e+y_e$ is now contained in the B register 129.

It should be noted that during the first step, if the zero-code appears at both the inputs, flip-flop 125 is set to the One state. If the zero-code appears at one input, zero volts is gated to the associated adder 85 input.

Now let the quantity $(\Delta e)_{a1}$ be defined as $$(\Delta e)_{a1} = x_e - y_e$$

Therefore, we may write $$(\Delta e)_{a1} = x_e + \overline{y}_e$$

In one case, assume that $$y_e < x_e$$

Therefore, after the third step, flip-flop 124 must be in the Zero state, indicating a positive difference in exponents. Hence, $(\Delta e)_{a1}$ must be transferred to the analog arithmetic element 58 to scale the analog voltage $y$ at the B input of the adder 85. In a second case, assume $$x_e \leq y_e$$

Therefore, after the third step, flip-flop 124 must be in the One state, indicating a negative difference between exponents. Hence, $\overline{(\Delta e)}_{a1}$ must be transferred to the analog arithmetic element 58 to scale the analog voltage $x$ at the A input of the adder 85.

Continuing with the description of operations, we have:

(4) Read out B register 129 to analog arithmetic element 58. Read out flip-flop 122 to analog arithmetic element 58. Thus, during the fourth step, the contents of the B register 129 are used to correct one of the analog inputs to the adder 85. If flip-flop 124 is in the Zero state, $(\Delta e)_{a1}$ is in the B register 129 and $y$ is corrected. If flip-flop 124 is in the One state, $\overline{(\Delta e)}_{a1}$ is in the B register 129 and $x$ is corrected. Table II gives the gain associated with each value of $\overline{(\Delta e)}_{a1}$ fed to the A input of the adder 85 and with each value of $\overline{(\Delta e)}_{a1}$ fed to the B input of the adder 85. However, after an attenuation of approximately one-hundred, it is convenient merely to ground that input since it is essentially zero.

*Table II*

ADDER INPUT A

| Gain | $(\overline{\Delta e})_{ai}$ |
|---|---|
| 1.00 | 111 or 000 |
| 0.10 | 110 |
| 0.01 | 101 |

ADDER INPUT B

| Gain | $(\Delta e)_{ai}$ |
|---|---|
| 1.00 | 000 |
| 0.10 | 001 |
| 0.01 | 010 |

Also, during the fourth step, the sign bits of the machine variables stored in flip-flop 122 and flip-flop 121 are transferred to the analog arithmetic element 58 to determine whether the machine voltages are passed through the inverters at the input of the adder 85. This determines whether the machine variables will actually be added or subtracted.

The remaining problem is to determine the exponent of the sum of $x$ and $y$ and to store the result in register B 129. For the case $$y_e < x_e$$

the quantity $x_e$ remains in register A. Since for this case the exponent of the sum is equal to the exponent of $x$, the B register 129 is reset to Zero. Then by performing an addition, the correct exponent is obtained in the B register 129.

For the case $$x_e \leq y_e$$

the quantity $x_e$ again remains stored in register A 128. However, in this case the exponent of the sum is equal to the exponent of $y$. But we also know that $$x_e + (\Delta e)_{ai} = y_e$$

Therefore, the B register 129 which contains $\overline{(\Delta e)}_{ai}$ is complemented and the contents of the A register 128, $x_e$, is added to the contents of the B register $(\Delta e)_{ai}$ so that $y_e$ is formed in the B register 129. Therefore, the operations are (5) Complement B register 129 if flip-flop 124 is in the One state or reset the B register 129 to Zero if flip-flop 124 is in the Zero state.

(6) The add line 126 is pulsed.

(7) The carry line 127 is pulsed. Flip-flop 122 is reset to Zero.

The resultant exponent of the sum $x+y$ is now stored in the B register 129.

After the exponent correction prior to the addition, $x+y$, of two machine voltages, an Add order is provided in which no digital operations are performed. The purpose of this extra step is to allow the analog adder 85 time to complete the addition of the two voltages.

The next order designated contains five digital operations. When these timing pulses start even more time is allowed for the analog adder 85 to reach its final output level. The operations are (8). Read in $w$ (output of absolute value device) from analog arithmetic element 58. If $w$ equals One, set flip-flop 122 to the One state. Reset A register 128.

The output of the absolute value device at the output of the adder 85 is $w$. The sign of the machine voltage corresponding to the sum $x+y$ will be Zero if the output voltage is positive ($w$ equal Zero) or One if the output voltage is negative ($w$ equal One). The A register 128 is also reset to the Zero state.

For the change in exponent due to optimization of the scale factor at the adder 85 output range encoder 87, the quantity $(\Delta e)_a$ may be defined as $$(\Delta e)_a = A\ BCD$$

where A specifies the digital sign and BCD the magnitude of the change in scale factor. So that we now have:

(9) Read $(\Delta e)_a$ from range encoder 87 of the analog arithmetic element and place in register A 128. Check for $(\Delta e)_a = 1111$. If so, set flip-flop 125 to the One state.

During the fifth step $(\Delta e)_a$ may equal 1111 which corresponds to considering the output voltage of the adder 85 negligible, and thus flip-flop 125 is set to the One state. Continuing, we have:

(10) The add line 126 is pulsed.

(11) The carry line 127 is pulsed.

(12) Flip-flop 125 is interrogated. If in the One state, the B register 129 is reset to Zero.

This completes the necessary operations for the addition of two machine variables.

The necessary operations to form the difference between two machine variables are similar to those needed for addition with one exception. If the difference $x-y$ is desired, $x_e$ is always placed in the A register 128 and $y_e$ is always placed in the B register 129. The exponent correction order is first programmed. In the next step, however, the subtract instruction replaces the Add order and consists of a first step one digital operation. This pulse complements flip-flop 131 to form $-y$ at the B input of the analog adder 85. A five digital operation order is next programmed, which completes the subtraction operation.

To form the addition $-x-y$, an instruction is needed to replace the Add order. This order consists of one digital operation occurring at step 1. This pulse complements flip-flop 132 to form $-x$ at the A input of the adder 85 and also complements flip-flop 131 to form $-y$ at the B input of the adder 85.

The input to each analog integrator 96 has a fixed, predetermined scale factor associated with its stored derivative. A new value of the derivative computed during a computation cycle must therefore have its exponent corrected before being transferred to the integrator 96 input. The reason for this is when a derivative is computed, its scale factor is immediately optimized. In general, this optimized scale factor is not equal to the fixed scale factor at the integrator input. This requires that an order be provided to correct the scale factor of an arbitrary machine variable to equal the fixed, stored scale factor of a given integrator input. It is important to note that because the fixed scale factor is chosen to handle the maximum range of the derivative in question, the fixed exponent will always be greater than or equal to the exponent of the computed derivative.

The above scale factor correction to a fixed value proceeds as follows. The computed derivative with optimum scale factor is first fed to the B input of the adder 85 and the associated exponent is transferred to the B register of the accumulator 112. The order is now programmed and is identical to the exponent correct order with one exception. During the second step, the set input of flip-flop 133 is pulsed to insure that the A input of the adder 85 is at zero potential.

This instruction is followed by another instruction which is exactly the same as the aforesaid five digital operation order, except that the analog gate 90 is not enabled. By not enabling gate 90, optimization of the scale factor of the adder 85 output is not performed. It should also be noted that when gate 90 is not enabled the digital output of the range encoder 87 shown in FIGURE 5*b* must be A, B, C, D equal to Zero. This permits the analog voltage at the adder 85 output to pass through the unity gain channel of the operational amplifier during this order. Also, with A, B, C, D equal to Zero, no change in the exponent is made. At the end of this order, the exponent of the computed derivative, now in the B register 129 of the accumulator 112, is identical to the desired fixed exponent of the integrator 96 input. The analog voltage of the computed derivative is now transferred to the proper integrator 96 input.

A small-capacity memory 113 is needed to store the exponent and sign associated with each machine variable. The capacity is approximately fourteen five-bit words or a total of seventy bits. Since the outputs of the address control matrix 61 specify the address of the word, no register selection is needed in the memory 113 itself. The general advantages of magnetic core memories are their reliability, rapid operation, and random access.

The block diagram for the magnetic core memory is shown in FIGURE 15. The address control matrix 61 decodes a given address into a voltage on a separate line. Therefore, the register selection for reading and writing is made external to the memory. Since fourteen register addresses are needed, only fourteen of the sixty-four possible output lines 134 of the address control matrix 61 are shown in the figure. Other output lines of the address control matrix are needed, however, that enable gates in the analog arithmetic element 58, but do not select registers in the memory 113. Since the read process is essentially one of register selection, a one-dimensional read system is used. The advantages of such a read system are: elimination of noise outputs; faster, larger read-out signals; simpler memory plane construction. There is no limit to the read pulse amplitude, so long as it is sufficient to switch the memory core. This means that faster and larger read-out signals may be obtained. A common read-out wire is used in each digit column.

For writing, an additional dimension is needed for place-selection. For example, some cores in the selected register will be switched to the One state and others will be switched to the Zero state, depending upon the information to be stored. Therefore, two dimensions are needed for writing. Part of the selection in writing utilizes the coincident current feature as an integral part of the magnetic core memory itself.

Since the read-out process destroys the information held in the cores (i.e. all cores in the register are set to the Zero state), a regeneration cycle is needed to read out the information in a given register and write the same information back into the same register. This will be the read-write cycle, which permits non-destructive read-out of information. Reading will always be performed with a read-write cycle.

The operation of writing will be accomplished by carrying out a read-write cycle. But in this case, a new word, rather than the word just read, is writen into the register. This will be called the clear-write cycle.

The flux-current characteristic of a typical core is shown in FIGURE 16. The remanent flux states are defined as the One and Zero states as shown. The core memory array 135 is illustrated in FIGURE 17. The selection line drivers gate the read-write driver 136 output onto the particular line determined by the address control matrix 61. The digit drivers 137 provide the place selection. The sense windings 138, which consist of a common read-out wire for each digit column, are shown. The current $I_m$ is defined as the current sufficient to switch the core 139 but with $I_m/3$ not capable of switching the core 139.

For reading, a current $4I_m$ is gated by the selection line drivers 140 to the selection line 141 determined by the address control matrix 61. This sets all cores in the particular register to the Zero state. The information is then read by the sense windings 138 which are fed to the sense amplifiers 142. The value of current $4I_m$ was chosen for large signal outputs and fast operation. The current for reading should also be sufficient to set any core to the Zero state, regardless of the current flowing in the digit windings.

The coincident current selection process for writing depends on the ability of a core to switch at one excitation level and remain unchanged at another excitation level. The selection ratio is defined as the absolute value of the ratio of the excitation received by the selected core to the largest total excitation received by any unselected core. The maximum selection ratio [20], $R_m$, obtainable for a system having S dimensions is given by:

$$R_m=\frac{S+1}{S-1}$$

For a two-dimensional writing system, the maximum selection ratio is equal to three. This selection ratio is realized in the present design.

For writing, the selection line determined by the address control matrix 61 carries a currrent $-\frac{2}{3}I_m$. To write into the $j$th digit column, the digit drivers 137 supply the respective currents $$D_j^0=+\tfrac{1}{3}I_m$$

$$D_j^1=-\tfrac{1}{3}I_m$$

where $D_j^0$ denotes a Zero to be recorded and $D_j^1$ denotes a One.

The memory timing diagram is given in FIGURE 18. The output of the read-write driver 136 is shown. This signal is generated every cycle, regardless of whether or not a memory register is addressed. It is used, however, only during the read-write and clear-write cycles. This signal is gated to a particular selection line 141 by a particular output line of the address control matrix 61 output shown in FIGURE 18. Such an output line is, of course, energized during both the read-write and clear-write cycles.

A strobe signal, used in the read-write cycle only, is shown in FIGURE 18. Its purpose is to permit noise signals to terminate before information is gated from the sense amplifiers 142. The digit drivers 137 are bi-stable devices that supply either $+\frac{1}{3}I_m$ or $-\frac{1}{3}I_m$, at all times, depending upon whether a One or a Zero is to be recorded. Information is read into the digit drivers 137 at the time indicated in FIGURE 18. This operation is performed during the read-write and clear-write cycles.

The logical circuitry of the entire digital system for floating-point analog computation is shown in FIGURE 19. It is the purpose now to explain how the transfer of digital information is accomplished. These transfers are executed by enabling digital gates connected to the main bus 111, as determined by the operations control matrix 62. At the same time that a digital word is transferred in the digital system 56, the corresponding analog machine voltage is transferred in the analog system 58.

As shown in the digital system block diagram, information is transferred to the main bus 111 from one of three possible sources: the magnetic drum 50, the magnetic core storage 113, or the digital accumulator 112. Information can be transferred from the main bus 111, however, to one of only two possible destinations: the magnetic core storage 113 or the digital accumulator 112. Only two destinations are possible because no information is written onto the magnetic drum 50 during actual computation.

The timing diagrams for the transfer operations are shown in FIGURE 20. The buffer register 143 and digit drivers 137 must be reset to Zero during the first time period before each read-write and clear-write cycle. It should be noted that the strobe pulse is used for the read-write cycle only. For the following discussion, refer to FIGURE 20. The digital gates that are enabled for each operation are shown in FIGURE 19.

$CW_D$: This order transfers information from the drum 50 to the magnetic core storage 113.

$DT_A$, $DT_B$: These orders transfer information from the drum 50 to either the A or the B registers of the accumulator 112.

$RW_A$, $RW_B$: These orders transfer information from the magnetic core memory 113 to either the A or the B register of the accumulator 112.

$CW_A$: This order transfers information from the output of the accumulator 112 to the magnetic core memory 113.

In the analog system 58, information is always transferred from a storage unit 70 to an arithmetic element, never from one storage unit to another. Consequently, no transfer of digital information from one magnetic core memory location to another is necessary. Such an order was intentionally avoided in the instant invention because it would require two digital addresses for one instruction. Since the address control matrix 61 specifies only one address, it would be difficult to implement such orders. It would be possible, however, but this would require that the address control matrix 61 specify two addresses. Thus, separate instructions would be necessary for transfers between each possible combination of storage units.

An analog voltage is never transferred from the output of a computing element in the analog arithmetic element 58 to the input of the same computing element. However, it may be transferred to the input of another computing element. In the digital system 56, this requires that the output of the accumulator 112 be transferred to its own input. Therefore, we have $AT_A$: This order transfers information from the output of the accumulator 112 to the A register 128 at the input of the accumulator 112. It should be noted that no order is necessary to transfer information from the output of the accumulator 112 to the B register 129, because the output of the accumulator 112 is actually the B register 129.

The need for a special transfer order arises from the fact that all integrator 96 inputs have a fixed scale factor. Because the digital exponent for a given integrator 96 input is written on the magnetic drum prior to computation and must not be altered during computation, no information is written into the magnetic core memory 113 for this order. Because the zero-code may be calculated as the exponent of the computed derivative, however, some means must be provided to insure that the analog voltage at the integrator 96 input is zero.

Referring to the integrator 96 input circuit as shown in FIGURE 10, an analog gate 101 is shown which provides a zero volt input when the zero-code appears. This gate 101 as well as the network consisting of gates 99 and 100, and the inverter 98, is time-shared among all integrators 96. Thus the following operations must be performed during a transfer order. In FIGURES 14*a*, 14*b* and 14*c*, the sign bit of flip-flop 122 of the machine variable is sampled. The B register 129 contains the calculated digital exponent and sign of the computed derivative. This sampling of the sign bit determines whether a positive or negative voltage is fed to the input of the analog integrator 96. The proper analog gate, either gate 99 or gate 100, remains enabled during the entire instruction. Also, the B register 129 is checked for the zero-code in FIGURE 14*b*. If the zero-code appears, the input of the integrator is grounded through gate 101 during the entire instruction.

A special order is needed for transferring information to the analog storage unit 145 shown in FIGURE 5*b*, during the selection of data for function generation. This order insures that the analog voltage is zero if the zero-code appears as its input exponent. This is necessary because the storage device 145 is one input to an analog comparator. It should be noted that, in general, it is immaterial what voltage is fed to a storage device with the zero-code except in this one case where it must be zero volts.

FIGURES 14*a*, 14*b* and 14*c* show the logical circuitry necessary to implement this special order. The B register 129 of the accumulator 112 is first checked for the zero-code. If the zero-code appears, the input to the storage unit 145 is grounded during the entire instruction. Also, all operations performed in the $CW_A$ order must also be performed in the special order.

The operation of generating an arbitrary function of one of more variables will be accomplished by storing discrete values of the function on the magnetic drum 50 and perform linear interpolation between the discrete values to obtain an approximation to the given function. Special digital logic is used for the selection of the proper values of the function. The analog arithmetic element 58 will then be used in the usual manner to perform the interpolation.

The problem of selecting the breakpoints and discrete values of an arbitrary function from the magnetic drum 50 is a time-selection problem. That is, the correct instants of time to read from the drum memory must be determined. A separate single track storing position information on the drum and counters external to the drum are used to determine uniquely the correct reading times. As the proper values are selected, they are decoded into an analog voltage and automatically gated into a predetermined analog storage unit. The associated exponent and sign are selected and stored in the magnetic core memory.

The general method of selecting the data for function generation will be illustrated by a specific case, an arbitrary function of two variables. A function of $n$ variables could be handled in a similar manner.

FIGURE 21 illustrates a typical function of two variables and presents the notation to be used. Assume that $x$ lies between $x_i$ and $x_{i+1}$ and that $y$ lies between $y_j$ and $y_{j+1}$. The linear interpolation equations are $$Z_{j+1}=Z_{j+1,i}+(x-x_i)\frac{Z_{j+1,i+1}-Z_{j+1,i}}{x_{i+1}-x_i}$$

$$Z_j=Z_{ji}+(x-x_i)\frac{Z_{j,i+1}-Z_{ji}}{x_{i+1}-x_i}$$

$$Z=Z_j+(y-y_j)\frac{Z_{j+1}-Z_j}{y_{j+1}-y_j}$$

FIGURE 22 shows the four values of Z, the two values of $y$ and the two values of $x$ that must be selected and read from the magnetic drum 50. Let the discrete values of the function as shown in FIGURE 21 be considered as eight column matrices. The column matrix associated with breakpoint $x_1$ will be denoted $\{Z_{y1}\}$ and is defined as $$\{Z_{y1}\}=\begin{bmatrix} Z_{11} \\ Z_{21} \\ Z_{31} \\ \cdot \\ \cdot \\ \cdot \\ Z_{81} \end{bmatrix}$$

Similarly, the column matrices associated with the selected breakpoints $x_i$ and $x_{i+1}$ are $$\{Z_{yi}\}=\begin{bmatrix} Z_{1i} \\ \cdot \\ \cdot \\ \cdot \\ Z_{ji} \\ Z_{j+1,i} \\ \cdot \\ \cdot \\ Z_{81} \end{bmatrix} \quad \{Z_{y,i+1}\}=\begin{bmatrix} Z_{1,i+1} \\ \cdot \\ \cdot \\ \cdot \\ Z_{j,i+1} \\ Z_{j+1,i+1} \\ \cdot \\ \cdot \\ Z_{8,i+1} \end{bmatrix}$$

The matrices of the $x$ and $y$ breakpoints may also be defined as $$(y)=\begin{bmatrix} y_1 \\ \cdot \\ \cdot \\ \cdot \\ y_j \\ y_{j+1} \\ \cdot \\ \cdot \\ y_8 \end{bmatrix} \quad (x)=\begin{bmatrix} x_1 \\ \cdot \\ \cdot \\ \cdot \\ x_i \\ x_{i+1} \\ \cdot \\ \cdot \\ x_8 \end{bmatrix}$$

The breakpoints in the $x$ and $y$ matrices and values of the function in the Z matrices are stored on the magnetic drum in the same order as in the corresponding matrix. The physical arrangement of data on the surface of the drum 50 is shown in FIGURE 23. The placement of the read heads and direction of rotation of the drum is indicated. The word length of all data is eight bits plus five bits for sign and exponent.

The time-selection of the desired data for linear interpolation is as follows. The matrix $(x)$ is the first to pass by the read stations. Each of the breakpoints is then read out, decoded into an analog voltage, and compared with the present value of $x$. This level selection process determines that $x$ lies between $x_i$ and $x_{i+1}$. At the same time, a counter is used to determine the position within the matrix $(x)$ of the selected breakpoints $x_i$ and $x_{i+1}$. This position is numerically the same as the subscripts $i$ and $i+1$. However, since the level selection occurs after $x_{i+1}$ is compared with the present value of $x$, the counter is delayed one count by displacing the position bit as shown in FIGURE 23. This allows the counter to store position $i$ after the breakpoint $x_{i+1}$ is compared. The level selection process is then repeated for the matrix $(y)$. The desired $y$ breakpoints $y_j$ and $y_{j+1}$ are thus selected and a counter is used to determine the position within the matrix $(y)$ of the selected breakpoints $y_j$ and $y_{j+1}$. This position is numerically the same as the subscripts $j$ and $j+1$. Block addresses are then assigned to each matrix $Z_{yx}$ so that $i$ and $i+1$ positions previously determined will select two matrixes $\{Z_{yi}\}$ and $\{Z_{y,i+1}\}$. The $j$ and $j+1$ positions previously determined are then used to select, by comparison with another position counter, the desired values of the function within the matrix $\{Z_{yi}\}$, namely $Z_{ji}$ and $Z_{j+1,i}$. In the same manner, the $j$ and $j+1$ positions again select the desired values within the matrix $\{Z_{y,i+1}\}$, namely $Z_{j,i+1}$ and $Z_{j+1,i+1}$. This completes the selection of data for the linear interpolation. The analog arithmetic element 58 is then used to compute the value of the function $Z(x,y)$ by the interpolation equations.

The particular set of equations to be solved require that aerodynamic functions of one and two variables and trigonometric functions of a single variable be generated by the computer. The trigonometric resolution will be handled in the same manner as arbitrary functions, i.e., discrete values of the function will be stored and linear interpolation will be performed by the analog arithmetic element 58. The equation used for a function of a single variable is given below:

$$Z(y)=Z_j+(y-y_j)\frac{Z_{j+1}-Z_j}{y_{j+1}-y_j}$$

where $y_j<y<y_{j+1}$. A typical function is illustrated in FIGURE 24. The first step in computing $Z(y)$ is to level sense in $y$ to determine that $y_j<y<y_{j+1}$. However, the level sensing operations require that the stored breakpoints always carry a positive sign. For this reason, a new variable, $y'$, is defined so that the function is translated into the first and fourth quadrants. In FIGURE 24, the limit of $y$ in the negative direction is $-\delta y$. Therefore, the new variable $y'=y+\delta y$ is defined, and the values of $y'$ and $Z(y')$ are stored on the drum. The new function $Z(y')$ is shown plotted in FIGURE 25. It is unnecessary to translate the function entirely into the first quadrant, since a digital sign bit is carried with each value of $Z(y')$.

Because the breakpoints of $y'$ rather than $y$ are stored on the drum, it is necessary to add $\delta y$ to the value of the machine voltage $y$ before a comparison of the machine voltage with the stored break-points is made. In this particular application, the aerodynamic and trigonometric functions depend only upon variables appearing at the output of an integrator. This scale factor is fixed, as determined by the maximum value of $y$. The scale factor of $\delta y$ is always equal to the scale factor of the stored breakpoints. In order to compare the breakpoint values with the computed machine voltage, the scale factor of $y$ is first corrected so that it is equal to that of $\delta y$. This is, in general, not an optimum scale factor, but is always equal to the scale factor of the stored breakpoints, so that a comparison can be made. Since the scale factor of $\delta y$ is always equal to or greater than $y$, the normal exponent correction before addition of $\delta y$ and $y$ insures that the sum has the same scale factor as the stored breakpoints.

When the level of $y$ has been determined by the analog voltage comparator 146, the quantities $y'_j;y'_{j+1};Z_j;Z_{j+1}$ must be read from the drum 50 into analog storage units 69. When a function of two variables, $Z(x,y)$ is considered, the quantities $x'_i$; $x'_{i+1}y'_j$; $y'_{j+1}$; $Z_{ji}$; $Z_{j+1}$; $Z_{j,i+1}$; $Z_{j+1,i+1}$ must be read from the drum into analog storage units 69. Hence, eight analog storage units 69 are necessary to temporarily store these eight quantities. Once the necessary information has been stored, interpolation is then accomplished by the usual computation procedure.

Consider again the computation of a value of the function $Z(z, y)$. The eight breakpoints of $x$ (i.e. the matrix $(x)$) are stored first on the drum 50, next is the matrix $(y)$, and last are the eight blocks of $Z$ values (i.e. the matrices $\{Z_{yx}\}$. Each matrix $\{Z_{yx}\}$ is preceded by a block address. The logical circuitry for the time-selection of data from the magnetic drum is shown in FIGURES 26*a* and 26*b*. After the variable $x'=x_+\delta x$ is formed, $x'$ is gated through gate 147 to the analog comparator 146. Gates 94, 148 are enables, and the stored $x$ breakpoints are read from the drum, decoded and fed in sequence into the analog voltage comparator 146. Since $x'_i<x'<x'_{i+1}$, the comparator 146 triggers when $x'_{i+1}$ appears at the input. The output of the comparator disables 149 and sets flip-flop 150 to the One state, generating the output $R_j$ as a pulse and also as a level. The pulse $R_j$ is also delayed on another line by delay 151 by one clock time to generate the pulse $R_{j+1}$. The level $R_j$ feeds gate 183 which inhibits further information from being read directly from the drum. Gate 152 is enabled by the address control matrix 61, so that when the comparator 146 triggers, flip-flop 153 is set to the One state. The output of flip-flop 153 stops the $x$ position counter by preventing the pulses from the position track from reaching the countery 154. Thus, the position $i$ is stored in the counter. This position information is later used to select the matrices $\{Z_{yi}\}$ and $\{Z_{y,i+1}\}$.

Gate 155 is also enabled by the pulse $R_j$. The breakpoints $x'_{i'}$ which was temporarily delayed, is thus decoded and transferred to output line a before the counter steps to its next count. The output line a enables gate 157 so that $x'_i$ is stored in storage device 158. The pulse $R_{j+1}$ occurs one count later, thus transferring breakpoint $x'_{i+1}$ onto the main bus, energizing output line $b$ of the modulo eight counter 156, and storing breakpoint $x'_{i+1}$ in $S_2$. Flip-flop 150 is reset to the ZERO state after this operation. In a similar manner, the exponent and sign of the breakpoints must be temporarily delayed as shown in FIGURE 27. The pulse $R_j$ enables the remaining gates of 151. Thus, the exponent and sign of the breakpoint $x'_i$, which were temporarily delayed, are thus transferred at the proper time to the main bus 111 of the digital system 56.

The $y'$ breakpoints are selected in the same manner. The new machine variable $y'=y+\delta y$ is formed and gated to the analog voltage comparator 146. This quantity is compared with the stored breakpoints by enabling 94, 148 and 150. Since $y'_j<y'<y'_{j+1}$, the analog comparator 146 triggers when $y'_{j+1}$ appears at the input. The comparator 146 output disables gate 149, stops the $y$ position counter 160 in postion $j$, and sets flip-flop 150 to the One state. The latter result generates pulses $R_j$ and $R_{j+1}$ ($R_j$ also appears as a level) which are used to time-select $y'_j$ and $y'_{j+1}$ and store these breakpoints in 161 and 162, respectively. Flip-flop 150 is not reset to the Zero state by the address control matrix 61 after this operation. Thus the level $R_j$ feeds a gate which inhibits further information from being read directly from the drum 50.

A block address precedes each matrix $\{Z_{yx}\}$. The block address is fed into a digital comparator circuit 170. The Boolean expression for the comparator 170 is $$f=\prod_{j=1}^{n}(\overline{A}_j\overline{B}_j+B_jA_j)$$

where $A$=desired block address
$B$=block address currently passing the read station
$j$=$j$th digit column Thus, when two numbers are identical in all digit columns, an output will be obtained. However, using De Morgan's theorem, we may write $$\overline{f}=\sum_{j=1}^{n}(\overline{A}_j+\overline{B}_j)(B_j+A_j)$$

$$\overline{f}=\sum_{j=1}^{n}(\overline{A}_jB_j+\overline{B}_jA_j)$$

Implementation of this second expression requires fewer gates and multiple-input AND circuits. Since this is desirable for high-speed operation, the second expression is implemented.

The block address is compared with the number $i$ stored in the $x$ position counter 154. Gate 171 is programmed to be enabled by the address control matrix 61 during the comparison. When the block address coincides with the number $i$, the comparator 170 produces an output, thus selecting the matrix $\{Z_{yi}\}$. The output of the comparator 170 sets flip-flop 172 to the One state which enables gate 173 so that the contents of the Z position counter 174 is compared with the contents of the $y$ position counter 160. Because $j$ is stored in the $y$ position counter 160, the second comparator 175 produces an output when the Z position counter 174 reaches $j$. This operation generates pulse $A_j$ and pulse $A_{j+1}$ one clock time later. The function of pulses $A_j$ and $A_{j+1}$ is to prevent $R_j$ from inhibiting the flow of information from the drum 50 during these successive pulse intervals. This allows $Z_{ji}$ and $Z_{j+1,i}$ to be successively decoded and transferred to the main bus. At the same time $A_j$ and $A_{j+1}$ are gated through the modulo eight counter 156 to output lines $e$ and $f$ respectively. Hence $Z_{ji}$ is stored in storage device 177 and $Z_{j+1,i}$ is stored in storage device 178.

The output of gate 171 also sets flip-flop 179 to the One state. This generates a pulse which adds one to the contents of the $x$ position counter 154. Hence, the new contents of the $x$ position counter 154 is $i+1$. The above process is repeated to store $Z_{j,i+1}$, in device 180 and $Z_{j+1,i+1}$ in 181. All flip-flops in FIGURE 26 are reset to the Zero state when all $\{Z_{yx}\}$ matrices have passed by the read-stations. With the necessary information stored in the analog storage units 69, the interpolation equations are solved for $Z(x, y)$ by standard operations of the arithmetic element 58.

It should be noted that the modulo eight counter 156 outputs function in exactly the same manner as the outputs of the address control matrix 61. Thus, the outputs must not only specify the destination of analog information, but also must address the magnetic core memory 113 to store the associated digital exponents and sign.

Obviously this system may be simplified in the case of data for a function of a single variable, $Z(y)$, or in cases where several functions of single variables are to be generated and the different variables have the same breakpoints.

No information is written into the magnetic drum storage device 50 during solution of equations. The program and other data are written into storage before computation begins. Therefore, an unlimited amount of time is available for writing information on the drum 50. It is desirable that both automatic and manual means for the insertion of data be available. The need for an automatic method, such as tape inputs, is obvious but the need for a manual method, such as a keyboard input, deserves an explanation. Since, a primary object of the instant invention is the simulation of aircraft and various aerodynamic coefficients may frequently change, it is desirable to be able to change one word at a time on the drum 50. Therefore, a keyboard would facilitate this operation.

Since an unlimited amount of time is available for writing, the writing equipment can be reduced by recording information on only a few tracks at a time. For the present application, recording is performed on eight tracks at a time. A manual switch 200 is used for space selection.

The input register 204 for writing information on the drum consists of three registers: storage address register 201, input record control register 202, and the drum input register 203. The functions of these three registers are as follows. The eleven bit storage address register 201 stores the address of the memory location into which the information contained in the eight bit drum input register 203 is to be written. The input record control register 202 produces a signal to initiate recording. It is assumed that the information will be retained in the input register 204 for at least one drum revolution.

FIGURES 28$a$ and 28$b$ show the logical circuitry for controlling the writing of information on the drum 50. The information is first placed in the input register 204. This input data may have originated in different forms (i.e. signals from a punched-tape or manual keyboard). The input register 204 provides buffer storage between the external units and the computer. The following discussion will assume that the information has been transferred to the input register 204.

All timing pulses are contained on the timing tracks of the drum itself. The main clock track and the origin or marker track are shown in FIGURE 28$a$. These are fed into the timing control unit 205 which supplies timing pulses for the system. The angular position counter 206, shown in FIGURE 28$a$, is used to specify the angular address of registers on the drum 50. The clock pulses are inputs to the angular position counter 206. To insure that the angular position counter 206 bears the proper relationship to the actual angular position of the drum 50, the origin pulse is used to clear the counter when the reset button 207 is depressed. The contents of the angular position counter 206 are compared with the contents of the storage address register 201. The comparison is made in the coincidence detector 208. The coincidence pulse is used to time-select the register into which the information contained in the drum input register 204 is to be written. The input to the write control unit 209 is the coincidence pulse. However, the coincidence pulse does not pass through gate 210 unless an initiate record pulse exists. The initiate record pulse is generated in the monostable multivibrator 211 of the input record control register 202. It should be noted that information must first be inserted in the storage address register 201 and the drum input register 203 before actuating the input record control register 202. This will be discussed presently. When an initiate record pulse exists, flip-flop 212 is set to the One state, thus permitting gate 210 to pass the coincidence pulse. When this occurs, the coincidence pulse sets flip-flop 213 to the One state and a record pulse is generated. The coincidence pulse is also passed through a delay 214 to reset flip-flops 212 and 213. Notice that if flip-flop 212 is not reset after the first coincidence pulse, the contents of the drum input register 203 would be re-recorded on each revolution of the drum 50 until the contents of the storage address register 201 was changed. The record pulse samples each digit column of the drum input register 203. A write One or write Zero pulse is generated for each digit column, depending upon whether the associated flip-flop is in the One or Zero state.

For manual inputs to the input register 204, a keyboard 216 consisting of switches may be used as shown in the block diagram of FIGURE 29. Each switch sets its associated flip-flop of the register to the correct state. After information is inserted into the storage address register 201 and the drum input register 203, a push-button is used to trigger the input record control multivibrator 211 to initiate recording.

For tape inputs 215 a buffering device is needed to compensate for differences in the rate of information flow and the form of the information. This device performs the following two functions. First, it accepts information from a seven channel tape reader and stores the information in the twenty flip-flop register. Second, it generates the initiate record pulse after all information has been transferred from the tape 215 to the input register, so that recording on the drum 50 may take place.

As shown in FIGURE 30, the information is assumed to originate from a seven channel tape reader 215. Six of the channels will be used to carry information and a single channel will be used for control. The information is transferred from the tape to the input register 204 in the following manner. All flip-flops 219 in the input register 204 are initially in the Zero state. The six information channels are read into the first six flip-flops 219 of the input register 204 through a logical delay 220. The control channel of the tape feeds a monostable multivibrator 221 which generates a shift pulse. Thus, when a shift pulse is generated, the information contained in a given flip-flop 219 of the input register 204 is shifted six flip-flops to the left. For example, the shift pulse samples the contents of 219*a*. Flip-flop 219*g* is then set either to the One or to the Zero state, according to the state of flip-flop 219*a*.

Four rows of the tape are required to fill the input register 204. As information is shifted to the left for the fourth time, a One is shifted into the input record control multivibrator 211 to generate an initiate record pulse. After the recording operation is completed, the flip-flops 219 in the input register 204 must be reset to the Zero state before the next row of data is read from the tape. Flip-flop 230 is used to store the complete record pulse. The Boolean expression for the reset pulse to the register is $$R=\overline{AC}$$

where $R$=reset pulse
$A$=output of flip-flop 230
$C$=tape control channel output If the tape reader 215 is used as explained above, no signal is needed to initiate the mechanical operation of moving the tape from one row of holes to the next. The tape is continually read into the input register 204. The only requirement is that the tape speed be such that the information is retained in the input register 204 for at least one drum revolution.

For manual inputs, no shifting operation is required. All flip-flops 219 are set to the proper state by switches from a keyboard 216. The only restriction is that the input record control multivibrator 211 must be triggered after the desired information is stored in the storage address register 201 and the drum input register 203.

Input signals to the computer are analog voltages originating from transducers measuring a given physical quantity. These inputs will be sampled by analog gates 95 at the proper time to provide amplitude modulated pulse inputs to the computer 58. The output information, in most cases, are the intergrator 96 outputs. These outputs may be read out continuously as analog voltages.

Both inputs and outputs have an associated scale factor. The scale factor for the input must be determined and pre-set into the magnetic core memory 113. An amplifier and attenuator are, in general, required in series with the voltage from a transducer to obtain the proper machine voltage. Also, since the output of each integrator 96 has a predetermined fixed scale factor, no amplifier or attenuator is needed for output quantities.

The purpose of the applicant now is to outline several checking features that are employed in the instant invention. The checking of information and operations in the computer can be divided into two classes. The first class consists of built-in checks that are performed automatically during computation. The second class consists of programmed checks that can be initiated at any time that actual computation is not taking place. Since information in the computer is represented in both analog and digital form, the checks should be capable of checking both the analog and digital information.

The analog information that is processed by the computer is, in general, difficult to check. However, one check is derived from the fact that the range of analog machine voltages is precisely defined. Therefore, if any machine voltage extends beyond this maximum range, an error has been made and detection is a simple operation. For detecting this error, it is convenient that all analog information is transferred over a single bus. A voltage comparator is added to the main bus 67, which compares the amplitude of the analog voltage pulses with the maximum voltage that is permissible in the machine. Whenever any analog voltage extends beyond this maximum machine voltage, the comparator generates an alarm signal. Malfunctions of any analog device that cause such an error could thus be detected.

Digital information in the machine represents the exponent and sign of the variable. Fifteen exponent values corresponding to fifteen ranges of the machine voltage are permissible. A check is made in the digital accumulator 112 during the multiplication and division operations to detect whether a non-existent exponent value is calculated. During these operations, the exponents are added or subtracted, and the sum or difference is stored in the B register 129 of the accumulator 112. Therefore, at the end of such an operation, the B register 129 is checked. If an overflow has occurred, an alarm signal is generated.

Instructions read from the magnetic drum 50 are checked for non-existent instructions. The digital instructions are fed to the operations control matrix 62 and to the address control matrix 61. These matrices control all analog and digital operations in the computer. The control matrices decode each instruction into a voltage on a separate line. A non-existent instruction will also be decoded into a voltage on a separate line, so that voltages appearing on matrix output lines associated with non-existent instructions are used to generate an alarm signal.

Since all instructions and data are stored on the magnetic drum 50 before computation begins, it is essential that the entire contents of the magnetic drum 50 be checked. The following checks are applicable to both automatic and manual methods of recording.

Assume that all information has been transferred from a paper tape to the magnetic storage drum 50. The procedure for checking the stored information may be understood by reference to FIGURES 31, 32*a*, 32*b* and 32*c*. Switch A is placed in the initiate check position, and the manual group selection switch 200 is placed in the proper position to space-select the desired group of eight tracks. Information from the tape is again read into the input register 204 in exactly the same manner as when the recording operation is performed. In this case, however, the input record control multivibrator 211 initiates the checking operation. When the input record control multivibrator 211 is triggered, the output sets flip-flop 213 to the One state, thus enabling gate 240 and setting the flip-flops in the check register 241 to the Zero state. A coincidence pulse is generated, as in the recording operation, when the contents of the storage address register 201 and angular position counter 206 coincide. Since flip-flop 213 is in the One state, the coincidence pulse passes through 240 to become a check pulse. This check pulse reads out the contents of the group of eight flip-flops in the drum output register 243 that are selected by the manual group selection switch 200. The contents of these flip-flops are transferred to the check register 241. The contents of the check register 241 is then compared with the contents of the drum input register 202 in the error detector 244. An output will be obtained from the error detector 244 if and only if the contents of the two registers are not identical. The output of the error detector 244, when it occurs, is fed into the alarm generator 245. The check pulse from the check control unit 246 is passed through a delay 214 to the alarm generator 245, so that its arrival at gate 210 is at the proper time to sample the output of the error detector 244. If the error detector 244 does have an output, the check pulse will pass through gate 210 to set flip-flop 212 to the One state. The output of flip-flop 212 is the alarm signal. A neon lamp 247 is then energized to provide visual indication that the contents of the register in question is in error. The alarm signal is also fed to the input of gate 250. This stops the angular position counter 206 so that the address of the register whose contents is in error can be read out. The tape reader 215 should also be stopped at this time. Neon lamps 251 are connected to the output of the angular position counter 206 so that the address of the register can be visually read. In order to continue the checking operation it is necessary to press the reset button to reset the angular position counter 206 to Zero and also to press the start button which resets flip-flop 212 to the Zero state.

Manual checks of the contents of a given register on the drum are also performed with the logical circuitry of FIGURES 32*a*, 32*b* and 32*c* in the same manner as explained above. A keyboard is used to insert information in the storage address register 201 and drum input register 202. The problem is then to compare the contents of the drum input register 202 with the contents of the register on the drum specified by the storage address register 201. After filling the storage address register 201 and drum input register 202, the input record control multivibrator 211 is actuated by switch A. This initiates the checking operation. If an alarm signal is generated, the actual contents of the register on the drum can be read from the neon lamps 260 connected to the check register 241. The address of the register can also be read from the neon lamps 251 connected to the angular position counter 206. To check another register after an alarm signal has been generated, the angular position counter 206 must be reset and the start button pressed to reset flip-flop 212.

Obviously many modifications and variations of the present invention are possible in the light of the above teachings. It is therefore to be understood that within the scope of the appended claims the invention may be practiced otherwise than as specifically described.

What is claimed is:

1. A computing device comprising memory means having digital data stored therein, decoding means operable with said memory means to decode into analog form a first portion of said digital data, analog computing means connected to and operable with said decoding means, digital computing means operable with said memory means to receive and operate on a second portion of said digital data, control means operable with said memory means, said control means being coupled to said analog computing means and said digital computing means to control their respective operations, said analog computing means comprising a main bus, an analog multiplier connected to said main bus, an analog divider connected to said main bus, and an analog adder connected to said main bus, said multiplier, divider and adder each being time shared by the variables in said analog computer, integrating means coupled to said main bus, digital-analog decoding means coupling said main bus to said memory means, means coupled to the output of said multiplier and means coupled to the output of said divider each of said means being coupled to said digital computing means whereby the scale factor of the outputs to said means are scaled into an optimum range and said second portion of digital data is accordingly scaled.

2. The structure of claim 1 including means coupled to the output of said adder, said means being coupled to said digital computing means whereby the scale factor of the output to said means is scaled into an optimum range and said second portion of digital data is accordingly scaled.

3. The structure of claim 2 including analog encoding and decoding means coupled to said analog computing means and an operational flight trainer coupled to said analog encoding and decoding means thereby enabling said operational flight trainer and said analog computing means to monitor each others operation.

4. The structure of claim 3 wherein said control means is also coupled to said analog encoding and decoding means and controls its operation.

5. The structure of claim 4 wherein said control means includes an address control matrix and an operations control matrix, said address control matrix determining the address of both analog and digital data and said operations control matrix determining the destinations of said analog and digital data.

6. The structure of claim 5 wherein said memory means has data stored therein in digital form, said digital form having a first and second portion, said first portion being representative of analog data and said second portion being representative of digital data.

7. The structure of claim 6 wherein said memory means has data stored therein in digital form, said digital form having a first portion representative of an analog signal, and a second portion digitally representative of the scale factor of said analog signal.

8. A special purpose analog-digital computer device comprising a magnetic drum storage element for storing digital data information, a keyboard input device operably coupled to said magnetic storage element for feeding in digital data, a tape read-in device and a program data input and encoding device, said tape read-in device and program data input and encoding device being operatively connected between said keyboard input device and said magnetic storage device, a digital decoding means operatively connected to the output of said magnetic drum storage means, and a digital computing and control means operatively connected to the output of said digital drum storage means, an analog computing means operatively connected to the output of said digital decoder means, an analog encoding and decoding device operatively coupled to the input and output of said analog computing means and an operational flight trainer system operatively connected to the analog encoding and decoding means whereby the outputs from the digital control means are fed to the digital computing means to the analog computing means and to the analog encoding and decoding means for control of the operational flight trainer.

References Cited in the file of this patent

UNITED STATES PATENTS

| | | |
|---|---|---|
| 2,698,134 | Agins | Dec. 28, 1954 |
| 2,785,853 | Honore et al. | Mar. 19, 1957 |

(Other references on following page)

UNITED STATES PATENTS

| | | |
|---|---|---|
| 2,796,597 | Poorte et al. | June 18, 1957 |
| 2,801,407 | Lubkin | July 30, 1957 |
| 2,850,232 | Hagen et al. | Sept. 2, 1958 |
| 2,852,187 | Beck | Sept. 16, 1958 |
| 2,922,940 | Mergler | Jan. 26, 1960 |

OTHER REFERENCES

Farrer, G.L.: "Process Automation" (Chemical Engineering, June 1957), pages 121 to 136. Note fig. on page 122.

Mergler, H. W.: "A Digital-Analog Machine Tool Control System" (given at Western Computer Conference, AIEE, Los Angeles, Calif., Feb. 11–12, 1954), pp. 46–59.